US009018562B2

(12) United States Patent
Dantus

(10) Patent No.: US 9,018,562 B2
(45) Date of Patent: Apr. 28, 2015

(54) LASER MATERIAL PROCESSING SYSTEM

(75) Inventor: Marcos Dantus, Okemos, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 1614 days.

(21) Appl. No.: 12/226,152

(22) PCT Filed: Apr. 9, 2007

(86) PCT No.: PCT/US2007/008878
§ 371 (c)(1), (2), (4) Date: Oct. 9, 2008

(87) PCT Pub. No.: WO2007/145702
PCT Pub. Date: Dec. 21, 2007

(65) Prior Publication Data

US 2009/0188901 A1 Jul. 30, 2009

Related U.S. Application Data

(60) Provisional application No. 60/790,695, filed on Apr. 10, 2006.

(51) Int. Cl.
*B23K 26/38* (2014.01)
*B23K 26/40* (2014.01)
(Continued)

(52) U.S. Cl.
CPC ........... *B23K 26/0635* (2013.01); *B23K 26/032* (2013.01); *B23K 26/0639* (2013.01); *B23K 26/0665* (2013.01); *B23K 26/067* (2013.01); *B23K 26/0673* (2013.01);
(Continued)

(58) Field of Classification Search
CPC ............. B23K 26/032; B23K 26/0635; B23K 26/0639; B23K 26/0665; B23K 26/067; B23K 26/0673; B23K 26/0676; B23K 26/0853; B23K 26/1429; B23K 26/365; B23K 26/381; B23K 26/383; B23K 26/4005; B23K 26/401; B23K 26/402; B23K 26/4025; B23K 26/403; B23K 26/4065; B23K 26/4075
USPC ............ 219/121.68, 121.69, 121.73; 356/318
See application file for complete search history.

(56) References Cited

U.S. PATENT DOCUMENTS 3,214,563 A 10/1965 Ford
3,611,182 A 10/1971 Treacy
(Continued)

FOREIGN PATENT DOCUMENTS

DE 2536573 A * 2/1977
EP 0 605 110 7/1994
(Continued)

OTHER PUBLICATIONS

Backus et al., "High power ultrafast lasers", Mar. 1998, American Institute of Physics, vol. 69, No. 3, pp. 1207-1223.*
(Continued)

*Primary Examiner* — Geoffrey S Evans
(74) *Attorney, Agent, or Firm* — Harness, Dickey & Pierce, P.L.C.

(57) ABSTRACT

A laser material processing system and method are provided. A further aspect of the present invention employs a laser for micromachining. In another aspect of the present invention, the system uses a hollow waveguide. In another aspect of the present invention, a laser beam pulse is given broad bandwidth for workpiece modification.

55 Claims, 7 Drawing Sheets

(51) Int. Cl.

*B23K 26/06* (2014.01)
*B23K 26/03* (2006.01)
*B23K 26/067* (2006.01)
*B23K 26/08* (2014.01)
*B23K 26/36* (2014.01)
*B23K 26/14* (2014.01)
*H01S 3/00* (2006.01)

(52) U.S. Cl.

CPC ........ *B23K 26/0676* (2013.01); *B23K 26/0853* (2013.01); *B23K 26/365* (2013.01); *B23K 26/381* (2013.01); *B23K 26/383* (2013.01); *B23K 26/4005* (2013.01); *B23K 26/401* (2013.01); *B23K 26/402* (2013.01); *B23K 26/403* (2013.01); *B23K 26/4065* (2013.01); *H01S 3/0057* (2013.01); *B23K 26/4025* (2013.01); *B23K 26/4075* (2013.01); *B23K 26/1429* (2013.01)

(56) References Cited

U.S. PATENT DOCUMENTS 3,919,881 A 11/1975 Metherell
3,988,704 A 10/1976 Rice et al.
4,167,662 A * 9/1979 Steen ........................ 219/121.85
4,288,691 A 9/1981 Horton
4,394,780 A 7/1983 Mooradian
4,477,905 A 10/1984 Sweeney
4,512,660 A 4/1985 Goldberg
4,621,006 A 11/1986 Terry et al.
4,655,547 A 4/1987 Heritage et al.
4,746,193 A 5/1988 Heritage et al.
4,772,854 A 9/1988 Silberberg
4,812,776 A 3/1989 Sasaki
4,819,239 A 4/1989 Sharp et al.
4,834,474 A 5/1989 George et al.
4,853,065 A 8/1989 Terry et al.
4,856,860 A 8/1989 Silberberg et al.
4,866,699 A 9/1989 Brackett et al.
4,913,934 A 4/1990 Sharp et al.
4,928,316 A 5/1990 Heritage et al.
4,999,840 A 3/1991 Negus
5,021,282 A 6/1991 Terry et al.
5,034,613 A 7/1991 Denk
5,048,029 A 9/1991 Skupsky et al.
5,077,619 A 12/1991 Toms
5,095,487 A 3/1992 Meyerhofer et al.
5,130,994 A 7/1992 Madey et al.
5,132,512 A 7/1992 Sanders et al.
5,132,824 A 7/1992 Patel et al.
5,154,963 A 10/1992 Terry
5,166,818 A 11/1992 Chase et al.
5,239,607 A 8/1993 da Silva et al.
5,341,236 A 8/1994 Stappaerts
5,359,410 A 10/1994 Diels et al.
5,406,408 A 4/1995 Ellingson et al.
5,414,540 A 5/1995 Patel et al.
5,414,541 A 5/1995 Patel et al.
5,463,200 A 10/1995 James et al.
5,526,155 A 6/1996 Knox et al.
5,526,171 A 6/1996 Warren
5,530,544 A 6/1996 Trebino et al.
5,541,947 A 7/1996 Mourou et al.
5,585,913 A 12/1996 Hariharan et al.
5,589,955 A 12/1996 Amako et al.
5,615,673 A 4/1997 Berger et al.
5,631,758 A 5/1997 Knox et al.
5,637,966 A 6/1997 Umstadter et al.
5,656,186 A * 8/1997 Mourou et al. .......... 219/121.69
5,682,262 A 10/1997 Wefers et al.
5,684,595 A 11/1997 Kato et al.
5,689,361 A 11/1997 Damen et al.
5,704,700 A 1/1998 Kappel et al.
5,719,650 A 2/1998 Wefers et al.
5,739,502 A * 4/1998 Anderson et al. ........ 219/121.71
5,754,292 A 5/1998 Kane et al.
5,759,767 A 6/1998 Lakowicz
5,774,213 A 6/1998 Trebino et al.
5,793,091 A 8/1998 Devoe
5,798,867 A 8/1998 Uchida et al.
5,822,097 A 10/1998 Tournois
5,828,459 A 10/1998 Silberberg
5,832,013 A 11/1998 Yessik et al.
5,847,825 A * 12/1998 Alexander .................... 356/318
5,883,309 A 3/1999 Vossiek et al.
5,936,732 A 8/1999 Smirl et al.
5,956,173 A * 9/1999 Svelto et al. .................. 359/332
5,984,916 A * 11/1999 Lai ................................ 606/11
5,994,687 A 11/1999 Chanteloup et al.
6,002,480 A 12/1999 Izatt et al.
6,008,899 A 12/1999 Trebino et al.
6,042,603 A 3/2000 Fisher et al.
6,057,919 A 5/2000 Machida et al.
6,058,132 A * 5/2000 Iso et al. .................. 219/121.74
6,072,813 A 6/2000 Tournois
6,080,148 A 6/2000 Damasco et al.
6,081,543 A 6/2000 Liu et al.
6,111,251 A 8/2000 Hillenkamp
6,130,426 A 10/2000 Laukien et al.
6,156,527 A 12/2000 Schmidt et al.
6,166,385 A 12/2000 Webb et al.
6,184,490 B1 2/2001 Schweizer
6,191,386 B1 2/2001 Albright et al.
6,219,142 B1 4/2001 Kane
6,259,104 B1 7/2001 Baer
6,272,156 B1 8/2001 Reed et al.
6,288,782 B1 9/2001 Worster
6,296,810 B1 10/2001 Ulmer
6,316,153 B1 11/2001 Goodman
6,327,068 B1 12/2001 Silberberg et al.
6,337,606 B1 1/2002 Brombaugh et al.
6,344,653 B1 2/2002 Webb et al.
6,391,220 B1 5/2002 Watanabe et al.
6,396,856 B1 5/2002 Sucha et al.
6,402,898 B1 6/2002 Brumer et al.
6,421,154 B1 7/2002 Diels et al.
6,479,822 B1 11/2002 Nelson et al.
6,480,656 B1 11/2002 Islam et al.
6,498,801 B1 12/2002 Dudelzak et al.
6,504,612 B2 1/2003 Trebino
6,515,257 B1 2/2003 Jain et al.
6,539,156 B1 3/2003 Dickson et al.
6,566,667 B1 5/2003 Partlo et al.
6,573,493 B1 6/2003 Futami et al.
6,577,782 B1 6/2003 Leaird et al.
6,610,351 B2 8/2003 Shchegolikhin et al.
6,610,977 B2 8/2003 Megerle
6,621,613 B2 9/2003 Silberberg et al.
6,625,181 B1 9/2003 Oshemkov et al.
6,678,450 B1 1/2004 Franson
6,697,196 B2 2/2004 Suzuki
6,723,991 B1 4/2004 Sucha et al.
6,757,463 B2 6/2004 Hutchinson et al.
6,787,733 B2 * 9/2004 Lubatschowski et al. ........................ 219/121.67
6,795,456 B2 9/2004 Scaggs
6,795,777 B1 9/2004 Scully et al.
6,801,318 B2 10/2004 Fu et al.
6,801,551 B1 10/2004 Delfyett et al.
6,804,000 B2 10/2004 Roorda et al.
6,857,744 B2 2/2005 Nakada et al.
6,879,426 B1 4/2005 Weiner
6,885,325 B2 4/2005 Omelyanchouk et al.
6,915,040 B2 7/2005 Willner et al.
6,930,779 B2 8/2005 McGrew
6,963,591 B2 11/2005 Tulloch et al.
7,033,519 B2 4/2006 Taylor et al.
7,049,543 B2 5/2006 Roos et al.
7,060,932 B2 * 6/2006 Denney et al. ............. 219/121.6
7,096,125 B2 8/2006 Padmanabhan et al.
7,105,811 B2 9/2006 Dantus et al.
7,132,223 B2 11/2006 Schroeder et al.
7,169,709 B2 1/2007 Koide

(56) References Cited

U.S. PATENT DOCUMENTS 7,170,030 B2 1/2007 Haight et al.
7,170,598 B2 1/2007 Walla et al.
7,256,885 B2 8/2007 Silberberg et al.
7,276,103 B2 10/2007 Wöste et al.
7,289,203 B2 10/2007 Frankel
7,342,223 B2 3/2008 Ohkubo et al.
7,348,569 B2 3/2008 Feurer et al.
7,359,045 B2 * 4/2008 Some ........................ 356/237.5
7,369,773 B2 5/2008 Weiner
7,403,282 B2 7/2008 Silberberg et al.
7,411,166 B2 8/2008 Wolleschensky et al.
7,439,497 B2 10/2008 Dantus et al.
7,450,618 B2 11/2008 Dantus
7,609,731 B2 10/2009 Dantus et al.
7,826,051 B2 11/2010 Silberberg et al.
2001/0015990 A1 8/2001 Miyai
2001/0017727 A1 8/2001 Sucha et al.
2002/0025490 A1 2/2002 Shchegolikhin et al.
2002/0074320 A1 * 6/2002 Liu et al. .................. 219/121.71
2002/0086245 A1 7/2002 Zait et al.
2002/0097761 A1 7/2002 Sucha et al.
2003/0063884 A1 4/2003 Smith et al.
2003/0099264 A1 * 5/2003 Dantus et al. .................. 372/25
2003/0123051 A1 7/2003 McGrew
2003/0194165 A1 10/2003 Silberberg et al.
2003/0201578 A1 * 10/2003 Li et al. ......................... 264/400
2003/0210400 A1 11/2003 Joffre et al.
2004/0012837 A1 1/2004 Kaplan et al.
2004/0017560 A1 * 1/2004 Liu .............................. 356/213
2004/0021243 A1 2/2004 Shih et al.
2004/0031906 A1 2/2004 Glecker
2004/0051867 A1 * 3/2004 Brestel et al. ................. 356/318
2004/0058058 A1 3/2004 Shchegolikhin et al.
2004/0089643 A1 * 5/2004 Jones et al. ............. 219/121.72
2004/0089804 A1 5/2004 Dantus et al.
2004/0128081 A1 7/2004 Rabitz et al.
2004/0145735 A1 7/2004 Silberberg et al.
2004/0155184 A1 8/2004 Stockman et al.
2004/0173942 A1 * 9/2004 Kobayashi et al. ........... 264/400
2004/0226925 A1 * 11/2004 Gu et al. ................. 219/121.69
2004/0233944 A1 11/2004 Dantus et al.
2004/0240037 A1 12/2004 Harter
2004/0263950 A1 12/2004 Fermann et al.
2005/0000952 A1 * 1/2005 Harter ..................... 219/121.68
2005/0021243 A1 1/2005 Dantus et al.
2005/0036202 A1 2/2005 Cohen et al.
2005/0058175 A1 * 3/2005 Gross et al. ..................... 372/98
2005/0061779 A1 * 3/2005 Blumenfeld et al. ...... 219/121.6
2005/0064137 A1 * 3/2005 Hunt et al. ............... 219/121.69
2005/0103759 A1 5/2005 Li et al.
2005/0155958 A1 7/2005 Arai et al.
2005/0161669 A1 7/2005 Jovanovich et al.
2005/0185188 A1 8/2005 McGrew
2005/0194365 A1 * 9/2005 Li ........................... 219/121.68
2005/0200843 A1 * 9/2005 Kumar et al. ................. 356/318
2005/0224469 A1 * 10/2005 Cutler et al. ............... 219/121.6
2005/0226287 A1 10/2005 Shah et al.
2005/0230365 A1 10/2005 Lei et al.
2005/0232313 A1 10/2005 Fermann et al.
2005/0247894 A1 * 11/2005 Watkins et al. .......... 250/559.13
2006/0000988 A1 1/2006 Stuart et al.
2006/0006964 A1 1/2006 Huang et al.
2006/0019171 A1 1/2006 Hosono et al.
2006/0028655 A1 2/2006 Cordingley et al.
2006/0032841 A1 2/2006 Tan et al.
2006/0039419 A1 2/2006 Deshi
2006/0051025 A1 3/2006 Mizuuchi et al.
2006/0056468 A1 3/2006 Dantus et al.
2006/0058683 A1 3/2006 Chance
2006/0066848 A1 3/2006 Frankel
2006/0071803 A1 4/2006 Hamburger et al.
2006/0084957 A1 * 4/2006 Delfyett et al. ................. 606/12
2006/0096426 A1 5/2006 Park
2006/0096962 A1 5/2006 Park
2006/0099810 A1 * 5/2006 Voronov et al. ............... 438/689
2006/0119743 A1 6/2006 Lin
2006/0120412 A1 6/2006 Liu
2006/0134004 A1 6/2006 Gellermann et al.
2006/0169677 A1 * 8/2006 Deshi ......................... 219/121.7
2006/0187974 A1 8/2006 Dantus
2006/0207975 A1 9/2006 Ehrmann et al.
2006/0207976 A1 * 9/2006 Bovatsek et al. ........ 219/121.69
2006/0233511 A9 * 10/2006 Langhans ........................ 372/6
2006/0243712 A1 11/2006 Haight et al.
2006/0274403 A1 12/2006 Kaplan et al.
2006/0285071 A1 12/2006 Erickson et al.
2007/0034615 A1 2/2007 Kleine
2007/0034616 A1 * 2/2007 Bischoff et al. .......... 219/121.83
2007/0047595 A1 * 3/2007 Liu et al. .......................... 372/6
2007/0093970 A1 4/2007 Padmanabhan et al.
2007/0103778 A1 5/2007 Kaplan et al.
2008/0170218 A1 7/2008 Dantus et al.
2008/0309931 A1 12/2008 Silberberg et al.
2009/0122819 A1 5/2009 Dantus et al.
2009/0207869 A1 8/2009 Dantus et al.
2009/0238222 A1 9/2009 Dantus et al.
2009/0256071 A1 10/2009 Dantus et al.
2009/0257464 A1 10/2009 Dantus et al.
2009/0296744 A1 12/2009 Dantus et al.

FOREIGN PATENT DOCUMENTS

EP 0 842 729 5/1998
EP 842729 A1 * 5/1998
EP 1 625 939 2/2006
EP 1 742 311 1/2007
EP 1742311 A1 1/2007
EP 1 759 229 3/2007
JP 55-117586 A * 9/1980
JP 63-180393 A * 7/1988
JP 01-113189 5/1989
JP 8-155670 A * 6/1996
JP 11-254174 A * 9/1999
JP 2003 155256 A 5/2003
WO WO 99/57318 11/1999
WO WO 00/70647 11/2000
WO WO 01/54323 7/2001
WO WO-02/29853 A2 * 4/2002
WO WO 02/061799 8/2002
WO WO-2004023413 A2 3/2004
WO WO-2005/009666 A1 * 2/2005
WO WO 2005/088783 9/2005
WO WO 2005/111677 11/2005
WO WO 2006/079083 7/2006
WO WO 2006/111682 10/2006
WO WO 2006/138442 12/2006
WO WO 2007/002231 1/2007
WO WO-2007001308 A2 1/2007
WO WO-2007145702 A2 12/2007

OTHER PUBLICATIONS

Daminelli et al., "Femtosecond laser interaction with silicon under water confinement", Jun. 2004,Elsevier, Thin Solid Films, pp. 334-341.*

Konorov et al., "Limiting of microjoule femtosecond pulses in air-guided modes of a hollow photonic-crystal fiber", Aug. 2004, The American Physical Society, Physical Review A, vol. 70, pp. 023807-1 to 023807-6.*

Matsuura et al., "Delivery of femtosecond pulses by flexible hollow fibers", Jan. 2002, Journal of Applied Physics, vol. 91, No. 2, pp. 887-889.*

Nisoli et al., "Generation of high energy 10 fs pulses by a new pulse compression technique", May 1996, American Institute of Physics, Applied Physics Letters, vol. 68, pp. 2793-2795.*

Suda et al., "Generation of sub-10-fs, 5-mJ-optical pulses using a hollow fiber with a pressure gradient", Mar. 2005, American Institute of Physics, Applied Physics Letters, vol. 86, pp. 111116-1 to 111116-3.*

Vozzi, "Optimal spectral broadening in hollow-fiber compressor systems",Dec. 2004, Apply. Physics B, vol. 80, pp. 285-289.*

(56) References Cited

OTHER PUBLICATIONS

Xu et al., "Experimental generation of an ultra-broad spectrum based on induced-phase modulation in a single mode glass fiber", Apr. 1999, Elsevier, Optics Communications, vol. 162, pp. 256-260.*

Sheldakova et al., "Multi-dither adaptive optical system for laser beam shaping" Jun. 2003, Proceedings of SPIE, vol. 4969,pp. 115-121.*

Sanner et al. "Programmable beam shaping of femtosecond pulses", May 2004, Optical Society of America, ISBN:1-55752-770-9.*

Tong et al., "Real-time control of ultrafast laser micromachining by laser-induced breakdown spectroscopy", Mar. 2014, Applied Optics, vol. 43, No. 9, pp. 1971-1980.*

Dong Gun Lee et al.; "Coherent Control of High-Order Harmonics with Chirped Femtosecond Laser Pulses"; Physical Review Letters, vol. 87, No. 24, Dec. 10, 2001; pp. 243902-1-243902-4.

D.S. Chemla et al; "Ultrafast phase dynamics of coherent emission from excitons in GaAs quantum wells"; Physical Review B, vol. 50, No. 12, Sep. 15, 1995; pp. 8439-8453.

Jerome Tignon et al.; "Spectral Interferometry of Semiconductor Nanostructures"; IEEE Journal of Quantum Electronics, vol. 35, No. 4; Apr. 1999; pp. 510-522.

Arthur L. Smirl et al.; "Heavy-Hole and Light-Hole Quantum Beats in the Polarization State of Coherent Emission from Quantum Wells"; IEEE Journal of Quantum Electronics, vol. 35, No. 4; Apr. 1999; pp. 523-531.

John D. Hybl et al; "Two-dimensional Fourier transform electronic spectroscopy"; Journal of Chemical Physics, vol. 115, No. 14; Oct. 8, 2001; pp. 6606-6622.

C. Iaconis et al.; "Direct measurement of the two-point field correlation function"; Optics Letters, vol. 21, No. 21; Nov. 1, 1996; pp. 1783-1785.

A.M. Weiner et al.; "Femtosecond Pulse Sequences Used for Optical Manipulation of Molecular Motion"; Reports; Mar. 16, 1990; pp. 1317-1319.

Ch. Warmuth et al.; "Studying vibrational wavepacket dynamics by measuring fluorescence interference fluctuations"; Journal of Chemical Physics, vol. 112, No. 11; Mar. 15, 2000; pp. 5060-5069.

Ch. Warmuth et al.; "Molecular quantum dynamics in a thermal system: fractional wave packet revivals probed by random-phase fluorescence interferometry"; Journal of Chemical Physics, vol. 114, No. 22; Jun. 8, 2001; pp. 9901-9910.

G.G. Paulus et al.; "Absolute-phase phenomena in photoionization with few-cycle laser pulses"; Nature, vol. 414; Nov. 8, 2001; pp. 182-184.

Yaron Silberberg; "Physics at the attosecond frontier"; Nature, vol. 414, Nov. 29, 2001; pp. 494-495.

M. Hentschel et al.; "Attosecond metrology"; Nature, vol. 414; Nov. 29, 2001; pp. 509-513.

L. Lepetit et al.; "Linear techniques of phase measurement by femtosecond spectral interferometry for applications in spectroscopy"; J. Opt. Soc. Am. B, vol. 12, No. 12; Dec. 1995; pp. 2467-2474.

L. Lepetit et al.; "Two-dimensional nonlinear optics using Fourier-transform spectral interferometry"; Optics Letters, vol. 21, No. 8; Apr. 15, 1996; pp. 564-566.

K.C. Chu et al.; "Temporal interferometric measurement of femtosecond spectral phase"; Optics Letters, vol. 21, No. 22; Nov. 15, 1996; pp. 1842-1844.

W.J. Walecki et al.; "Characterization of the polarization state of weak ultrashort coherent signals by dual-channel spectral interferometry"; Optics Letters, vol. 22, No. 2; Jan. 15, 1997; pp. 81-83.

J.P. Likforman et al.; "Measurement of photon echoes by use of femtosecond Fourier-transform Spectral Interferometry"; Optics Letters, vol. 22, No. 14; Jul. 15, 1997; pp. 1104-1106.

Michel F. Emde et al.; "Spectral interferometry as an alternative to time-domain heterodyning"; Optics Letters, vol. 22, No. 17; Sep. 1, 1997; pp. 1338-1340.

X. Chen et al.; "Temporally and spectrally resolved amplitude and phase of coherent four-wave-mixing emission from GaAs quantum wells"; Physical Review B, vol. 56, No. 15; Oct. 15, 1997; pp. 9738-9743.

Christophe Dorrer; "Influence of the calibration of the detector on spectral interferometry"; J. Opt. Soc. Am. B; vol. 16, No. 7; Jul. 1999; pp. 1160-1168.

Allison W. Albrecht et al.; "Experimental distinction between phase shifts and time delays: Implications for femtosecond spectroscopy and coherent control of chemical reactions"; Journal of Chemical Physics, vol. 111, No. 24; Dec. 22, 1999; pp. 10934-10955.

Christophe Dorrer et al.; "Spectral resolution and sampling issues in Fourier-transform spectral interferometry"; J. Opt. Soc. Am. B, vol. 17, No. 10; Oct. 2000; pp. 1795-1802.

G. Roberts; "Abstract—Interference effects in femtosecond spectroscopy"; Philosophical Transactions Of The Royal Society Of London Series A—Mathematical Physical and Engineering Sciences; 360 (1794): 987-1021; May 15, 2002 (1 page).

Richard S. Judson et al.; "Teaching Lasers to Control Molecules"; Physical Review Letters, vol. 68, No. 10; Mar. 9, 1992; pp. 1500-1503.

Michael Messina et al.; "Quantum control of multidimensional systems: Implementation within the time-dependent Hartree approximation"; J. Chem Phys. 104; Jan. 1996; pp. 173-182.

D.H. Schirrmeister et al; "Femtosecond pulse dependence of dissipation in molecular systems"; Chemical Physics Letters Dec. 4, 1998; pp. 383-390.

Herschel Rabitz et al.; "Optimal Control of Molecular Motion: Design, Implementation and Inversion"; Acc. Chem. Res., vol. 33, No. 8; 2000; pp. 572-578.

Y.J. Yan et al.; "Pulse shaping and coherent Raman spectroscopy in condensed phases"; J. Chem. Phys 94 (2); Jan. 15, 1991; pp. 997-1001.

Jeffrey L. Krause et al.; "Optical control of molecular dynamics: Molecular cannons, reflectrons and wave-packet focusers"; J. Chem. Phys. 99(9); Nov. 1, 1993; pp. 6562-6578.

V. Engel et al; "Two-photon wave-packet interferometry"; J. Chem Phys. 100 (8); Apr. 15, 1994; pp. 5448-5458.

M. Sterling et al.; "Interrogation and control of condensed phase chemical dynamics with linearly chirped pulses: 12 in solid Kr"; J. Chem. Phys. 104; May 1, 1996; pp. 6497-6506.

Jianshu Cao et al.; "A simple physical picture for quantum control of wave packet localization"; J. Chem Phys., 107; Aug. 1, 1997; pp. 1441-1450.

Kenji Mishima et al.; "A theoretical study on laser control of a molecular nonadiabatic process by ultrashort chirped laser pulses"; Journal of Chemical Physics, vol. 109., No. 5; Aug. 1, 1998; pp. 1801-1809.

H.A. Kim et al.; "Expanded concept of the adiabatic population transfer using dressed states"; Physical Review A, vol. 59, No. 2; Feb. 1999; pp. 1404-1407.

Jianshu Cao et al.; "Molecular pie pulses: Population inversion with positively chirped short pulses"; Journal of Chemical Physics, vol. 113, No. 5; Aug. 1, 2000; pp. 1898-1909.

Moshe Shapiro et al.; "Coherently Controlled Asymmetric Synthesis with Achiral Light"; Physical Review Letters, vol. 84, No. 8; Feb. 21, 2000; pp. 1669-1672.

John M. Jean et al.; "Application of a multilevel Redfield theory to electron transfer in condensed phases"; J. Chem. Phys. 96; Apr. 15, 1992; pp. 5827-5842.

Bjarne Amstrup et al.; "Control of HOD photodissociation dynamics via bond-selective infrared multiphoton excitation and a femtosecond ultraviolet laser pulse"; J. Chem. Phys., vol. 97, No. 11; Dec. 1, 1992; pp. 8285-8295.

L.D. Ziegler et al.; "Nonlinear polarization description of phase-locked pulse-pair spectroscopy"; J. Chem. Phys., vol. 97, No. 7; Oct. 1, 1992; pp. 4704-4713.

Jianshu Cao et al.; "Molecular Pi Pulse for Total Inversion of Electronic State Population"; Physical Review Letters, vol. 80, No. 7; Feb. 16, 1998; pp. 1406-1409.

Moshe Shapiro et al.; "Nonadiabatic wave packet dynamics: Experiment and theory in IBr"; Journal of Chemical Physics, vol. 110, No. 5; Feb. 1, 1999; pp. 2465-2473.

(56) References Cited

OTHER PUBLICATIONS

Zhenwen Shen et al.; "Pump-dump control and the related transient absorption spectroscopies"; Journal of Chemical Physics, vol. 110, No. 15; Apr. 15, 1999; pp. 7192-7201.
Kenji Mishima et al.; "Theoretical study on quantum control of photodissociation and photodesorption dynamics by femtosecond chirped laser pulses"; Journal of Chemical Physics, vol. 110, No. 16; Apr. 22, 1999; pp. 7756-7769.
Jeffrey A. Cina; "Nonlinear wavepacket interferometry for polyatomic molecules"; Journal of Chemical Physics, vol. 113, No. 21; Dec. 1, 2000; pp. 9488-9496.
F. Gelmukhanov et al.; "Dynamics of two-photon absorption by molecules and solutions"; J. Opt. Soc. Am. B, vol. 19, No. 5, May 2002; pp. 937-945.
Philip H. Bucksbaum; "Ultrafast control"; Nature magazine, vol. 421; Feb. 6, 2003; pp. 593-594. Kuhn & Weyn SR2 Sep. 4, 2001.
Christopher J. Bardeen et al.; "Effec of Pulse Shape on the Efficiency of Multiphoton Processes: Implications for Biological Microscopy"; Journal of Biomedical Optics, vol. 4, No. 3; Jul. 1999; pp. 362-367.
T. Brixner et al.; "Photoselective adaptive femtosecond quantum control in the liquid phase"; Nature magazine, vol. 414; Nov. 2001; pp. 57-60.
Jennifer L. Herek et al.; "Quantum control of energy flow in light harvesting"; Nature magazine, vol. 417; May 30, 2002; pp. 533-535.
Nirit Dudovich et al.; "Single-pulse coherently controlled nonlinear Raman spectroscopy and microscopy"; Nature magazine, vol. 418; Aug. 1, 2002; pp. 512-514.
Dan Oron et al.; "Single-Pulse Phase-Contrast Nonlinear Raman Spectroscopy"; Physical Review Letters, vol. 89, No. 27; Dec. 30, 2002; pp. 27300-1-273001-4.
T. Brixner et al.; "Liquid-phase adaptive femtosecond quantum control: Removing intrinsic intensity dependencies"; Journal of Chemical Physics, vol. 118, No. 8; Feb. 22, 2003; pp. 3692-3701.
R. Netz et al.; "Observation of Selectivity of Coherent Population Transfer Induced by Optical Interference"; Physical Review Letters, vol. 90, No. 6; Feb. 14, 2003; pp. 063001-1-063001-4.
D.W. Schumacher et al.; "Phase Dependence of Intense Field Ionization"; Physical Review A, vol. 54, No. 5; Nov. 1996; pp. 4271-4278.
Christopher J. Bardeen et al.; "Quantum Control of Population Transfer in Green Fluorescent Protein by Using Chirped Femtosecond Pulses"; J. Am. Chem. Soc., vol. 120, No. 50; 1998; 13023-13027.
Doron Meshulach et al.; "Coherent quantum control of two-photon transitions by a femtosecond laser pulse"; Nature magazine, vol. 396; Nov. 19, 1998; pp. 239-242.
A. Baltuska et al.; "Attosecond control of electronic processes by intense light fields"; Nature magazine, vol. 421; Feb. 6, 2003; pp. 611-615.
D.J. Maas et al.; "Population transfer via adiabatic passage in the rubidium quantum ladder system"; Physical Review A, vol. 59, No. 2; Feb. 1999; pp. 1374-1381.
Nirit Dudovich et al.; "Coherent Transient Enhancement of Optically Induced Resonant Transitions"; Physical Review Letters, vol. 88, No. 12; Mar. 25, 2002; pp. 123004-1-123004-4.
Jerome Degert et al.; "Realization of a Time-Domain Fresnel Lens with Coherent Control"; Physical Review Letters, vol. 89, No. 20; Nov. 11, 2002; pp. 203003-1-203003-4.
M. Wollenhaupt et al.; "Interferences of Ultrashort Free Electron Wave Packets"; Physical Review Letters, vol. 89, No. 17; Oct. 21, 2002; pp. 173001-1-173001-4.
R. Teets et al.; "Coherent Two-Photon Excitation by Multiple Light Pulses"; Physical Review Letters, vol. 38, No. 14; Apr. 4, 1977; Iags. 760-764.
R.R. Jones; "Multiphoton Ionization Enhancement Using Two Phase-Coherent Laser Pulses"; Physical Review Letters, vol. 75, No. 8; Aug. 21, 1995; pp. 1491-1494.
D.J. Maas et al.; "Vibrational ladder climbing in NO by ultrashort infrared laser pulses"; Chemical Physics Letters 270; May 16, 1997; pp. 45-49.
Christopher J. Bardeen et al.; "Quantum control of I2 in the gas phase and in condensed phase solid Kr matrix"; J. Chem. Phys., vol. 106, No. 20; May 22, 1997; pp. 8486-8503.
Vladislav V. Yakovlev et al.; "Chirped pulse enhancement of multiphoton absorption in molecular iodine"; Journal of Chemical Physics, vol. 108, No. 6, Feb. 8, 1998; pp. 2309-2313.
T.C. Weinacht et al.; "Measurement of the Amplitude and Phase of a Sculpted Rydberg Wave Packet"; Physical Review Letters; vol. 80, No. 25; Jun. 22, 1998; pp. 5508-5511.
D.J. Maas et al.; "Rotational interference in vibrational ladder climbing in NO by chirped infrared laser pulses"; Physical Review A, vol. 60, No. 2; Aug. 1999; pp. 1351-1362.
R. van Leeuwen et al.; "Coherent Control of the Energy and Angular Distribution of Autoionized Electrons"; Physical Review Letters, vol. 82, No. 14; Apr. 5, 1999; pp. 2852-2855.
Celine Nicole et al.; "Saturation of wave-packet interferences: Direct observation of spin precession in potassium atoms"; Physical Review A, vol. 60, No. 3; Sep. 1999; pp. R1755-R1758.
Radoslaw Uberna et al.; "Ultrafast spectroscopy of wavelength-dependent coherent photoionization cross sections of Li2 wave packets in the E1Eg state: The role of Rydberg states"; Journal of Chemical Physics, vol. 114, No. 23; Jun. 15, 2001; pp. 10311-10320.
Lorenzo Pesce et al.; "Quantum dynamics simulation of the ultrafast photoionization of Li2"; Journal of Chemical Physics, vol. 114, No. 3; Jan. 15, 2001; pp. 1259-1271.
J. Ahn et al.; "Quantum Phase Retrieval of a Rydberg Wave Packet Using a Half-Cycle Pulse"; Physical Review Letters, vol. 86, No. 7; Feb. 12, 2001; pp. 1179-1182.
Sebastien Zamith et al.; "Observation of Coherent Transients in Ultrashort Chirped Excitation of an Undamped Two-Level System"; Physical Review Letters, vol. 87, No. 3; Jul. 16, 2001; pp. 033001-1-033001-4.
Hans U. Stauffer et al.; "Simultaneous phase control of Li2 wave packets in two electronic states"; Journal of Chemical Physics, vol. 116, No. 3; Jan. 15, 2002; pp. 946-954.
Joshua B. Ballard et al.; "Optimization of wave packet coefficients in Li 2 using an evolutionary algorithm: The role of resonant and nonresonant wavelengths"; Journal of Chemical Physics, vol. 116, No. 4; Jan. 22, 2002; pp. 1350-1360.
Elizabeth Mirowski et al.; "Effect of nonresonant frequencies on the enhancement of quantum beat amplitudes in rovibrational states of Li2: The role of state spacing"; Journal of Chemical Physics, vol. 117, No. 24; Dec. 22, 2002; pp. 11228-11238.
Dan Oron et al.; "Narrow-Band Coherent Anti-Stokes Raman Signals from Broad-Band Pulses"; Physical Review Letters, vol. 88, No. 6; Feb. 11, 2002; pp. 063004-1-063004-4.
M.M. Salour et al.; "Observation of Ramsey's Interference Fringes in the Profile of Doppler-Free Two-Photon Resonances"; Physical Review Letters, vol. 38, No. 14; Apr. 4, 1977; pp. 757-760.
N.F. Scherer et al.; "Time resolved dynamics of isolated molecular systems studied with phase-locked femtosecond pulse pairs"; J. Chem Phys. vol. 93, No. 1; Jul. 1, 1990; pp. 856-857.
J.S. Melinger et al.; "Adiabatic population inversion in I2 vapor with picosecond laser pulses"; J. Chem Phys. vol. 95, No. 3; Aug. 1, 1991; pp. 2210-2213.
J.J. Gerdy et al.; "Femtosecond selective control of wave packet population"; Chemical Physics Letters, vol. 171, No. 1/2; Jul. 27, 1990; pp. 1-4.
Norbert F. Scherer et al.; "Fluorescence-detected wave packet interferometry: Time resolved molecular spectroscopy with sequences of femtosecond phase-locked pulses"; J. Chem. Phys., vol. 95, No. 3; Aug. 1, 1991; pp. 1487-1511.
N.F. Scherer et al.; "Fluorescence-detected wave packet interferometry. II. Role of rotations and determination of the susceptibility"; J. Chem. Phys., vol. 96, No. 6; Mar. 15, 1992; pp. 4180-4194.
L.D. Noordam et al.; "Redistribution of Rydberg States by Intense Picosecond Pulses"; Physical Review Letters, vol. 68, No. 10; Mar. 9, 1992; pp. 1496-1499.
J.S. Melinger et al.; "Generation of Narrowband Inversion with Broadband Laser Pulses"; vol. 68, No. 13; Mar. 30, 1992; pp. 2000-2003.

(56) References Cited

OTHER PUBLICATIONS

B. Broers et al.; "Efficient Population Transfer in a Three-Level Ladder System by Frequency-Swept Ultrashort Laser Pulses"; Physical Review Letters, vol. 69, No. 14; Oct. 5, 1992; pp. 2062-2065.

R.R. Jones et al.; "Ramsey Interference in Strongly Driven Rydberg Systems"; Physical Review Letters, vol. 71, No. 16; Oct. 18, 1993; pp. 2575-2578.

J.F. Christian et al.; "Rubidium electronic wavepackets probed by a phase-sensitive pump-probe technique"; Optics Communications, vol. 103, No. 1/2; Nov. 1, 1993; pp. 79-84.

J.S. Melinger et al.; "Adiabatic population transfer with frequency-swept laser pulses"; J. Chem. Phys. vol. 101, No. 8; Oct. 15, 1994; pp. 6439-6454.

P. Balling et al.; "Interference in climbing a quantum ladder system with frequency-chirped laser pulses"; Physical Review A, vol. 50, No. 5; Nov. 1994; pp. 4276-4285.

D.W. Schumacher et al.; "Phase Dependence of Intense Field Ionization: A Study Using Two Colors"; Physical Review Letters, vol. 73, No. 10; Sep. 5, 1994; pp. 1344-1347.

L. Marmet et al.; "Observation of Quasi-Landau Wave Packets"; Physical Review Letters, vol. 72, No. 24; Jun. 13, 1994; pp. 3779-3782.

Valerie Blanchet et al.; "One-color coherent control in Cs2 Observation of 2.7 fs beats in the ionization signal"; Chemical Physics Letters, vol. 233; Feb. 25, 1995; pp. 491-499.

D.W. Schumacher et al.; "Programmable cesium Rydberg wave packets"; Physical Review A, vol. 52, No. 6; Dec. 1995; pp. 4719-4726.

R.R. Jones; "Interference Effects in the Multiphoton Ionization of Sodium"; Physical Review Letters, vol. 74, No. 7; Feb. 13, 1995; pp. 1091-1094.

Bern Kohler et al.; "Quantum Control of Wave Packet Evolution with Tailored Femtosecond Pulses"; Physical Review Letters, vol. 74, No. 17; Apr. 24, 1995; pp. 3360-3363.

M. Ovchinnikov et al.; "Quantum interference in resonant Raman spectra of I2 in condensed media"; J. Chem. Phys., vol. 106, No. 13; Apr. 1, 1997; pp. 5775-5778.

Richard M. Williams et al.; "Compositional control of rovibrational wave packets in the E(1 Eg) "shelf" state of Li2 via quantum-state-resolved intermediate state selection"; J. Chem. Phys. vol. 106, No. 20; May 22, 1997; pp. 8310-8323.

John M. Papanikolas et al.; "Manipulation of rovibrational wave packet composition in the Li2 E(1Eg) shelf state using intermediate state selection and shaped femtosecond laser pulses"; J. Chem. Phys., vol. 107, No. 11; Sep. 15, 1997; pp. 4172-4178.

Valerie Blanchet et al.; "Temporal Coherent Control in Two-Photon Transitions: From Optical Interferences to Quantum Interferences"; Physical Review Letters, vol. 78, No. 14; Apr. 7, 1997; pp. 2716-2719.

Valerie Blanchet et al.; "Temporal coherent control in the photoionization of Cs2: Theory and experiment"; Journal of Chemical Physics, vol. 108, No. 12; Mar. 22, 1998; pp. 4862-4876.

R.A. Bartels et al.; "Nonresonant Control of Multimode Molecular Wave Packets at Room Temperature"; Physical Review Letters, vol. 88, No. 3; Jan. 21, 2002; pp. 033001-1 through 033001-4.

T. Brixner et al.; "Abstract—Photoselective adaptive femtosecond quantum control in the liquid phase"; Nature; 414 (6859): 57-60; Nov. 1, 2001 (1 page).

B. Dayan et al.; "Coherent control with broadband squeezed vacuum"; arXiv:quant-ph/0302038 v1; Feb. 5, 2003 (4 pages).

B. Dayan et al.; "Two Photon Absorption and Coherent Control with Broadband Down-Converted Light"; Physical Review Letters, vol. 93, No. 2; Jul. 9, 2004; pp. 023005-1-023005-4.

B. Dayan et al.; "Nonlinear Interactions with an Ultrahigh Flux of Broadband Entangled Photons"; Physical Review Letters, PRL 94; Feb. 4, 2005, 2004; pp. 043602-1-043602-4.

N. Dudovich et al.; "Single-pulse coherent anti-Stokes Raman spectroscopy in the fingerprint spectral region"; J. of Chem. Phys., vol. 118, No. 20; May 22, 2003; pp. 9208-9215.

D. Oron et al.,; "Femtosecond Phase-and-Polaration Control for Background-Free Coherent Anti-Stokes Raman Spectroscopy"; Physical Review Letters, vol. 90, No. 91; May 30, 2003; pp. 213902-1-213902-4.

N. Dudovich et al.; "Quantum Control of the Angular Momentum Distribution in Multiphoton Absorption Processes"; Physical Review Letters, vol. 93, No. 10; Mar. 12, 2004; pp. 103003-1-103003-4.

J.G. Underwood et al.,; "Switched Wave Packets: A Route to Nonperturbative Quantum Control"; Physical Review Letters, vol. 90, No. 22; Jun. 6, 2003; pp. 223001-1-223001-4.

A. Powe et al.; "Molecular Fluorescence, Phosphorescence, and Chemiluminescence Spectrometry"; Anal. Chem., vol. 76, No. 15; Aug. 15, 2004; pp. 4614-4634.

D. Abramavicius et al.; "Disentangling multidimensional femtosecond spectra of excitons by pulse shaping with coherent control"; J. of Chem. Phys., vol. 120, No. 18; May 8, 2004; pp. 8373-8378.

T. Okada et al.; "Optical control of two-photon excitation efficiency of α-perylene crystal by pulse shaping"; Amer. Inst. of Phys., vol. 121, No. 13; Oct. 1, 2004; pp. 6386-6391.

B.J. Pearson et al.; "Control of Raman Lasing in the Nonimpulsive Regime"; Physical Review Letters, vol. 92, No. 24; Jun. 18, 2004; pp. 243003-1-243003-4.

Derryck T. Reid; "Algorithm for Complete and Rapid Retrieval of Ultrashort Pulse Amplitude and Phase from a Sonogram"; IEEE Journal of Quantum Electronics; vol. 35, No. 11, Nov. 1999; pp. 1584-1589.

I.G. Cormack et al.; "Rapid measurement of ultrashort-pulse amplitude and phase from a two-photon absorption sonogram trace"; J. Opt. Soc. Am. B; vol. 18, No. 9, Sep. 2001; pp. 1377-1382.

E. Tokunaga et al.; "Frequency-domain interferometer for femtosecond time-resolved phase spectroscopy"; Optics Letters, vol. 17, No. 16; Aug. 15, 1992, pp. 1131-1133.

Victor Wong et al.; "Analysis of ultrashort pulse-shape measurement using linear interferometers"; Optics Letters, vol. 19, No. 4; Feb. 15, 1994; pp. 287-289.

Victor Wong et al.; "Linear filter analysis of methods for ultrashort-pulse-shape measurements"; J. Opt.Soc. Am. B, vol. 12, No. 8; Aug. 1995; pp. 1491-1499.

J. Peatross et al.; "Temporal decorrelation of short laser pulses"; J. Opt. Soc. Am. B, vol. 15, No. 1; Jan. 1998; pp. 216-222.

Ocean Optics Inc.; "HR4000 High-resolution Spectrometer" http://oceanoptics.com/products/hr4000.asp; Jun. 25, 2005 (p. 1 of 4-p. 4 of 4).

Ocean Optics Inc.; "USB2000 Miniature Fiber Optic Spectrometer" http://oceanoptics.com/products/usb2000.asp; Jun. 25, 2005 (p. 1 of 7-p. 6 of 7).

Ocean Optics Inc.; "S2000 Miniature Fiber Optic Spectrometer" http://oceanoptics.com/products/s2000.asp; Jun. 25, 2005 (p. 1 of 4-p. 4 of 4).

Greg Taft et al.; "Measurement of 10-fs Laser Pulses"; IEEE Journal of Selected Topics in Quantum Electronics, vol. 2, No. 3, Sep. 1996; pp. 575-585.

Daniel J. Kane et al.; "Simultaneous measurement of two ultrashort laser pulses from a single spectrogram in a single shot"; Optical Society of America; vol. 14, No. 4, Apr. 1997; pp. 935-943.

Peter J. Delfyett et al.; "Joint Time-Frequency Meaurements of Mode-Locked Semiconductor Diode Lasers and Dynamics Using Frequency-Resolved Optical Gating"; IEEE Journal of Quantum Electronics, vol. 35, No. 4, Apr. 1999; pp. 487-500.

David N. Fittinghoff et al.; "Frequency-Resolved Optical Gating Measurement of Ultrashort Pulses Passing Through a High Numerical Aperture Objective"; IEEE Journal of Quantum Electronics, vol. 35, No. 4, Apr. 1999; pp. 479-486.

Andrius Baltuska et al.; "Second-Harmonic Generation Frequency-Resolved Optical Gating in the Single-Cycle Regime"; IEEE Journal of Quantum Electronics, vol. 35, No. 4, Apr. 1999; pp. 459-478.

Hilary K. Eaton et al.; "Investigating Nonlinear Femtosecond Pulse Propagation with Frequency-Resolved Optical Gating"; IEEE Journal of Quantum Electronics, vol. 35, No. 4, Apr. 1999; pp. 451-458.

Craig W. Siders et al.; "Multipulse Interferometric Frequency-Resolved Optical Gating"; IEEE Journal of Quantum Electronics, vol. 35, No. 4, Apr. 1999; pp. 432-440.

(56) References Cited

OTHER PUBLICATIONS

Atsushi Yabushita et al.; "SHG FROG and XFROG methods for phase/intensity characterization of pulses propagated through an absorptive optical medium"; Optics Communications; Oct. 15, 2001; pp. 227-232.
Roger G.M.P. Koumans et al.; "Time-Resolved Optical Gating Based on Dispersive Propagation: A New Method to Characterize Optical Pulses"; IEEE Journal of Quantum Electronics, vol. 36, No. 2, Feb. 2000; pp. 137-144.
Daniel J. Kane et al.; "Convergence test for inversion of frequency-resolved optical gating spectrograms"; Optics Letters, vol. 25, No. 16, Aug. 15, 2000; pp. 1216-1218.
Juan L.A. Chilla et al.; "Analysis of a Method of Phase Measurement of Ultrashort Pulses in the Frequency Domain"; IEEE Journal of Quantum Electronics, vol. 27, No. 5, May 1991; pp. 1228-1235.
David N. Fittinghoff et al.; "Noise sensitivity in frequency-resolved optical-gating measurements of ultrashort pulses"; J. Opt. Soc. Am. B, vol. 12, No. 10, Oct. 1995; pp. 1955-1967.
Noriaki Tsurumachi et al.; "Interferometric observation of femtosecond free induction decay"; Optics Letters, vol. 19, No. 22, Nov. 15, 1994; pp. 1867-1869.
C. Radzewicz et al.; "A poor man's FROG"; Optics Communications, Dec. 15, 2000; pp. 329-333.
Christophe Dorrer et al.; "Accuracy criterion for ultrashort pulse characterization techniques: application to spectral phase interferometry for direct electric field reconstruction"; Appl. Phys. B 74, vol. 19, No. 5, May 2002 ; pp. 1019-1029.
Kazunori Naganuma et al; "General Method for Ultrashort Light Pulse Chirp Measurement"; IEEE Journal of Quantum Electronics, vol. 25, No. 5; Jun. 1989; pp. 1225-1233.
Y. Ding et al.; "Time-Domain Image Processing Using Dynamic Holography"; IEEE Journal of Selected Topics in Quantum Electronics, vol. 4, No. 2; Mar./Apr. 1998; pp. 332-341.
Chris Iaconis et al; "Self-Referencing Spectral Interferometry for Measuring Ultrashort Optical Pulses"; IEEE Journal of Quantum Electronics, vol. 35, No. 4; Apr. 1999; pp. 501-509.
Jung-Ho Chung et al.; "Ambiguity of Ultrashort Pulse Shapes Retrieved From the Intensity Autocorrelation and the Power Spectrum"; IEEE Journal on Selected Topics of Quantum Electronics, vol. 7, No. 4; Jul./Aug. 2001; pp. 656-666.
V. Kabelka et al.; "Time-frequency imaging of a single ultrashort light pulse from anularly resolved autocorrelation"; Optics Letters, vol. 20, No. 1; Jun. 1, 1995; pp. 1301-1303.
Paul R. Bolton et al.; "Propagation of intense, ultrashort laser pulses through metal vapor: refraction-limited behavior for single pulses"; J. Opt. Soc. Am. B, vol. 13, No. 2; Feb. 1996; pp. 336-346.
June-Koo Rhee et al.; "Real-time dispersion analyzer of femtosecond laser pulses with use of a spectrally and temporally resolved upconversion technique"; J. Opt. Soc. Am. B, vol. 13, No. 8; Aug. 1996; pp. 1780-1785.
Marco A. Krumbugel et al.; "Direct ultrashort-pulse intensity and phase retrieval by frequency-resolved optical gating and a computational neural network"; Optics Letters, vol. 21, No. 2; Jan. 15, 1996; pp. 143-145.
David N. Fittinghoff et al.; "Measurement of the intensity and phase of ultraweak, ultrashort laser pulses"; Optics Letters, vol. 21, No. 12; Jun. 15, 1996; pp. 884-886.
Alfred Kwok et al.; "Frequency-Resolved Optical Gating Using Cascaded Second-Order Nonlinearities"; Journal of Selected Topics in Quantum Electronics, vol. 4, No. 2; Mar./Apr. 1998; pp. 271-277.
Daniel J. Kane; "Real-Time Measurement of Ultrashort Laser Pulse Using Principal Component Generalized Projection"; IEEE Journal of Selected Topics in Quantum Electronics; vol. 4, No. 2; Mar./Apr. 1998; pp. 278-284.
Scott A. Diddams et al.; "Characterizing the Nonlinear Propagation of Femtosecond Pulses in Bulk Media"; IEEE Journal of Selected Topics in Quantum Electronics, vol. 4, No. 2; Mar./Apr. 1998; pp. 306-316.
Michael J. Stimson et al.; "Noisy-light correlation functions by frequency resolved optical gating"; J. Opt. Soc. Am. B, vol. 15, No. 2; Feb. 1998; pp. 505-514.
J. W. Nicholson et al.; "Full-field characterization of femtosecond pulses by spectrum and cross-correlation measurements"; Optics Letters, vol. 24, No. 23; Dec. 1, 1999; pp. 1774-1776.
F. Romstad et al.; "Measurement of Pulse Amplitude and Phase Distortion in a Semiconductor Optical Amplifier: from Pulse Compression to Breakup"; IEEE Photonics Technology Letters, vol. 12, No. 12; Dec. 2000; pp. 1674-1676.
Tzu-Ming Liu et al.; "Triple-optical autocorrelation for direct optical pulse-shape measurement"; Applied Physics Letters, vol. 81, No. 8; Aug. 19, 2002; pp. 1402-1404.
Yoshihiro Takagi et al.; "Multiple- and single-shot autocorrelator based on two-photon conductivity in semiconductors"; Optics Letters, vol. 17, No. 9; May 1, 1992; pp. 658-660.
Thomas J. Dunn et al.; "Experimental Determination of the Dynamics of a Molecular Nuclear Wave Packet via the Spectra of Spontaneous Emission"; Physical Review Letters, vol. 70, No. 22; May 31, 1993; pp. 3388-3391.
E.T.J. Nibbering et al.; "Spectral determination of the amplitude and the phase of intense ultrashort optical pulses"; J. Opt. Soc. Am. B, vol. 13, No. 2; Feb. 1996; pp. 317-329.
Victor Wong et al.; "Ultrashort-pulse characterization from dynamic spectrograms by iterative phase retrieval"; J. Opt. Soc. Am. B, vol. 14, No. 4; Apr. 1997; pp. 944-949.
Sarah M. Gallagher et al.; "Heterodyne detection of the complete electric field of femtosecond four-wave mixing signals"; J. Opt. Soc. Am. B, vol. 15, No. 8; Aug. 1998; pp. 2338-2345.
C. Dorrer et al.; "Single-shot real-time characterization of chirped-pulse amplification systems by spectral phase interferometry for direct electric-field reconstruction"; Optics Letters, vol. 24, No. 22; Nov. 15, 1999; pp. 1644-1646.
C. Dorrer; "Implementation of spectral phase interferometry for direct electric-field reconstruction with a simultaneously recorded reference interferogram"; Optics Letters, vol. 24, No. 21; Nov. 1, 1999; pp. 1532-1534.
C.Y. Chien et al.; "Single-shot chirped-pulse spectral interferometry used to measure the femtosecond ionization dynamics of air"; Optics Letters, vol. 25, No. 8; Apr. 15, 2000; pp. 578-580.
J.W. Nicholson et al.; "Unbalanced third-order correlations for full characterization of femtosecond pulses"; Optics Letters, vol. 25, No. 24; Dec. 15, 2000; pp. 1801-1803.
Sergey Yeremenko et al.; "Frequency-resolved pump-probe characterization of femtosecond infrared pulses"; Optics Letters, vol. 27, No. 13; Jul. 1, 2002; pp. 1171-1173.
J. M. Dudley, et al.; "Direct measurement of pusle distortion near the zero-disperson wavelength in an optical fiber by frequency-resolved optical gating"; Optics Letters, vol. 22, No. 7; Apr. 1, 1997; 457-459.
M.C. Chen et al.; "Freezing phase scheme for fast adaptive control and its application to characterization of femtosecond coherent optical pulses reflected from semiconductor saturable absorber mirrors"; J. Opt. Soc. Am. B, vol. 22, No. 5; May 2005; pp. 1134-1142.
I. Amat-Roldan et al.; "Measurement of electric field by interferometric spectral trace observation"; Optics Letters, vol. 30, No. 9; May 1, 2005; pp. 1063-1065.
I. Amat-Roldan et al.; "Starch-based second-harmonic-generated colinear frequency-resolved optical gating pulse characterization at the focal plane of a high-numerical-aperture lens"; Optics Letters, vol. 29, No. 19; Oct. 1, 2004; pp. 2282-2284.
Gregory D. Goodno et al.; "Ultrafast heterodyne-detected transient-grating spectroscopy using diffractive optics"; Optical Society of America, vol. 15, No. 6, Jun. 1998; pp. 1791-1794.
L. Misoguti et al.; "Generation of Broadband VUV Light Using Third-Order Cascaded Processes"; Physical Review Letters, vol. 87, No. 1, Jul. 2, 2001; pp. 013601-1-013601-4.
Jeffrey L. Krause et al.; "Creating and Detecting Shaped Rydberg Wave Packets"; Physical Review Letters, vol. 79, No. 25; Dec. 22, 1997; pp. 4978-4981.
S. Backus et al.; "16-fs, 1-μ J ultraviolet pulses generated by third-harmonic conversion in air"; Optics Letters, vol. 21, No. 9; May 1, 1996; pp. 665-667.

(56) References Cited

OTHER PUBLICATIONS

Julie A. Gruetzmacher et al.; "Few-cycle mid-infrared pulse generation, characterization and coherent propagation in optically dense media"; Review of Scientific Instruments, vol. 73, No. 6; Jun. 2002; pp. 2227-2236.
Peifang Tian et al.; "Ultrafast measurement of two-photon absorption by loss modulation"; Optics Letters, vol. 27, No. 18; Sep. 15, 2002; pp. 1634-1636.
Chantal Daniel et al.; "Deciphering the Reaction Dynamics Underlying Optimal Control Laser Fields"; Science Magazine, vol. 299; Jan. 24, 2003; pp. 536-539.
T. Witte et al.; "Controlling molecular ground-state dissociation by optimizing vibrational ladder climbing"; Journal of Chemical Physics, vol. 118, No. 5; Feb. 1, 2003; pp. 2021-2024.
R.J. Levis et al.; "Closing the Loop on Bond Selective Chemistry Using Tailored Strong Field Laser Pulses"; The Journal of Physical Chemistry, vol. 106, No. 27; Jul. 11, 2002; pp. 6427-6444.
Mustafa Demirplak et al.; "Optical control of molecular dynamics in a liquid"; Journal of Chemical Physics, vol. 116, No. 18; May 8, 2002; pp. 8028-8035.
L. Windhorn et al.; "Molecular dissociation by mid-IR femtosecond pulses"; Chemical Physics Letters 357, May 3, 2002; pp. 85-90.
Robert J. Levis et al.; "Selective Bond Dissociation and Rearrangement with Optimally Tailored, Strong-Field Laser Pulses"; Science Magazine, vol. 292; Apr. 27, 2001; pp. 709-713.
Julie A. Mueller et al.; "Competing isomeric product channels in the 193 nm photodissociation of 2-chloropropene and in the unimolecular dissociation of the 2-propenyl radical"; Journal of Chemical Physics, vol. 114, No. 10; Mar. 8, 2001; pp. 4505-4521.
A. Assion et al.; "Coherent control by a single phase shaped femtosecond laser pulse"; Chemical Physics Letters 259; Sep. 13, 1996; pp. 488-494.
Langchi Zhu et al.; "Coherent Laser Control of the Product Distribution Obtained in the Photoexcitation of HI"; Science Magazine, vol. 270; Oct. 6, 1995; pp. 77-80.
Yu-hui Chiu et al.; "Vibrational mode effects, scattering dynamics and energy disposal in reaction of C2H2 with methane"; J. Chem. Phys., vol. 102, No. 3; Jan. 15, 1995; pp. 1199-1216.
J.S. Keller et al.; "Selective bond fission in methyl mercaptan at 193 nm via radial derivative coupling between the 21A" and 11A" adiabatic electronic states"; J. Chem. Phys. vol. 96, No. 6; Mar. 15, 1992; pp. 4324-4329.
I. Bar et al.; "Mode-selective bond fission: Comparison between the photodissociation of HOD (0,0,1) and HOD (1,0,0)"; J. Chem. Phys. vol. 95, No. 5; Sep. 1, 1991; pp. 3341-3346.
Michael J. Bronikowski et al.; "Bond-specific chemistry: OD:OH product ratios for the reactions H+HOD(100) and H+HOD(001)"; J. Chem. Phys., vol. 95, No. 11; Dec. 1, 1991; pp. 8647-8648.
I. Bar et al.; "Direct observation of preferential bond fission by excitation of a vibrational fundamental: Photodissociation of HOD (0,0,1)"; J. Chem. Phys., vol. 93, No. 3; Aug. 1, 1990; pp. 2146-2148.
R.L. VanderWal et al.; "Selectively breaking the O—H bond in HOD"; J. Chem. Phys., vol. 92, No. 1; Jan. 1, 1990; pp. 803-805.
Neil Shafer et al.; "Isotope effect in the photodissociation of HDO at 157.5 nm"; J. Chem. Phys., vol. 90, No. 11; Jun. 1, 1989; pp. 6807-6808.
L.J. Butler et al.; "The electronic state-selective photodissociation of CH2BrI at 248, 210 and 193 nm"; J. Chem. Phys. vol. 86, No. 4; Feb. 15, 1997; pp. 2051-2074.
L.J. Butler et al.; "Bond selective photochemistry in CH2BrI through electronic excitation at 210 nm"; J. Chem. Phys., vol. 84, No. 7; Apr. 1, 1986; pp. 4104-4106.
David J. Tannor et al.; "Control of selectivity of chemical reaction via control of wave packet evolution"; J. Chem. Phys., vol. 83, No. 10; Nov. 15, 1985; pp. 5013-5018.
V.A. Apkarian; 'Comment on "Time-resolved laser induced harpoon reactions"'; J. Chem. Phys. vol. 106, No. 12; Mar. 22, 1997; pp. 5298-5299.
R.B. Vrijen et al.; "Limitations on quantum ladder climbing in complex systems"; Physical Review A, vol. 56, No. 3; Sep. 1997; pp. 2205-2212.
Stuart A. Rice; "Optical control of reactions"; Nature magazine, vol. 403; Feb. 3, 2000; pp. 496-497.
Richard N. Zare; "Laser Control of Chemical Reactions"; Science magazine, vol. 279; Mar. 20, 1998; pp. 1875-1879.
Herschel Rabitz et al.; "Whither the Future of Controlling Quantum Phenomena?"; Science magazine, vol. 288; May 5, 2000; pp. 824-828.
Stuart A. Rice; "Interfering for the good of a chemical reaction"; Nature magazine; vol. 409; Jan. 18, 2001; pp. 422-426.
Alois Renn et al.; "Multidimensional Holography by Persistent Spectral Hole Burning"; The Journal of Physical Chemistry A, vol. 106, No. 13; Apr. 4, 2002; pp. 3045-3060.
Allen J. Bard et al.; "Holy Grails in Chemistry"; American Chemical Society, vol. 28, No. 3; Mar. 1995.
Marcos Dantus; "Ultrafast Probing and Control of Molecular Dynamics: Beyond the Pump-Probe Method"; pp. 169-188. Kuhn & Weyh SRZ Sep. 4, 2001.
M.R. Fetterman et al.; "Propagation of Complex Laser Pulses in Optically Dense Media"; The American Physical Society, Physical Review Letters, vol. 82, No. 20, May 17, 1999; pp. 3984-3987.
D. Yelin et al.; "Adaptive femtosecond pulse compression"; Optics Letters, vol. 22, No. 23, Dec. 1, 1997; pp. 1793-1795.
A.V. Sokolov; "Subfemtosecond compression of periodic laser pulses"; Optics Letters, vol. 24, No. 17, Sep. 1, 1999; pp. 1248-1250.
H.S. Eisenberg et al.; "Phase Defects in Self-Focusing of Ultrashort Pulses"; Physical Review Letters, vol. 83, No. 3, Jul. 19, 1999; pp. 540-543.
Dai-Sik Kim et al.; "Femtosecond-pulse distortion in quantum wells"; Appl. Phys B 74, vol. 48. No. 24; Dec. 15, 1993; pp. 17902-17905.
Anthony P. Peirce et al.; "Optimal control of quantum-mechanical systems: Existence, numerical approximation and applications"; Physical Review A, vol. 37, No. 12; Jun. 15, 1988; pp. 4950-4964.
J.M. Geremia et al.; "Incorporating physical implementation concerns into closed loop quantum control experiments"; Journal of Chemical Physics, vol. 113, No. 24; Dec. 22, 2000; pp. 10841-10848.
Amichay Vardi et al.; "Laser catalysis with pulses"; Physical Review A, vol. 58, No. 2; Aug. 1998; pp. 1352-1360.
Kazuya Takasago et al.; "Evaluation of Femtosecond Pulse Shaping with Low-Loss Phase-Only Masks"; IEEE Journal of Selected Topics in Quantum Electronics, vol. 4, No. 2; Mar./Apr. 1998; pp. 346-352.
M.E. Fermann et al.; "Shaping of ultrashort optical pulses by using an integrated acousto-optic tunable filter"; Optics Letters, vol. 18, No. 18; Sep. 15, 1993; pp. 1505-1507.
V.L. da Silva et al.; "Nonlinear pulse shaping and causality"; Optics Letters, vol. 18, No. 8; Apr. 15, 1993; pp. 580-582.
E. Zeek et al.; "Adaptive pulse compression for transform-limited 15-fs high-energy pulse generation"; Optics Letters, vol. 25, No. 8; Apr. 15, 2000; pp. 587-589.
A. Apolonski et al.; "Controlling the Phase Evolution of Few-Cycle Light Pulses"; Physical Review Letters, vol. 85, No. 4; Jul. 24, 2000; pp. 740-743.
Christophe Dorrer et al.; "Phase Amplitude Coupling in Spectral Phase Modulation"; IEEE Journal of Selected Topics in Quantum Electronics, vol. 4, No. 2; Mar./Apr. 1998; pp. 342-345.
David J. Jones et al.; "Carrier-Envelope Phase Control of Femtosecond Mode-Locked Lasers and Direct Optical Frequency Synthesis"; Science magazine, vol. 288; Apr. 28, 2000; pp. 635-639.
Vladimir Kalosha et al.; "Generation of Single Dispersion Precompensated 1-fs Pulses by Shaped-Pulse Optimized High-Order Stimulated Raman Scattering"; Physical Review Letters, vol. 88, No. 10; Mar. 11, 2002; pp. 103901-1-13901-4.
Donna Strickland et al.; "Compression Of Amplified Chirped Optical Pulses"; Optics Communications; vol. 55, No. 6; Oct. 15, 1985; pp. 447-449.
H. Wang et al.; "Abstract—20-fs pulse shaping with a 512-element phase-only liquid crystal modulator"; IEEE Journal Of Selected Topics In Quantum Electronics; 7 (4): 718-727; Jul./Aug. 2001 (1 page).

(56) References Cited

OTHER PUBLICATIONS

L. Xu et al.; "Abstract—Programmable chirp compensation for 6-fs pulse generation with a prism-pair-formed pulse shaper"; IEEE Journal Of Quantum Electronics; 36 (8): 893-899; Aug. 2000 (1 page).
CVI Laser Corporation; "TNM-2 Negative Group Velocity Dispersion Mirrors"; www.cvilaser.com/ultra-fast; Jan. 13, 2002 (2 pages).
N. Karasawa et al.; "Optical pulse compression to 5.0 fs by by use only a spatial light modulator for phase compensation"; J. Opt. Soc. Am. B, vol. 18, No. 11; Nov. 2001; pp. 1742-1746.
C.P.J. Barty et al.; "Generation of 18-fs, multiiterawatt pulses by regenerative pulse shaping and chirped-pulse amplification"; Optics Letters, vol. 21, No. 9; May 1, 1996; pp. 668-670.
Marcos Dantus; GeneticAlgorithm-v4.nb to simulate an adaptive genetic algorithm;Oct. 2001; pp. 1-7.
M. Hacker et al.; "Iterative Fourier transform algorithm for phase-only pulse shaping"; Optics Express, vol. 9, No. 4, Aug. 13, 2001; pp. 191-199.
T. Tanabe et al.; "Compensation for a Transfer Function of a Regenerative Amplifier to Generate Accurately Shaped Ultrashort Pulses in Both the Amplitude and Phase"; IEE J. of Selected Topics in QUantum Elecronics, vol. 10, No. 1; Jan./Feb. 2004; pp. 221-228.
Yan, Y.J. et al.; "Electronic dephasing, vibrational relaxation, and solvent friction in molecular nonlinear optical line shapes"; J. Chems. Phys.; Oct. 15, 1988; pp. 5160-5176.
Weinacht, T.C. et al.; "Controlling the shape of a quantum wavefunction"; Nature, vol. 397; Jan. 1999; pp. 233-235.
Walowicz, K.A. et al.; "Multiphoton Intrapulse Interference 1: Control of Multiphoton Processes in Condensed Phases"; J. Phys. Chem A 106 (41); Oct. 17, 2002; pp. 9369-9373.
Clara et al.; "Femtoscond laser mass spectroscopy of ferrocenes: Photochemical stabilization by bridged cyclopentadienyl rings?"; International Journal of Mass Spectrometry, Elsevier Science Publishers, vol. 203, No. 1-3; Dec. 26, 2000; pp. 71-81.
Bucksbaum, Philip; "An atomic dimmer switch"; Nature; Nov. 19, 1998; vol. 396; pp. 217-219.
Leibfried, D. et al.; "Quantum information with trapped ions at NIST"; Journal of Modern Optics; vol. 50, No. 6/7; Apr.-May 2003; pp. 1115-1129.
Lozovoy, V.V.; "Multiphoton intrapulse interference. II. Control of two- and three-photon laser induced flurorescence with shaped pulses"; J. Chem. Phys. 118 (7); Feb. 15, 2005; pp. 3187-3196.
Paye, J.; "How to Measure the Amplitude and Phase of an Ultrashort Light Pulse with an Autocorrelator and a Spectrometer"; IEEE Journal of Quantum Electronics, vol. 30, No. 11; Nov. 1994; pp. 2693-2697.
Cumpston,B.H. et al.; "Two-photon polymerization initiators for three-dimensional optical data storage and microfabrication"; Letters to Nature; vol. 398; Mar. 4, 1999; pp. 51-54.
Postnikova, B.J. et al.; "Towards nanoscale three-dimensional fabrication using two-photon initiated polymerization and near-field excitation"; Microelectron. Eng. 69 (2-4); Sep. 2003; pp. 459-465.
Sun, H.B. et al.; "Two-photon laser precision microfabrication and its applications to micronano devices and systems"; J. Lightwave Technol. 21(3); Mar. 2003; pp. 624-633.
Kane, Daniel J. et al.; "Single-shot measurement of the intensity and phase of an arbitrary ultrashort pulse by using frequency-resolved optical gating"; Optics Letters, vol. 18, No. 10; May 15, 1993; pp. 823-825.
Kane, Daniel J. et al.; "Single-shot measurement of the intensity and phase of a femtosecond UV laser pulse with frequency-resolved optical gating"; Optics Letters, vol. 19, No. 14; Jul. 15, 1994; pp. 1061-1063.
Clement, Tracy Sharp et al.; "Single-Shot measurement of the amplitude and phase of ultrashort laser pulses in the violet"; Optics Letters, vol. 20, No. 1; Jan. 1, 1995; pp. 70-72.
Kohler, Bern et al.; "Phase and intensity characterization of femtosecond pulses from a chirped-pulse amplifier by frequency-resolved optical gating"; Optics Letters, vol. 20, No. 5; Mar. 1, 1995; pp. 483-485.
Sweetser, John N. et al.; "Transient-grating frequency-resolved optical gating"; Optics Letters, vol. 22, No. 8; Apr. 15, 1997; pp. 519-521.
Trebino, Rick et al.; "Measuring ultrashort laser pulses in the time-frequency domain using frequency-resolved optical gating"; Rev. Sci. Instrum. 68 (9); Sep. 1997; pp. 3277-3295.
Dudley, John M. et al.; "Complete Characterization of Ultrashort Pulse Sources at 1550 nm"; IEEE Journal of Quantum Electronics, vol. 35, No. 4; Apr. 1999; pp. 441-450.
Trebino, Rick et al.; "The Dilemma of Ultrashort-Laser-Pulse Intensity and Phase Measurement and Applications"; IEEE Journal of Quantum Electronics, vol. 35, No. 4; Apr. 1999; pp. 418-420.
Cormack, I.G. et al.; "Practical measurement of femtosecond optical pulses using time-resolved optical gating"; Optics Communications 194; Jul. 15, 2001; pp. 415-424.
Chu, K.C. et al.; "Direct measurement of the spectral phase of femtosecond pulses"; Optics Letters, vol. 20, No. 8; Apr. 15, 1995; pp. 904-906.
Sullivan, A. et al.; "Quantitative investigation of optical phase-measuring techniques for ultrashort pulse lasers"; J. Opt. Soc. Am. B, vol. 13, No. 9; Sep. 1996; pp. 1965-1978.
Baltuska, Andrius et al.; "Amplitude and phase characterization of 4.5-fs pulses by frequency-resolved optical gating"; Optics Letters, vol. 23, No. 18; Sep. 15, 1998; pp. 1474-1476.
Nicholson, J.W. et al; "Noise sensitivity and accuracy of femtosecond pulse retrieval by phase and intensity from correlation and spectrum only (PICASO)"; J. Opt. Soc. Am. B; vol. 19, No. 2; Feb. 2002; pp. 330-339.
Dorrer, Christophe et al.; "Precision and consistency criteria in spectral phase interferometry for direct electric-field reconstruction"; J. Opt. Soc. Am. B, vol. 19, No. 5; May 2002; pp. 1030-1038.
Walmsley, Ian A. et al.; "Characterization of the electric field of ultrashort optical pulses"; J. Opt. Soc. Am. B., vol. 13, No. 11; Nov. 1996; pp. 2453-2463.
Lange, H. Rudiger et al.; "Reconstruction of the Time Profile of Femtosecond Laser Pulses through Cross-Phase Modulation"; IEEE Journal of Selected Topics in Quantum Electronics, vol. 4, No. 2; Mar./Apr. 1998; pp. 295-300.
Iaconis, C. et al.; "Direct Interferometric Techniques for Characterizing Ultrashort Optical Pulses"; IEEE Journal of Selected Topics in Quantum Electronics, vol. 4, No. 2; Mar./Apr. 1998; pp. 285-294.
Iaconis, C. et al.; "Spectral phase interferometry for direct electric-field reconstruction of ultrashort optical pulses"; Optics Letters, vol. 23, No. 10, May 15, 1998; pp. 792-794.
Dietrich, P. et al.; "Determining the absolute carrier phase of a few-cycle laser pulse"; Optics Letters, vol. 25, No. 1, Jan. 1, 2000; pp. 16-18.
Reid, D.T. et al.; "Amplitude and phase measurement of mid-infrared femtosecond pulses by using cross-correlation frequency-resolved optical gating"; Optics Letters, vol. 25, No. 19, Oct. 1, 2000; pp. 1478-1480.
Michelmann, K. et al.; "Measurement of the Page function of an ultrashort laser pulse"; Optics Communications; Oct. 15, 2001, pp. 163-170.
Gallmann, L. et al.; "Spatially resolved amplitude and phase characterization of femtosecond optical pulses"; Optics Letters, vol. 26, No. 2; Jan. 15, 2001; pp. 96-98.
Kakehata, Masayuki et al.; "Single-shot measurement of carrier-envelope phase changes by spectral interferometry"; Optics Letters, vol. 26, No. 18; Sep. 15, 2001; pp. 1436-1438.
Geindre, J.P. et al.; "Single-shot spectral interferometry with chirped pulses"; Optics Letters, vol. 26, No. 20; Oct. 15, 2001; pp. 1612-1614.
Dorrer, C. et al.; "Direct space-time characterization of the electric fields of ultrashort optical pulses"; Optics Letters, vol. 27, No. 7; Apr. 1, 2002; pp. 548-550.
Trebino, R. et al; "Measuring Ultrashort Laser Pulses Just Got a Lot Easier!"; Optics & Photonics News; Jun. 2001; pp. 22-25.
Spielmann, C. et al.; "Ultrabroadband Femtosecond Lasers"; IEEE Journal of Quantum Electronics; vol. 30, No. 4; Apr. 1994; pp. 1100-1114.
Yelin, D. et al.; "Laser scanning third-harmonic-generation microscopy in biology"; Optics Express; vol. 5, No. 8; Oct. 11, 1999; pp. 169-175.

(56) References Cited

OTHER PUBLICATIONS

Zipfel, W.R. et al; "Nonlinear magic: multiphoton microscopy in the biosciences"; Natire Biotechnology, 121 (11); Nov. 2003; pp. 1369-1377.
Larson, D.R. et al.; "Water soluble quantum dots for multiphoton imaging in vivo"; Science 300: May 30, 2003; pp. 1434-1436.
Assion, A. et al; "Control of Chemical Reactions by Feedback-Optimized Phase-Shaped Femtosecond Laser Pulses"; Science Magazine, vol. 282; Oct. 30, 1998; pp. 919-922.
Warren, W.S.; "Chemistry with photons"; Science, vol. 262; Nov. 12, 1993; pp. 1008-1009.
Chilla, Juan L.A. et al.; "Direct determination of the amplitude and the phase of femtosecond light pulses"; Optics Letters; vol. 16, No. 1; Jan. 1, 1991; pp. 39-41.
Kim, D.S. et al; "Femtosecond pulse distortion in GaAs quantum wells and its effect on pump-probe or four-wave-mixing experiments"; Physical Review B; vol. 50, No. 24; Dec. 15, 1994; pp. 18240-18249.
Kaindl, Robert A. et al.; "Generation, shaping, and characterization of intense femtosecond pulses tunable from 3 to 20 μm"; J. Opt. Soc. Am. B; vol. 17, No. 12; Dec. 2000; pp. 2085-2094.
Panasenko, Dmitriy et al.; "Single-shot sonogram generation for femtosecond laser pulse diagnostics by use of two-photon absorbtion in a silicon CCD camera"; Optics Letters; vol. 27, No. 16; Aug. 15, 2002; pp. 1475-1477.
Baltuska, Andrius et al.; "Visible pulse compression to 4 fs by optical parametric amplification and programmable dispersion control"; Optics Letters; vol. 27, No. 5; Mar. 1, 2002; pp. 306-308.
Weiner, Andrew M. et al.; "Femtosecond Pulse Shaping for Synthesis, Processing and Time-to-Space Conversion of Ultrafast Optical Waveforms"; IEEE Journal of Selected Topics in Quantum Electronics; vol. 4, No. 2; Mar./Apr. 1998; pp. 317-331.
Hillegas, C.W. et al.; "Femtosecond laser pulse shaping by use of microsecond radio-frequency pulses"; Optics Letters; vol. 19, No. 10; May 15, 1994; pp. 737-739.
Weiner, A.M. et al.; "Programmable Shaping of Femtosecond Optical Pulses by Use of 128-Element Liquid Crystal Phase Modulator"; IEEE Journal of Quantum Electronics; vol. 28, No. 4; Apr. 1992; pp. 908-920.
Matuschek. N.; "Back-side-coated chirped mirrors with ultra-smooth broadband dispersion characteristics"; Applied Physics B 71; Sep. 6, 2000; pp. 509-522.
Ding. Y.; "Femtosecond pulse shaping by dynamic holograms in photorefractive multiple quantum wells"; Optics Letters; vol. 22, No. 10; May 15, 1997; pp. 718-720.
Imeshev, G. et al. "Engineerable femtosecond pulse shaping by second-harmonic generation with Fourier synthetic quasi-phase-matching gratings"; Optics Letters; vol. 23, No. 11; Jun. 1, 1998; pp. 864-866.
Bhattacharya, N. et al.; "Implementation of Quantum Search Algorithm using Classical Fourier Optics"; Phys. Rev. Lett.; vol. 88. No. 13; Apr. 1, 2002; p. 137901-1-137901-4.
Hornung, Thomas et al.; "Adapting optimum control theory and using learning loops to provide experimentally feasible shaping mask patterns"; Journal of Chemical Physics; vol. 115, No. 7; Aug. 15, 2001; pp. 3105-3111.
Meshulach, D. et al.; "Adaptive real-time femtosecond pulse shaping"; J. Opt. Soc. Am. B; vol. 15, No. 5; May 1998; pp. 1615-1619.
Nisoli, M. et al.; "Generation Of High Energy 10 fs Pulses By A New Pulse Compression Technique;" Appl. Phys. Lett. vol. 68, No. 20, May 13, 1996; pp. 2793-2795.
Comstock et al.; "Multiphoton intrapulse interference 6; binary phase shaping"; Optics Express Opt. Soc. America USA, vol. 12, No. 6, Mar. 22, 2004; pp. 1061-1066.
Hu et al.; "A New Nonlinear Optical Crystal-BaAlBO3F2(BABF)"; Japanese Journal of Applied Physics, vol. 41, No. 10B, Part 2, Oct. 15, 2002; pp. L1131-L1133.
Weiner et al.; "Shaping of femtosecond pulses using phase-only filters designed by simulated annealing"; Journal of the Optical Society of America A (Optics and Image Science) USA, vol. 10, No. 5, May 1993; pp. 1112-1120.
Dela Cruz, J. et al., "Use of coherent control methods through scattering biological tissue to achieve functional imaging," PNAS, vol. 101, No. 49, Dec. 7, 2004, pp. 16996-17001.
Weiner, A.M. et al. "Generation of terahertz-rate trains of femtosecond pulses by phase-only filtering," Optics Letters, vol. 15, No. 1, Jan. 1, 1990, pp. 51-53.
M. Hacker et al., "Iterative Fourier Transform Algorithm for Phase-Only Pulse Shaping", Optics Express, vol. 9, No. 4, Aug. 13, 2001, pp. 191-199.
R. Bartels et al., "Shaped-Pulse Optimization of Coherent Emission of High-Harmonic Soft X-Rays", 2000 Macmillan Magazines Ltd., Nature, vol. 406. Jul. 13, 2000, pp. 164-166.
B. Xu, Y. Coello, V.Lozovoy, D. Harris; M. Dantus, Pulse Shaping of Octave Spanning Femtosecond Laser Pulses, Optics Express, vol. 14, No. 22, Oct. 30, 2006, six pages.
F.M. Reinert, M. Ninck, W. Lüthy, T. Feurer, Shaping a Femtosecond Pulse with a Programmable Thermo-Optically Driven Phase Modulator, Optics Express, vol. 15, No. 7, Apr. 2, 2007, six pages.
H. Miao, A. Weiner, C. Langrock, R. Roussev, M. Fejer, Sensing and Compensation of Femtosecond Waveform Distortion Induced by All-Order Polarization Mode Dispersion at Selected Polarization States, Optics Letters, vol. 32, No. 4, Feb. 15, 2007, pp. 424-426.
Sato, Masamichi, et al.; "Adaptive Pulse Shaping of Femtosecond Laser Pulses in Amplitude and Phase Through a Single-Mode Fiber by Referring to Frequency-Resolved Optical Gating Patterns;" Jpn. J. Appl. Phys., vol. 41 (2002); Part 1 No. 6A, Jun. 2002; XP-002436366; pp. 3704-3709.
Gee, S., et al.; "Ultrashort Pulse Generation by Intracavity Spectral Shaping and Phase Compensation of External-Cavity Modelocked Semiconductor Lasers;" IEEE Journal of Quantum Electronics, vol. 36, No. 9, Sep. 2000; XP-002462407; pp. 1035-1040.
Scaffidi, J., et al.; "Spatial and Temporal Dependence of Interspark Interactions in Femtosecond-Nanosecond Dual-Pulse Laser-Induced Breakdown Spectroscopy;" Applied Optics, vol. 43, No. 27, Sep. 20, 2004; XP-002462408; pp. 5243-5250.
Kroner, D. et al.; "Asymmetric Laser Excitation in Chiral Molecules: Quantum Simulations for a Proposed Experiment, Chemical Physics Letters;" Elsevier Netherland, vol. 372, No. 1-2, Apr. 22, 2003, pp. 242-248.
Hoki, K. et al.; "Locally Designed Pulse Shaping for Selective Preparation of Enantiomers fromtheir Racemate;" Journal of Chemical Physics, New York, NY, US, vol. 114, No. 4, Jan. 22, 2001, pp. 1575-1581.
Bychkov S. S. et al.; "Laser Synthesis of Chiral Molecules in Isotropic Racemic Media;" Journal of Experimental and Theoretical Physics, Nauka/Interperiodica, MO, vol. 93, No. 1, Jul. 1, 2001, pp. 24-32.
Hoki, K. et al.; "Selective Preparation of Enantiometers from a Racemate by Laser Pulses: Model Simulation for Oriented Atropisomers with Coupled Rotations and Torsions;" Chemical Physics Elsevier Netherlands, vol. 267, No. 1-3, Jun. 1, 2001, pp. 59-79.
Brixner T., et al.; "Quantum Control by Ultrafast Polarization Shaping;" Phys Rev Lett., vol. 92, No. 20, May 21, 2004, pp. 208301-1.
Thanopulos I. et al.; Laser-Driven Coherent Manipulation of Molecular Chirality, Chemical Physics Letters Elsevier Netherlands, vol. 390, No. 1-3, May 21, 2004, pp. 228-235.
Atabek, O., et al.; Intense Laser Control of the Chemical Bond, Theochem Elsevier Netherlands, vol. 493, Dec. 15, 1999, pp. 89-101.
Pelfang Tian et al.; "Femtosecond Phase-Coherent Two-Dimensional Spectroscopy;" Science American Assoc. Adv. Sci. USA, vol. 300, No. 5625, Jun. 6, 2003, pp. 1553-1555.
Motzkus, M.; "Open and Loop Control of Complex Molecules with Shaped fs Pulses;" 2003 International Conference Physics and Control, Proceedings (Cat. No. 03EX708), IEEE Piscataway, NJ, USA, vol. 3, 2003, p. 746.
Ma R., et al.; "Intense Femtosecond Laser Field-Induced Coulomb Fragmentation of C2H4;" International Journal of Mass Spectrometry, Elsevier, Amsterdam, NL, vol. 242, No. 1, Mar. 15, 2005, pp. 43-48.

(56) References Cited

OTHER PUBLICATIONS

Wu, C. et al.; "Mass and Photoelectron Spectrometer for Studying Field-Induced Ionization of Molecules;" International Journal of Mass Spectrometry, Elsevier Science Publishers, Amsterdam, NL, vol. 216, No. 3, May 15, 2002, pp. 249-255.
Chen, Jr. et al.; "Femtosecond Laser-Induced Dissociative Ionization and Coulomb Explosion of Ethanol;" International Journal of Mass Spectrometry, Elsevier, Amsterdam, NL, vol. 241, No. 1, Feb. 15, 2005, pp. 25-29.
Wu, Chengyin et al.; "Laser-Induced Dissociation and Explosion of Methane and Methanol;" J. Phys. B. At. Mol. Opt. Phys; Journal of Physics B: Atomic, Molecular and Optical Physics, Jun. 14, 2002, vol. 35, No. 11, pp. 2575-2582.
Yu, Huang et al.; "Application of Adaptive Feedback Loop for Ultra-Violet Femtosecond Pulse Shaper Control;" Optics Express Opt. Soc. America USA, vol. 14, No. 21, Oct. 2006.
Roth, M. et al.; "Acousto-Optic Femtosecond Pulse Shaping in the Ultraviolet, Lasers and Electro-Optics;" (Cleo). Conference in Baltimore, MD, USA, Piscataway, NJ, USA, IEEE, May 22-27, 2005, pp. 2244-2246.
Roth, M. et al.; "Acousto-Optical Shaping of Ultraviolet Femtosecond Pulses;" Applied Physics B; Lasers and Optics, Springer-Verlag, BE, vol. 80, No. 4-5, Apr. 1, 2005, pp. 441-444.
Akozbek, N. et al.; "Continuum Generation Of The Third-Harmonic Pulse Generated By An Intense Femtosecond IR Laser Pulse In Air;" Applied Physics B (Lasers and Optics), Springer-Verlag, Germany, vol. B77, No. 2-3, XP002476096; Sep. 2003; pp. 177-183.
Xu, B. et al.; "Pulse Shaping Of Octave Spanning Femtosecond Laser Pulses;" Optics Express Opt. Soc. America USA, vol. 14, No. 22, XP002476097; Oct. 30, 2006; pp. 10939-10944.
Ting, A. et al.; "Remote Atmospheric Breakdown For Standoff Detection By Using An Intense Short Laser Pulse;" Applied Optics. Opt. Soc. America USA, vol. 44, No. 25, XP002476098; Sep. 1, 2005; pp. 5315-5320.
Pastirk, I. et al.; "Multidimensional Analytical Method Based On Binary Phase Shaping Of Femtosecond Pulses;" J. Phys. Chem. A, vol. 109, No. 11, Feb. 23, 2005; pp. 2413-2416.
Pastirk, I. et al.; "Quantum Control Of the Yield Of A Chemical Reaction;" J. Chem. Phys., vol. 108, No. 11, Mar. 15, 1998; pp. 4375-4378.
Pastirk, I. et al.; "Femtosecond Ground State Dynamics Of Gas Phase $N^2O^4$ and $NO^2$;" Chemical Physics Letters, vol. 349, Nov. 23, 2001; pp. 71-78.
Pastirk, I. et al.: "Control And Characterization Of Intramolecular Dynamics With Chirped Femtosecond Three-Pulse Four-Wave Mixing;" J. Phys. Chem. A, vol. 103, No. 49, Sep. 23, 1999; pp. 10226-10236.
Pastirk, I. et al.; "Femtosecond Photon Echo And Virtual Echo Measurements Of The Vibronic And Vibrational Coherence Relaxation Times Of Iodine Vapor;" Chemical Physics Letters, vol. 333, Jan. 5, 2001; pp. 76-82.
Dantus, Marcos; "Ahmed Zewail, Nobel Laureate In Chemistry;" European Photochemistry Association (EPA) Newsletter, No. 69, Jul. 2000; 5 pages.
Brown, E. J. et al.; "Femtosecond Transient-Grating Techniques: Population and Coherence Dynamics Involving Ground And Excited States;" J. Chem. Phys., vol. 110, No. 12, Mar. 22, 1999; pp. 5772-5788.
Brown, E. J. et al.; "Population And Coherence Control By Three-Pulse Four-Wave Mixing;" J. Chem. Phys., vol. 111, No. 9, Sep. 1, 1999; pp. 3779-3782.
Comstock, M. et al.; "Femtosecond Photon Echo Measurements of Electronic Coherence Relaxation Between The $X(^1E_g+)$ and $B(^3II_{0u}+)$ states of $I_2$ In the Presence Of He, Ar, $N_2$, $O_2$, $C_3H_8$;" J. Chem. Phys., vol. 119, No. 13, Oct. 1, 2003; pp. 6546-6553.
Dela Cruz, J. M. et al.; "Quantitative Mass Spectrometric Identification Of Isomers Applying Coherent Laser Control;" J. Phys. Chem. A, vol. 109, No. 38, Sep. 2005.
Rosker, M. J. et al.; "Femtosecond Clocking Of The Chemical Bond;" Science, vol. 241, Sep. 2, 1988; pp. 1200-1202.
Rosker, M. J. et al.; "Femtosecond Real-Time Probing Of Reactions. I. The Technique;" J. Chem. Phys., vol. 89, No. 10, Nov. 15, 1988; pp. 6113-6127.
Zhang, Q. et al.; "Femtosecond Dynamics Of Photoinduced Molecular Detachment From Halogenated Alkanes. II. Asynchronous Concerted Elimination of $I_2$ From $CH_2I_2$;" J. Chem. Phys., vol. 109, No. 11, Sep. 15, 1998; pp. 4428-4442.
Grimberg, B. I. et al.; "Ultrafast Nonlinear Spectroscopic Techniques In The Gas Phase And Their Density Matrix Representation;" J. Phys. Chem. A, vol. 106, No. 5, Feb. 7, 2002; pp. 697-718.
Gross, P. et al.; "Femtosecond Photoassociation: Coherence And Implications For Control In Bimolecular Reactions;" J. Chem. Phys., vol. 106, No. 19, May 15, 1997; pp. 8013-8021.
Marvet, Una et al.; "Femtosecond Dynamics Of Photoinduced Molecular Detachment From Halogenated Alkanes. I. Transition State Dynamics And Product Channel Coherence;" J. Chem. Phys., vol. 109, No. 11, Sep. 15, 1998.
Marvet, Una et al.; "Femtosecond Observation Of A Concerted Chemical Reaction;" Chemical Physics Letters, 256, Jun. 21, 1996; pp. 57-62.
Marvet, Una et al.; "Femtosecond Photoassociation Spectroscopy: Coherent Bond Formation;" Chemical Physics Letters, 245, Nov. 3, 1995; pp. 393-399.
Dantus, Marcos et al.; "Femtosecond Laser Observations Of Molecular Vibration And Rotation;" Nature, vol. 343, Feb. 22, 1990; pp. 737-739.
Dantus, Marcos et al.; "Femtosecond Real-Time Probing of Reactions. V. The reaction of IHgI;" J. Chem. Phys., vol. 91, No. 12, Dec. 15, 1989; pp. 7437-7450.
Dantus, Marcos et al.; "Femtosecond Real-Time Probing Of Reactions. II. The Dissociation Reaction Of ICN;" J. Chem. Phys., vol. 89, No. 10, Nov. 15, 1988; pp. 6128-6140.
Dantus, Marcos et al.; "Real-Time Femtosecond Probing Of "Transition States" In Chemical Reactions;" J. Chem. Phys., vol. 87, No. 4, Aug. 15, 1987; pp. 2395-2397.
Lozovoy, V. V. et al.; "Photon Echo Pulse Sequences With Femtosecond Shaped Laser Pulses As A Vehicle For Molecule-Based Quantum Computation;" J. Chemical Physics Letters 351, Jan. 10, 2002; pp. 213-221.
Lozovoy, V. V. et al.: "Multiphoton Intrapulse Interference. IV. Ultrashort Laser Pulse Spectral Phase Characterization And Compensation;" Optics Letters, vol. 29, No. 7, Apr. 1, 2004; pp. 775-777.
Lozovoy, V. V. et al.; "Femtosecond Spectrally Dispersed Three-Pulse Four-Wave Mixing: The Role Of Sequence And Chirp In Controlling Intramolecular Dynamics;" J. Raman Spectroscopy 31, 2000; pp. 41-49.
Dantus, Marcos et al.; "Stereoisomer Recognition By MS With Shaped Laser Pulses;" American Chemical Society, Abstracts of Paper at the National Meeting, American Chemical Society, Washington, D.C., US, vol. 231, XP009082814, Mar. 26, 2006; pp. 1-ANYL (the whole document).
Dela Cruz, J. M. et al.; "Quantitative Mass Spectrometric Identification Of Isomers Applying Coherent Laser Control;" J. Phys. Chem. A, vol. 109, No. 38, XP002431289, Sep. 29, 2005; pp. 8447-8450.
Dela Cruz, J. M. et al.; "Multidimensional Analysis With Shaped Femtosecond Pulses: Identification Of Conformational And Geometric Isomers And Mixtures Using Mass Spectrometry;" American Chemical Society, Abstracts of Paper, at the National Meeting, American Chemical Society, Washington, DC, US, vol. 230, XP009082815, Aug. 28, 2005; p. U418 (the whole document).
Lozovoy, V. V. et al.; "Spectral Phase Optimization Of Femtosecond Laser Pulses For Narrow-Band, Low-Background Nonlinear Spectroscopy;" Optics Express, vol. 13, No. 26, Dec. 26, 2005; pp. 10882-10887.
Xu, B et al.; "Quantitative Investigation Of The Multiphoton Intrapuse Interference Phase Scan Method For Simultaneous Phase Measurement And Compensation Of Femtosecond Laser Pulses;" J. Opt. Soc. Am. B, vol. 23, No. 4, Apr. 2006; pp. 750-759.
Gunaratne, T. et al.; "Influence Of Bandwidth And Phase Shaping On Laser Induced Breakdown Spectroscopy With Ultrashort Laser Pulses;" Chemical Physics Letters 423, Apr. 3, 2006; pp. 197-201.

(56) References Cited

OTHER PUBLICATIONS

Dela Cruz, J. M. et al.; "Coherent Control Improves Biomedical Imaging With Ultrashort Shaped Pulses;" Journal of Photochemistry and Photobiology A: Chemistry 180, Mar. 2006; pp. 307-313.
Ogawa et al, Dependence of the Laser Two-Photon Ionization Process in Solution on the Laser Pulse Width, Analytical Chemistry, vol. 73, Mar. 20, 2001, pp. 2066-2069.
Baltuška, Andrius et al.; "Visible Pulse Compression To 4 fs By Optical Parametric Amplification And Programmable Dispersion Control;" Optics Letters, vol. 27, No. 5, Mar. 1, 2002, pp. 306-308.
"BNS Liquid Crystal Solutions Spatial Light Modulators 1 x 12,288 Linear Series," brochure, Apr. 2006, Boulder Nonlinear Systems, Inc., pp. 1-4.
"Shape Your Pulses. Control Your Experiment." advertisement, Laser Focus World, (Dec. 1997) p. 26, CRI, Inc.
A. Pe're et al.; Optical Code-Division Multiple Access Using Broad-Band Parametrically Generated Light; J. of Lightwave Tech.; vol. 22, No. 6; Jun. 2004; pp. 1463-1471.
Allison Albrecht Ferro et al.; "Complete femtosecond linear free induction decay, Fourier algorithm for dispersion relations and accuracy of the rotating wave approximation"; Journal of Chemical Physics, vol. 114, No. 10; Mar. 8, 2001; pp. 4649-4656.
Aviv Circular Dichroism Spectrometer, Model 400, Aviv Biomedical, Inc., http://www.avivbiomedical.com, Nov. 29, 2006; 2 pages.
B. Natarajan et al.; "Abstract—Innovative pulse shaping for high-performance wireless TDMA"; IEEE Communications Letters; 5 (9): 372-374; Sep. 2001 (1 page).
Barnes, Wiliam L. et al.; "Surface Plasmon Subwavelength Optics;" Nature, vol. 424, Aug. 14, 2003; pp. 824-830.
Barry, Liam P., et al., "A High-Speed Optical Star Network Using TDMA and All-Optical Demultiplexing Techniques", IEEE Journal on Selected Areas in Communications, vol. 14, No. 5, (Jun. 1996), pp. 1030-1038.
Bender, Daniel A., et al., "Modified spectrum autointerferometric correlation (MOSAIC) for single-shot pulse characterization," Optics Letters, vol. 32, No. 19 (Oct. 1, 2007) Optical Society of America, pp. 2822-2824.
Brattke, S. et al.; "Generation of Photon Number States on Demand via Cavity Quantum Electrodynamics"; Phys. Rev. Lett.; vol. 86; Apr. 16, 2001; pp. 3534-3537.
Brixner, T., et al., "Adaptive Shaping of Femtosecond Polarization Profiles," J. Opt. Soc. Am. B. vol. 20, No. 5, May 2003; pp. 878-881.
Brixner, T., et al., "Femtosecond Polarlization Pulse Shaping," Optics Letters, vol. 26, No. 8, Apr. 15, 2001; pp. 557-559.
D. Lalovic et al.; "Quantum mechanics in terms of non-negative smoothed Wigner functions"; Physical Review A, vol. 46, No. 3; Aug. 1, 1992; pp. 1206-1212.
Dantus, Marcos, et al., "MIIPS characterizes and corrects femtosecond pulses," Ultrafast Optical Systems, Laser Focus World, (May 2007) XP001539450, 4 pages.
David C. Clary; "Quantum Theory of Chemical Reaction Dynamics"; Science, vol. 279, Mar. 20, 1998; p. 1879.
Delfyett, Peter J., et al., "High-Power Ultrafast Laser Diodes", IEEE Journal of Quantum Electronics, vol. 28, No. 10, (Oct. 1992), pp. 2203-2219.
Dreischuh, A., Experimental Demonstraction of Pulse Shaping and Shortening by Spatial Filtering of an Induced-Phase-Modulated Probe Wave, IEEE Journal of Quantum Electronics, vol. 33, No. 3, (Mar. 1997), pp. 329-335.
Drexler W. et al.; "In vivo ultrahigh-resolution optical coherence tomography"; Optics Letters; vol. 24, No. 17; Sep. 1, 1999; pp. 1221-1223.
Dugan, M.A., et al., "High-resolution acousto-optic shaping of unamplified and amplified femtosecond laser pulses", J. Opt. Soc. Am. B, vol. 14, No. 9, (Sep. 1997), pp. 2348-2358, Optical Society of America.
Efimov, A., et al., "Programmable shaping of ultrabroad-bandwidth pulses from a Ti:sapphire laser", Journal B/vol. 12, No. 10 (Oct. 1995) pp. 1968-1980, Optical Society of America.
Fermann, M.E., et al., "Additive-pulse-compression mode locking of a neodymium fiber laser", Optics Letters, vol. 16, No. 4, (Feb. 15, 1991), Optical Society of America.
Fetterman, et al., "Ultrafast pulse shaping: amplification and characterization", Optics Express, vol. 3, No. 10, (Nov. 9, 1998), pp. 366-375.
Fork, R.L., et al., "Compression of optical pulses to six femtoseconds by using cubic phase compensation", Optics Letters, (Jul. 1987), vol. 12, No. 7, Optical Society of America.
Galler, A., et al., "Pulse shaper assisted short laser pulse characterization," Applied Physics B90, Lasers and Optics (Jan. 2008) pp. 427-430.
Gallmann, L., et al., "Characterization of sub-6-fs optical pulses with spectral phase interferometry for direct electric-field reconstruction," Optics Letters, vol. 24, No. 18 (Sep. 15, 1999) p. 13140-1316.
Goswami, D.; "Ultrafast Pulse Shaping Approaches to Quantum Computing"; Indian Institute of Technology; Dec. 24, 2003 (8 pages).
Gunn, J M et al: "Polarization and phase control of remote surface-plasmon-mediated two-photo-induced emission and waveguiding" Nano Letters American Chem. Soc. USA, vol. 6, No. 12, Aug. 2006.
Haner, M., et al., "Generation of programmable, picosecond-resolution shaped laser pulses by fiber-grating pulse compression", Optics Letters, vol. 12, No. 6, (Jun. 1987), pp. 398-400, Optical Society of America.
Hanna, Sherif F. et al.; "Electronic-resonance-enhanced coherent anti-Stokes Raman spectroscopy of nitric oxide"; Applied Physics Letters; vol. 83, No. 9, Sep. 1, 2003; pp. 1887-1889.
Heritage, J.P., "Picosecond pulse shaping by spectral phase and amplitude manipulation", Optics Letters, vol. 10, No. 12, (Dec. 1985), pp. 609-611, Optical Society of America.
J. Ahn et al.; "Information Storage and Retrieval Through Quantum Phase"; Science Magazine, vol. 287; Jan. 21, 2000; pp. 463-465.
J.J. Garcia-Ripoll et al.; "Speed Optimized Two-Qubit Gates with Laser Coherent Control Techniques for Ion Trap Quantum Computing"; Physical Review Letters, vol. 91, No. 15; Oct. 10, 2003; pp. 157901-1-157901-4.
J.P. Ogilvie et al.; "Fourier transform measurement of two-photon excitation spectra: applications to microscopy and optimal control"; Optics Letters, vol. 30, No. 8; Apr. 15, 2005; pp. 911-913.
Jasco Comparison Proven Spectroscopy & Chromatography Technology, J-815 Circular Dichroism Spectropolarimeter, Jasco UK, http://www.jasco.co.uk/j800.asp, Nov. 29, 2006; 2 pages.
Jiang, et al. "Spectral line-by-line pulse shaping," Optics Letters, vol. 30, No. 12 (Jun. 15, 2005) Optical Society of America, pp. 1557-1559.
Jiang, et al., "Line-by-line pulse shaping control of optical arbitrary waveform generation," Optics Express, vol. 13, No. 25, (Dec. 12, 2005) Optical Society of America, pp. 10431-10439.
Kolenda, Jürgen, et al., "Pulse Shaping with the MIIPS-Process," Laser Technology, (Jan. 2008) Photonik International, p. 68.
Krausz, F., et al., "Generation of 33-fs optical pulses from a solid-state laser", Optics Letters, (Feb. 1, 1992), vol. 17, No. 3, Optical Society of America.
Lemoff, B.E., et al., "Quintic-phase-limited, spatially uniform expansion and recompression of ultrashort optical pulses", Optics Letters, vol. 18, No. 19, (Oct. 1, 1993), pp. 1651-1653, Optical Society of America.
Lim, Sang-Hyun et al.; "Single-Pulse Phase-Control Interferometric Coherent Anti-Stokes Raman Scattering Spectroscopy;" Physical Review A, 72, (Oct. 2005); pp. 041803-1-041803-4.
Liu, Yongqian, et al., "Terahertz Waveform Synthesis via Optical Pulse Shaping", IEEE Journal of Selected Topics in Quantum Electronics, (Sep. 1996), vol. 2, No. 3, pp. 709-719.
M. Ovchinnikov et al.; "Semiclassical molecular dynamics computation of spontaneous light emission in the condensed phase: Resonance Raman spectra"; Journal of Chemical Physics, vol. 114, No. 16; Apr. 22, 2001; pp. 7130-7143.
M. Schurenberg et al.; "Abstract—Laser desorption/ionization mass spectrometry of peptides and proteins with particle suspension matrixes"; Analytical Chemistry; 71 (1): 221-229; Jan. 1, 1999 (1 page).

(56) References Cited

OTHER PUBLICATIONS

M.O. Scully, et al.; "FAST CARS: Engineering a laser spectroscopic technique for rapid identification of bacterial spores"; PNAS; vol. 99, No. 17; Aug. 20, 2002; pp. 10994-11001.
Meshulach, D., et al., "Adaptive Compression of Femtosecond Pulses", presented at the Ultrafast Optics 1997 Conference, Aug. 1997, Monterey California (3 pages).
Midorikawa, Katsumi, et al., "Phase-Matched High-Order Harmonic Generation by Guided Intense Femtosecond Pulses," IEEE Journal of Selected Topics in Quantum Electronics, vol. 5, No. 6 (Nov./Dec. 1999) pp. 1475-1485.
Mitra et al.; "Nonlinear Limits to the Information Capacity of Optical Fibre Communications"; Nature; vol. 411; Jun. 28, 2001; pp. 1027-1030.
Ogilvie, Jennifer P., et al., "Use of coherent control for selective two-photon fluorescence microscopy in live organisms," Optical Society of America (Jan. 2006) 8 pages.
Ohno, Kimihisa, et al., "Adaptive pulse shaping of phase and amplitude of an amplified femtosecond pulse laser by direct reference to frequency-resolved optical gating traces," J. Opt. Soc. Am. B vol. 19, No. 11 (Nov. 2002) pp. 2781-2790.
Pastirk, I., et al., "No loss spectral phase correction and arbitrary phase shaping of regeneratively amplified femtosecond pulses using MIIPS," Optics Express, vol. 14, No. 20, (Oct. 2, 2006) pp. 9537-9543.
Perry, Michael D., et al., "Terawatt to Petawatt Subpicosecond Lasers", Articles, (May 13, 1994), vol. 264, Science.
Photogen Technologies, Inc., "Photogen-Technology"; www.photogen.com/body/tech_body.html; Dec. 20, 2001 (19 pages).
PiStar Kinetic Circular Dichroism Spectrometer, http://www.phtophysics.com/pistar.php, Nov. 29, 2006; 3 pages.
Quiroga-Teixeiro, M.L., et al., "Compression of optical solitons by conversion of nonlinear modes", J. Opt. Soc. Am. B, vol. 12, No. 6, (Jun. 1995), pp. 1110-1116, Optical Society of America.
QWPO-AS, Zero Order Waveplates—Air Spaced, Optical Components and Assemblies, www.cvilaser.com, published Nov. 21, 2005; pp. 8-9.
Reitze, D.H., et al., "Shaping of wide bandwidth 20 femtosecond optical pulses", Appl. Phys. Lett. 61 (11), (Sep. 14, 1992), pp. 1260-1262, American Institute of Physics.
Rodriguez, George, et al., "Coherent Ultrafast MI-FROG Spectroscopy of Optical Field Ionization in Molecular H2, N2, and O2," IEEE Journal on Selected Topics in Quantum Electronics, vol. 7, No. 4 (Jul./Aug. 2001) pp. 579-591.
Sanders, A. W. et al.: "Observation of Plasmon Propagation, Redirection, and Fan-Out in Silver Nanowires" Nano Letters, American Chemical Society, Washington, DC, US, vol. 6, No. 8, Jun. 28, 2006, pp. 1822-1826, XP007901978, ISSN: 1530-6984.
Sharman, W.M. et al.: "Targeted photodynamic therapy via receptor mediated delivery systems"; Adv. Drug Delivery Rev. 56(1); Jan. 2004; pp. 53-76.
Shimizu, Satoru, et al., "Spectral phase transfer for indirect phase control of sub-20-fs deep UV pulses," Optics Express, vol. 13, No. 17 (Aug. 22, 2005) pp. 6345-6353.
Siders, C.W., et al., "Blue-shifted third-harmonic generation and correlated self-guiding during ultrafast barrier suppression ionization of subatmospheric density noble gases," J. Opt. Soc. Am. B/vol. 13, No. 2 (Feb. 1996) pp. 330-335.
Spielmann, C., et al., "Ti: Sapphire Laser Produces Intense Sub-5-FS Pulses", Laser Focus World, May 1997, vol. 33, Issue 5, p. 127.
Stockman, Mark I. et al.; "Coherent Control Of Femtosecond Energy Localization In Nanosystems;" Physical Review Letters, vol. 88, No. 6, Feb. 11, 2002; pp. 067402-1-067402-4.
Suzuki, Takayuki et al.; "Nontrivial Polarization Shaping of Femtosecond Pulses By Reference To The Results of Dual-Channel Spectral Interferomtry;" Applied Optics, vol. 43, No. 32, Nov. 10, 2004; pp. 6047-6050.
Szipöcs, Robert, et al., "Chirped multilayer coatings for broadband dispersion control in femtosecond lasers", Optics Letters, (Feb. 1, 1994), vol. 19, No. 3, Optical Society of America.
Trebino, Rick, et al., "Using phase retrieval to measure the intensity and phase of ultrashort pulses: frequency-resolved optical gating", J. Opt. Soc. Am. A, vol. 10, No. 5, (May 1993), pp. 1101-1111, Optical Society of America.
Umstadter, D., et al., "Nonlinear Plasma Waves Resonantly Driven by Optimized Laser Pulse Trains", Physical Review Letters, vol. 72, No. 8, (Feb. 21, 1994), pp. 1224-1227, The American Physical Society.
Verluise, Frédéric, et al., "Arbitrary dispersion control of ultrashort optical pulses with acoustic waves," J. Opt. Soc. Am. B vol. 17, No. 1 (Jan. 2000) pp. 138-145.
von Vacano, Bernhard, et al., "Shaper-assisted collinear SPIDER: fast and simple broadband pulse compression in nonlinear microscopy," vol. 24, No. 5, (May 2007) J. Opt. Soc. Am. B, pp. 1091-1100.
W.M. Sharman et al.; "Photodynamic therapeutics: basic principles and clinical applications"; DDT, vol. 4, No. 11; Nov. 1991; pp. 507-517.
Warren, W.S., et al., "Coherent Control of Quantum Dynamics: The Dream is Alive", Articles, Science, (Mar. 12, 1993), vol. 259.
Wefers, Marc M., "Programmable phase and amplitude femtosecond pulse shaping", Optics Letters (Dec. 1, 1993), vol. 18, No. 23, pp. 2032-2034.
Wefers, Marc, et al., "Generation of high-fidelity programmable ultrafast optical waveforms", Optics Letters, (May 1, 1995), vol. 20, No. 9, Optical Society of America.
Weiner, "Encoding and decoding of femtosecond pulses", Optics Letters, (Apr. 1988), vol. 13, No. 4, Optical Society of America.
Weiner, A.M., "Enhancement of coherent charge oscillations in coupled quantum wells by femtosecond pulse shaping", J. Opt. Soc. Am. B, vol. 11, No. 12, (Dec. 1994), pp. 2480-2491, Optical Society of America.
Weiner, A.M., "Femtosecond pulse shaping using spatial light modulators," Review Article, Review of Scientific Instruments, vol. 71, No. 5 (May 2000) pp. 1929-1960.
Weiner, A.M., "High-resolution femtosecond pulse shaping", J. Opt. Soc. Am. B., vol. 5, No. 8, (Aug. 1988), pp. 1563-1572, Optical Society of America.
Weiner, A.M., "Programmable femtosecond pulse shaping by use of a multielement liquid-crystal phase modulator", Optics Letters, (Mar. 15, 1990), vol. 15, No. 6, pp. 326-328, Optical Society of America.
Weiner, A.M., "Spectral holography of shaped femtosecond pulses", Optics Letters, vol. 17, No. 3 (Feb. 1, 1992), pp. 224-226, Optical Society of America.
Weiner, A.M., et al., "Femtosecond multiple-pulse impulsive stimulated Raman scattering spectroscopy", J. Opt. Soc. Am. B., vol. 8, No. 6, (Jun. 1991), pp. 1264-1275.
Yu-Chen Shen et al.; "What can short-pulse pump-probe spectroscopy tell us about Franck-Condon dynamics?"; Journal of Chemical Physics, vol. 110. No. 20; May 22, 1999; pp. 9793-9806.
Zhou, Jianping, et al., "Generation of 21-fs millijoule-energy pulses by use of Ti:sapphire", Optics Letters, vol. 19, No. 2, (Jan. 15, 1994), pp. 126-128, Optical Society of America.
Bado, Philippe et al., "Micromachining Handbook," Femtosecond Lasers Micromachining Handbook, Clark-MXR, Inc., http://www.cmxr.com/Industrial/Handbook/Index.htm, accessed Apr. 3, 2006 (38 pages).
Béjot, Pierre, et al., "Laser noise compression by filamentation at 400 nm in argon," Optics Express, vol. 15, No. 20 (Oct. 2007) pp. 13295-13309.
Chen, Bi-Chang, et al., "Characterization of a broadband pulse for phase controlled multiphoton microscopy by single beam SPIDER," Optics Letters, vol. 32, No. 16, Optical Society of America (Aug. 15, 2007) pp. 2411-2413.
Chung, Jung-Ho, "Ambiguity of Ultrashort Pulse Shapes Retrieved From the Intensity Autocorrelation and the Power Spectrum," IEEE Journal on Selected topics in Quantum Electronics, vol. 7, No. 4 (Jul./Aug. 2001) pp. 656-666.
Coello, Yves, "Interference without an interferometer: a different approach to measuring, compressing, and shaping ultrashort laser pulses," J. Opt. Soc. Am. B/vol. 25, No. 6 (Jun. 2008) pp. A140-A150.

(56) References Cited

OTHER PUBLICATIONS

Lozovoy, Vadim V., et al., "Direct measurement of spectral phase for ultrashort laser pulses," Optics Express, vol. 16, No. 2 (Jan. 21, 2008) pp. 592-597.
Nisoli, M., et al., "Generation of high energy 10 fs pulses by a new pulse compression technique," Appl. Phys. Lett., vol. 68, No. 20 (May 13, 1996) pp. 2793-2795.
Oron, Dan, et al., "Scanningless depth-resolved microscopy," Optics Express, vol. 13, No. 5 (Mar. 7, 2005).
Tada, Junji, "Adaptively controlled supercontinuum pulse from a microstructure fiber for two-photon excited fluorescence microscopy," Applied Optics, vol. 46, No. 15, (May 20, 2007) pp. 3023-3030.
Wang, He, et al., "Generation of 0.5 mJ, few-cycle laser pulses by an adaptive phase modulator," Optics Express, vol. 16, No. 19 (Sep. 15, 2008) pp. 14448-14455.
Zang, Hegui, et al., "Study on Frequency-doubling Effect of the Dually Doped KTP Crystals," Journal of Synthetic Crystals vol. 29, No. 2 (May 2000).
O'Shea, Patrick, Mark Kimmel, Xun Gu, and Rick Trebino "Highly simplified device for ultrashort-pulse measurement" Optics Letter/ vol. 26, No. 12 / Jun. 15, 2001.
"Coherent® Silhouette, Ultrafast Pulse Shaper," Key Features brochure. Web. Jan. 29, 2008 http://www.coherent.com/Lasers/index.cfm?Fuseaction=show.print&ID=1485.
Takasago, Kazuya, et al., "Design of Frequency-Domain Filters for Femtosecond Pulse Shaping," Part 1, No. 2A (Feb. 1996)pp. 624-629. Jpn. J. Appl. Phys.
Zeek, E. et al., "Pulse Compression by Use of Deformable Mirrors," Optics Letters, OSA, Optical Society of America, vol. 24, No. 7, Apr. 1, 1999, pp. 493-495.
Sardesai, H et al. "A Femtosecond Code-Division Multiple-Access Communication System Test Bed," Journal of Lightwave Technology, IEEE Service Center, vol. 16, No. 11, Nov. 1, 1998, p. 1953-1964.
"Shaping light: MOEMS deformable mirrors for microscopes and telescopes;" Proc. SPIE7595, MEMS Adaptive Optics IV, 759502, Feb. 18, 2010; 3 pages.
A. Efimov et al.; "Minimization of dispersion in an ultrafast chirped pulse amplifier using adaptive learning"; Appl. Phys. B 70 (Suppl); May 24, 2000; pp. S133-S141.
A. Glass et al.; "Control of the photodissociation of CsCl"; Applied Physics B 71; Jul. 24, 2000; pp. 267-276.
A. Poppe et al; "Few-cycle optical waveform synthesis"; Applied Physics B 72; Dec. 13, 2000; pp. 373-376.
A. Prakelt et al.; "Phase control of two-photon transition with shaped femtosecond laser-pulse sequences"; Physical Review A 70; Dec. 13, 2004; pp. 063407-1-06407-10.
A.J. Wurzer et al.; "Highly localized vibronic wavepackets in large reactive molecules"; Applied Phys. B 71, Jul. 24, 2000; pp. 405-409.
A.N. Naumov et al.; "Frequency-time and time-space mappings for single-shot coherent four-wave mixing with chirped pulses and broad beams"; Journal of Raman Spectroscopy, vol. 32, Oct. 24, 2001; pp. 960-970.
Alexeev, I. et al., "Ultraviolet Light Generation by Intense Laser Filaments Propagating in Air," Conference on Lasers & Electro-Optics (CLEO), Baltimore, Maryland, USA, XP010876479; May 22-27, 2005, pp. 189-191.
Anderson, M.E. et al.; "The effects of noise on ultrashort-optical-pulse measurement using SPIDER"; Appl. Phys. B 70 (Suppl); May 24, 2000; pp. S85-S93.
B. Chatel et al.; "Role of quadratic and cubic spectral phases in ladder climbing with ultrashort pulses;" Physical Review A 70; Nov. 30, 2004; pp. 053414-1-053414-10.
B.J. Pearson et al.; "Coherent control using adaptive learning algorithms"; Physical Review A, vol. 63; May 16, 2000; pp. 063412-1-063412-12.
Baumert, T. et al. "Femtosecond pulse shaping by an evolutionary algorithm with feedback"; Appl. Phys. B 65; Dec. 1, 1997; pp. 779-782.
Ben R. Torralva et al; "Mechanisms for laser control of chemical reactions"; Journal of Modern Optics, vol. 49, Nos. 3-4; Mar. 10, 2002; pp. 593-625.
Bern Kohler et al.; "Controlling the Future of Matter"; Acc. Chem. Res., vol. 28, No. 3; Mar. 1, 1995; pp. 133-140.
Bern Kohler et al.; "Mode-Locking Matter with Light"; J. Phys. Chem. vol. 97, No. 48; Nov. 1, 1993; pp. 12602-12608.
Bonacina, Luigi, et al., "Multiobjective genetic approach for optimal control of photoinduced processes," Physical Review A. 76, The American Physical Society; Aug. 14, 2007; pp. 023408-1 through 023408-5.
Bowlan, Pamela, et al., "Directly measuring the spatio-temporal electric field of focusing ultrashort pulses," Optics Express, vol. 15, No. 16; Aug. 6, 2007; pp. 10219-10230.
Brixner, T. et al.; "Feedback-controlled femtosecond pulse shaping"; Appl. Phys. B 70 (Suppl); May 24, 2000; pp. S119-S124.
Broers, B. et al.; "Diffraction and focusing of spectral energy in multiphoton processes"; Phys Rev. A, vol. 46, No. 5; Sep. 1, 1992; p. 2749-2756.
Broers, B. et al.; "Large interference effects of small chirp observed in two-photon absorbtion"; Opt. Commun. 91; Jul. 1, 1992; p. 57-61.
Brown, E. J. et. al. "Ultrafast Rotational Anisotropy Measurements: Unidirectional Detection;" J. Phys. Chem. A, vol. 103, No. 16, Apr. 3, 1999 pp. 2912-2916.
Brown, E. J. et. al. "Ultrafast Rotational Anisotropy Measurements; Strong-Field Nonlinear Saturation Effects;" J. Phys. Chem. A, vol. 105, No. 34, Jul. 31, 2001; pp. 8004-8010.
Buist, A.H. et al.; "Probing microscopic chemical environments with high-intensity chirped pulses"; Optics Letters; vol. 24, No. 4, Feb. 15, 1999; pp. 244-246.
Butcher, Steve, et al., "Multiphoton approach shapes ultrafast pulses," Pulse Shaping, (2006) Institute of Physics and IOP Publishing Ltd., May 15, 2006; 3 pages.
C. Dorrer et al.; "Characterization of chirped-pulse amplification systems with spectral phase interferometry for direct electric-field reconstruction"; Applied Physics B 70 (Suppl.), May 24, 2000; pp. S77-S84.
C. Dorrer et al.; "Spatio-temporal characterization of the electric field of ultrashort optical pulses using two-dimensional shearing interferometry"; Applied Physics B74 (Suppl.), Jul. 5, 2002; pp. S209-S217.
C. Rangan et al.; "Optimally shaped terahertz pulses for phase retrieval in a Rydberg-atom data register"; Physical Review A, vol. 64; Aug. 17, 2001; pp. 033417-1-033417-5.
Chantal Daniel et al.; "Analysis and control of laser induced fragmentation processes in CpMn(CO)3"; Chemical Physics, vol. 267, Nos. 1-3; Jun. 1, 2001; pp. 247-260.
Chirped pulse amplification; Internet excerpt from Wikipedia; published on Aug. 7, 2008; 4 pages.
Choi, K-S et al.; "Charge Density Wave Caused By Reducing ThSe3 By One Electron. Superstructure And Short-Range Order in ATh2Se6 (A = K, Rb) Studied By X-Ray Diffraction, Electron Diffraction, And Diffuse Scattering;" J. Am. Chem. Soc., vol. 120, No. 41, Oct. 1, 1998; pp. 10706-10714.
Christopher J. Bardeen et al.; "Feedback quantum control of molecular electronic population transfer"; Chemical Physics Letters 280; Nov. 28, 1997; pp. 151-158.
Christopher J. Bardeen et al.; "Quantum Control of NaI Photodissociation Reaction Product States by Ultrafast Tailored Light Pulses"; J. Phys. Chem. A, vol. 101, No. 20; Apr. 15, 1997; pp. 3815-3822.
Christopher J. Bardeen et al.; "Using time-dependent rate equations to describe chirped pulse excitation in condensed phases"; Chemical Physics Letters 302; Mar. 26, 1999; pp. 405-410.
Comstock, M. et al.; "Rotational Wavepacket Revivals For Phase Modulation Of Ultrafast Pulses;" Chemical Physics Letters, vol. 372, No. 5-6, May 6, 2003; pp. 739-744.
Comstock, M. et al.; "Ultrafast Laser Induced Molecular Alignment And Deformation: Experimental Evidence From Neutral Molecules And From Fragment Ions;" J. Phys. Chem. A, vol. 107, No. 40, Jul. 19, 2003; pp. 8271-8281.

(56) References Cited

OTHER PUBLICATIONS

Comstock, M. et al.; "Ultrafast Transient-Grating Study Of Molecules After High Intensity Excitation;" in Ultrafast Phenomena XII, Jul. 9, 2000; 2 pages.

D. Oron et al.,; "All-optical processing in coherent nonlinear spectroscopy"; Physical Review A 70; Aug. 31, 2004; pp. 023415-1-023415-4.

D. Zeidler et al.; "Amplification of tailored white-light continuum"; Applied Physics, B74 (Suppl), Jul. 5, 2002; pp. S51-S56.

D. Zeidler et al.; "Evolutionary algorithms and their application to optimal control studies"; Physical Review A, vol. 64; Jul. 17, 2001; pp. 023420-1-023420-13.

D.J. Maas et al.; Vibrational ladder climbing in NO by (sub)picosecond frequency-chirped infrared laser pulses; Chemical Physics Letters 290; Jun. 26, 1998; pp. 75-80.

D.M. Villeneuve et al.; "Using frequency-domain manipulation of stretched femtosecond laser pulses to create fast rise and fall times on picosecond pulses"; Applied Physics B74 (Suppl), Jun. 20, 2002; pp. S157-S161.

Dan Oron et al.; "Quantum control of coherent anti-Stokes Raman processes"; Physical Review A, vol. 65; Apr. 2, 2002; pp. 043408-1-043408-4.

Dantus, Marcos et al. "Two-photon microscopy with Sub-8fs laswer pulse" PDPA Frontiers in Optics/Laser Science XXVI; Oct. 24-28, 2010, pp. 1-18.

Dantus, Marcos. "Laser Control of Chemical Reactions." Chemical & Engineering News, vol. 79; Mar. 26, 2001; p. 191.

Dantus, Marcos; "Femtosecond Laser Pulses: Principles And Experiments;" (Book Review) J. Am. Chem. Soc., vol. 121, No. 37, Jul. 20, 1999; pp. 8677-8678.

Dantus, Marcos; "Ultrafast Probing And Control Of Molecular Dynamics: Beyond The Pump-Probe Method;" Femtochemistry Wiley-VCH, Weinheim, 169, Jun. 5, 2000; 35 pages.

David M. Jonas et al.; "Femtosecond Wavepacket Spectroscopy: Influence of Temperature, Wavelength and Pulse Duration"; J. Phys. Chem.;vol. 99, No. 9, Feb. 1, 1995; pp. 2594-2608.

Dela Cruz, J.M. et al.; "Multiphoton Intrapulse Interference 3: Probing Microscopic Chemical Environments"; J. Phys. Chem. A 108, Nov. 25, 2003; pp. 53-58.

Dudovich, N. et al; "Transform-limited pulses are not optimal for resonant multiphoton transitions"; Phys. Rev. Lett. 86; Jan. 1, 2001; pp. 47-50.

Efimov A. et al.; "Programmable dispersion compensation and pulse shaping in a 26-fs chirped-pulse amplifier;" Optics Letters, vol. 23, No. 20, Oct. 15, 1998; pp. 1612-1614.

Eramo, R. et al. "Third-harmonic generation in positively dispersive gases with a novel cell", vol. 33, No. 9, Applied Optics; Mar. 20, 1994, pp. 1691-1696.

F. Legare et al.; "Laser pulse control of Raman processes by chirped non-adiabatic passage"; Journal of Raman Spectroscopy 30, Feb. 17, 2000; pp. 15-23.

Feurer, T., et al., "Coherent Control Over Collective Polariton Excitations: The Dawn of Polaritonics", 2002 Thirteenth International Conference on Ultrafast Phenomena, Technical Digest; Opt. Soc. America; XP008086358; May 12, 2002; pp. 541-545.

Foing, J.P. et al. "Femtosecond Pulse Phase Measurement by Spectrally Resolved Up-Conversion—Application to Continuum Compression," IEEE J. Quantum Electron., vol. 28, No. 10; Oct. 1992 (day unknown); pp. 2285-2290.

Fowles, "Introduction to Modern Optics," Jun. 1, 1989, Dover 2nd Edition, pp. 2-19.

Fujimoto, Masatoshi, et al., "Programmable shaping of a subterawatt, femtosecond laser pulse by modulating the spectral phase of the preamplified pulse," Optics Communications, vol. 280, No. 2, Dec. 15, 2007; ScienceDirect, pp. 404-407.

Gabriel Turinici et al.; "Quantum wavefunction controllability"; Chemical Physics 267; Jun. 1, 2001; pp. 1-9.

Gallmann, L. et al.; "Techniques for the characterization of sub-10-fs optical pulses: a comparision"; Appl. Phys. B 70 (Suppl): May 24, 2000; pp. S67-S75.

Gomes, A.S.L., et al., "Optical fibre-grating pulse compressors", Tutorial Review, Optical and Quantum Electronics, vol. 20, No. 2, Mar. 1, 1998; pp. 95-112.

Goswami, D.; "Optical pulse shaping approaches to coherent control"; Physics Reports 374; Feb. 1, 2003; pp. 385-481.

H. Takada et al.; "Large-ratio stretch and recompression of sub-10-fs pulses utilizing dispersion managed devices and a spatial light modulator"; Appl. Phys. B 74 [Suppl.]; Jun. 27, 2002; pp. S253-S257.

H. Zou, C. Zhou, Femtosecond Pulse Shaping with Space-to-Time Conversion Based on Planar Optics, Optik Optics, ScienceDirect, vol. 118, No. 1; Jan. 8, 2007; pp. 5-8.

H.S. Moon et al.; "Coherence control using the ratio of Rabi frequencies for complete coherent inversion in a four-level system"; J. Phys. B At. Mol. Phys. vol. 32, No. 4; Feb. 28, 1999; pp. 987-999.

Hacker, M. et al.; "Frequency doubling of phase-modulated, ultrashort laser pulses"; Appl. Phys. B 73; Sep. 19, 2001; pp. 273-277.

Hosseini, S. Abbas et al.; "Coherent control of multiphoton transitions with femtosecond pulse shaping"; Physical Review A; Aug. 9, 2001; pp. 033410-1-033410-7.

Jeffrey L. Krause et al.; "Quantum Control of Molecular Dynamics: The Strong Response Regime"; J. Phys. Chem; vol. 99, No. 37; Aug. 1, 1995; pp. 13736-13747.

Jianshu Cao et al.; "Intrapulse Dynamical Effects in Multiphoton Processes: Theoretical Analysis"; J. Phys. Chem. A; vol. 102; Feb. 20, 1998; pp. 4284-4290.

Jianwei Che et al.; "Detection and Control of Molecular Quantum Dynamics"; J. Phys. Chem.;vol. 99, No. 41; Sep. 15, 1995; pp. 14949-14958.

Jianwei Che et al.; "Semiclassical Dynamics and Quantum Control in Condensed Phases: Application to 12 in a Solid Argon Matrix"; J. Phys. Chem.; vol. 100, No. 19; Apr. 1, 1996; pp. 7873-7883.

John M. Papanikolas et al.; "Erratum: Manipulation of rovibrational wave packet composition in the Li2 E(Eg) shelf state using intermediate state selection and shaped femtosecond laser pulses"; J. Chem Phys. 107 (24), Dec. 22, 1997; p. 10830.

Joshua B. Ballard et al.; "Simultaneous control of time-dependent population transfer dynamics and wave-packet quantum interferences in Li2 by shaped ultrafast pulses"; Physical Review A 66; Oct. 4, 2002; pp. 043402-1-043402-7.

Julie A. Gruetzmacher et al.; "Time and Frequency-Gated FID: a New Approach to Study the Vibrational Dephasing of Water"; Ultrafast Phenomena XII, vol. 66; Jul. 9-13, 2000; pp. 530-532.

K.D. Belfield et al.; "Multiphoton-absorbing organic materials for microfabrication, emerging optical applications and non-destructive three-dimensional imaging"; J. of Phys. Organic Chem., 13; Nov. 9, 2000; pp. 837-849.

K.H. Hong et al.; "Time-frequency analysis of chirped femtosecond pulses using Wigner distribution function"; Applied Physics B74 (Suppl), Jun. 20, 2002; pp. S231-S236.

Konorov, S.O., "Laser Breakdown with Millijoule Trains of Picosecond Pulses Transmitted through a Hollow-Core Photonic-Crystal Fiber", Laser Physics, vol. 13, No. 4, Apr. 13, 2003; pp. 652-656.

Kosik, Ellen M., et al., "The effects of noise on ultrashort optical pulse measurement using SPIDER"; The Institute of Optics, University of Rochester, Rochester, NY; Jul. 9, 2000; pp. 21-23.

Kubo, Atsushi, et al., "Femtosecond Imaging of Surface Plasmon Dynamics in a Nanostructured Silver Film," Nano Letters, vol. 5, No. 6; American Chemical Society, May 17, 2005; pp. 1123-1127.

Laarmann, T., et al., "Femtosecond pulse shaping as analytic tool in mass spectrometry of complex polyatomic systems," J Phys B-at Mol Opt; 41 (7); Mar. 25, 2008; 9, pages.

Limpert J. et al.; "All fiber chirped-pulse amplification system based on compression in air-guiding photonic bandgap fiber;" Optics Express, vol. 11, No. 24, Dec. 1, 2003; pp. 3332-3337.

Link, Stephan et al.; "Optical Properties And Ultrafast Dynamics Of Metallic Nanocrystals;" Annu. Rev. Phys. Chem. 54, Mar. 4, 2003; pp. 331-369.

Lozovoy, V. V. et al.; "Cascaded Free-Induction Decay Four-Wave Mixing;" Chemical Physics 266; May 15, 2001, pp. 205-212.

Lozovoy, V. V. et al.; "The Role Of Microscopic And Macroscopic Coherence In Laser Control;" Chemical Physics 267, Jun. 1, 2001; pp. 99-114.

(56) References Cited

OTHER PUBLICATIONS

Lozovoy, V. V., et al., "Laser Control of Physicochemical Processes; Experiments and Applications," The Royal Society of Chemistry 2006, Annu. Rep. Prog. Chem, Sect. C, 102. www.rsc.org/annrepc; Jun. 19, 2006; pp. 227-258.
Lu, Y.M. et al.; "Highly sensitive two-photon chromophores applied to three dimensional lithographic microfabrication: design, synthesis and characterization towards two-photon absorbtion cross section"; J. Mater Chem. 14(1); Oct. 14, 2003; pp. 75-80.
Lutfur R. Khundkar et al.; "Ultrafast Molecular Reaction Dynamics in Real-Time: Progress Over a Decade"; Annu. Rev. Phys. Chem., vol. 41; Oct. 1, 1990; pp. 15-60.
M. Armstrong et al.; "Versatile seven-femtosecond pulse compressor of parametrically amplified pulses using adaptive optics: studies of the primary events in protein dynamics;" Applied Physics B 74 (Suppl.); Jul. 16, 2002; pp. S127-S132.
M. Bergt et al.; "Controlling the Femtochemistry of Fe(CO)5"; J. Phys. Chem. A, vol. 103, No. 49; Nov. 3, 1999; pp. 10381-10387.
M. Bergt et al.; "Time-resolved organometallic photochemistry Femtosecond fragmentation and adaptive control of CpFe(CO)2X (X=C1,Br,1)"; Journal of Organometallic Chemistry 661; Nov. 1, 2002; pp. 199-209.
M. Dantus et al., "Experimental Coherent Laser Control of Physicochemical Processes", Chem. Rev. 104; Mar. 27, 2004; pp. 1813-1859.
M. Hentschel et al.; "Generation of 0.1-TW optical pulses with a single-stage Ti:sapphire amplifier at a 1-kHz repetition rate"; Appl. Phys. B 70 [Suppl.]; May 24, 2000; pp. S161-S164.
M. Renard et al.; "Controlling ground-state rotational dynamics of molecules by shaped femtosecond laser pulses"; Physical Review A 69; Apr. 8, 2004; 043401-1-043401-6.
M.A. Bouchene et al.; "Temporal coherent control induced by wave packet interferences in one and two photon atomic transitions"; The European Physical Journal D, vol. 2; Jun. 1, 1998; pp. 131-141.
M.C. Chen et al.; "Coherent control multiphoton processes in semiconductor saturable Bragg reflector with freezing phase algorithm"; Appl. Phys. B 80; Dec. 21, 2004; pp. 333-340.
M.F. DeCamp et al.; "Dynamics and coherent control of high-amplitude optical phonons in bismuth"; Physical Review B, vol. 64; Aug. 7, 2001; pp. 092301-1-092301-3.
Marcos Dantus; "Coherent Nonlinear Spectroscopy: From Femtosecond Dynamics to Control"; Annu. Rev. Phys. Chem., vol. 52 No. 1, Nov. 30, 2000; pp. 639-679, C1-C7.
Marvet, Una et al.; "Femtosecond Concerted Elimination Of Halogen Molecules From Halogenated Alkanes;" Phys. Chem. Chem. Phys., 2, Feb. 7, 2000; pp. 885-891.
Marvet, Una et al.; "Femtosecond Dynamics Of Unimolecular And Unrestricted Bimolecular Reactions;" J. Phys. Chem. A, vol. 102, No. 23, Jan. 30, 1998; pp. 4111-4117.
May, Volkhard et al., "Theory of ultrafast nonresonant multiphoton transitions in polyatomic molecules: Basics and application to optimal control theory," J. Chem. Phys. 127; Oct. 9, 2007; pp. 144102-1 through 144102-11.
Meshulach D. et al.; "Adaptive ultrashort pulse compression and shaping"; Optics Communications 138; Jun. 1, 1997; pp. 345-348.
Meshulach, M. et al.; "Coherent quantum control of multiphoton transitions by shaped ultrashort optical pulses" Phys. Rev. A 60; Aug. 1, 1999; pp. 1287-1292.
Mohamed Aziz Bouchene et al.; "Interplay between wave packet interferences and second harmonic generation"; Optics Communications 181; Jul. 15, 2000; pp. 327-336.
Mohamed Aziz Bouchene et al.; "Wavepacket interferometry with chirped pulses"; J. Phys. B At. Mol. Opt. Phys., vol. 32; No. 21, Nov. 14, 1999; pp. 5167-5177.
Montgomery, Matthew A., "Elucidation of Control Mechanisms Discovered during Adaptive Manipulation of [Ru(dpb)3](PF6)2 emission in the Solution Phase," American Chemical Society, J. Phys. Chem. A, vol. 111, No. 8; Feb. 2, 2007; pp. 1426-1433.
Moshe Shapiro et al.; On the Origin of Pulse Shaping Control of Molecular Dynamics; J. Phys. Chem. A, vol. 105, No. 105; Mar. 6, 2001; pp. 2897-2902.
N.H. Damrauer et al.; "Control of bond-selective photochemistry in CH2BrCl using adaptive femtosecond pulse shaping"; The European Physical Journal D, 20, Jun. 28, 2002; pp. 71-76.
Niels E. Henriksen; "Laser control of chemical reactions"; Chem. Soc. Rev. 3137 42; Jan. 9, 2002; pp. 37-42.
Nuernberger, Patrick, "Femtosecond quantum control of molecular dynamics in the condensed phase," Invited Article, Physical Chemistry Chemical Physics, The Owner Societies, vol. 9; Mar. 13, 2007; pp. 2470-2497.
O.M. Sarkisov et al.; "Control of elementary chemical reactions by femtosecond light pulses"; Quantum Electronics, vol. 31, No. 6; Jun. 30, 2001; pp. 483-488.
Osborn, D.L. et al.; "Spectral and intensity dependence of spatially resolved two-photon conductivity defects on a GaAsP photodiode"; J. Appl. Phys 89; Jan. 1, 2001; pp. 626-633.
P. Dupriez, et al.; "High-power, high repetition rate picosecond and femtosecond sources based on Yb-doped fiber amplification of VECSELs;" Optics Express, vol. 14, No. 21; Oct. 16, 2006; pp. 9611-9616.
P. Main et al.; "Generation of Ultrahigh Peak Power Pulses by Chirped Pulse Amplification;" IEEE Journal of Quantum Electronics, vol. 24, No. 2; Feb. 1988 (day unknown); pp. 398-403.
Pastirk, I. et al.; "2D (time-frequency) Femtosecond Four-Wave Mixing At 1014 W/cm2: Molecular and Electronic Response;" Symposium On Optical Pulse and Beam Propagation III, Photonics West; Jan. 20, 2001; 3 pages.
Pastirk, I. et al; "Selective two-photon microscopy with shaped femtosecond pulses"; Opt. Express, vol. 11, No. 14; Jul. 14, 2003; pp. 1695-1701.
Pastrik, I. et al., "Sequences for Controlling Laser Excitation with Femtosecond Three-Pulse Four-Wave Mixing;" The Royal Society of Chemistry, vol. 1999, No. 113, Oct. 7, 1999; pp. 401-424.
Pfeiffer, W., et al., "Ultrafast Spatio-Temporal Near-Field Control", IEEE 2005 European Quantum Electronics Conference, 0-7803-8973-5/05, Jun. 2005 (day unknown); p. 169.
Posthumus, J.H., "The dynamics of small molecules in intense laser fields," Reports on Progress in Physics, 67, Institute of Physics Publishing, Apr. 7, 2004; pp. 623-665.
R. deVivie-Riedle et al.; "Design and interpretation of laser pulses for the control of quantum systems"; Applied Physics B 71; Jul. 5, 2000; pp. 285-292.
R. Netz et al.; "Coherent population dynamics of a three-level atom in spacetime"; Physical Review A, vol. 65; Apr. 1, 2002; pp. 043406-1-043406-12.
R. van Leeuwen et al.; "Manipulation of differential electron yields via autoionizing wave-packet control"; Physical Review A, vol. 63; Feb. 9, 2001; pp. 033403-1-033403-5.
R. Wolleschensky et al.; "Characterization And Optimization Of A Laser-Scanning Microscope In the Femtosecond Regime;" Applied Physics B 67, Lasers and Optics, Jul. 1, 1998; pp. 87-94.
R. Zadoyan et al.; "Wavepacket diagnosis with chirped probe pulses"; Chemical Physics, vol. 233; Aug. 1, 1998; pp. 353-363.
R.R. Jones et al.; "Bound-state interferometry using incoherent light"; J. Phys. B, vol. 28, No. 13, At. Mol. Opt. Phys.; Jul. 14, 1995; pp. L405-L411.
Radoslaw Uberna et al.; "Phase and amplitude control in the formation and detection of rotational wave packets in the E1Eg state of Li2"; Journal of Chemical Physics, vol. 108, No. 22; Jun. 8, 1998; pp. 9259-9274.
Radoslaw Uberna et al.; "Phase control of wavepacket dynamic using shape femtosecond pulses"; Faraday Discuss, vol. 1999, No. 113; Oct. 7, 1999; pp. 385-400.
Rhee, T.K. et al. "Chirped-Pulse Amplification of 85-Fs Pulses at 250 Khz with 3rd-Order Dispersion Compensation by Use of Holographic Transmission Gratings," Opt. Lett., vol. 19, No. 19; Oct. 1, 1994; pp. 1550-1552.
Roy, I. et al; "Ceramic-based nanoparticles entrapping water-soluble photosensitizing drugs: A novel drug carrier system for photodynamic therapy"; J. Am. Chem. Soc. 125; Jun. 10, 2003, pp. 7860-7865.

(56) References Cited

OTHER PUBLICATIONS

S. Meyer et al.; "Photoelectron distributions from femtosecond pump/probe excitation with chirped probe pulses"; Journal of Chemical Physics, vol. 108, No. 18; May 8, 1998; pp. 7631-7636.
S. Nath, D. Urbanek, S. Kern, M. Berg, High-Resolution Raman Spectra with Femtosecond Pulses: An Example of Combined Time- and Frequency-Domain Spectroscopy, Physical Review Letters, Dec. 28, 2006, pp. 267401-1 to 267401-4.
S. Yeremenko et al.; "The criterion of pulse reconstruction quality based on Wigner representation"; Applied Physics B 70 (Suppl); May 24, 2000; pp. S109-S117.
S. Zhang, X. Zhang, J. Huang, L. Deng, Z. Sun, W. Zhang, Z. Wang, Z. Xu, R.Li, Coherent Enhancement of Broadband Frequency Up-Conversion in BBO Crystal by Shaping Femtosecond Laser Pulses, Optics Communications, ScienceDirect, vol. 271, No. 2, Mar. 15, 2007; pp. 559-563.
S.E. Harris; "Control of Feshbach resonances by quantum interference"; Physical Review A66; Jul. 16, 2002; pp. 010701-1-010701-4.
S.N. Pisharody et al.; "Phase-controlled stair-step decay of autoionizing radial wave packets"; Physical Review A, vol. 65; Feb. 27, 2002; pp. 033418-1-033418-10.
Sanislav S. Bychkov et al.; "Laser coherent control of molecular chiral states via entanglement of the rotational and torsional degrees of freedom"; Journal of Raman Spectroscopy; Dec. 5, 2002; pp. 962-973.
Sato, Shunichi, et al., "Hollow-Waveguide-Based Nanosecond, Near-Infrared Pulsed Laser Ablation of Tissue," Lasers in Surgery and Medicine, vol. 37, Aug. 11, 2005; pp. 149-154.
ScanMail 10K—Scanna; Internet publication from Safer America; Oct. 6, 2004; 3 pages.
Schubert, K. et al.: "Extremely slow coherent polarization decay of waveguide-plasmon-polaritons in metallic photonic crystal slabs" Quantum Electronics and Laser Science (QELS). PostConference Digest (IEEE Cat No. CH37420-TBR) Optical Soc. of America, Washington, DC, USA, Jun. 1-6, 2003; p. 3 pp., XP002460783, ISBN: 1-55752-749-0.
Serbin, J., et al., "Femtosecond lasers as novel tool in dental surgery," applied surface science, vol. 197-198; Sep. 30, 2002; pp. 737-740.
Stobrawa, G. et al.; "A new high-resolution femtosecond pulse shaper"; Appl. Phys. B 72; Mar. 21, 2001; pp. 627-630.
Strickland D. et al.; "Compression of amplified chirped optical pulses;" Optics Communications, vol. 56, No. 3; Dec. 1, 1985; pp. 219-221.
Stuart A. Rice et al.; "Active control of product selection in a chemical reaction: a view of the current scene"; Phys. Chem. Chem. Phys.; Apr. 11, 2002; pp. 1683-1700.
Stuart A. Rice; "Active Control of Molecular Dynamics: Coherence versus Chaos"; Journal of Statistical Physics, vol. 101, Nos. 1/2; Oct. 1, 2000; pp. 187-212.
Surharev, Maxim et al.; "Coherent Control Approaches to Light Guidance in the Nanoscale;" The Journal of Chemical Physics 124, XP008086379; Apr. 13, 2005; pp. 144707-1-144707-8.
T. Brixner et al.; "Feedback-controlled optimization of amplified femtosecond laser pulses"; Applied Physics B 68; Feb. 1, 1999; pp. 281-284.
T. Brixner et al.; "Generation and characterization of polarization-shaped femtosecond laser pulses"; Applied Physics B74 (Suppl), Jul. 5, 2002; pp. S133-S144.
T. Brixner et al.; "Problem complexity in femtosecond quantum control"; Chemical Physics, vol. 267, Nos. 1-3; Jun. 1, 2001; pp. 241-246.
T. Feurer et al.; "Measuring the temporal intensity of ultrashort laser pulses by triple correlation"; Appl. Phys. B, vol. 66; Feb. 1, 1998; pp. 163-168.
T. Frohnmeyer et al.; "Femtosecond pump-probe photoelectron spectroscopy on Na2: a tool to study basic coherent control schemes"; Applied Physics B 71; Jul. 13, 2000; pp. 259-266.
T. Hornung et al.; "Optimal control of one- and two-photon transitions with shaped femtosecond pulses and feedback"; Applied Physics B 71; Jul. 5, 2000; pp. 277-284.
T. Kobayashi et al.; "Tunable visible and near-infrared pulse generator in a 5 fs regime"; Appl. Phys. B 70 (Suppl); May 24, 2000; pp. S239-S246.
T.C. Weinacht et al.; "Coherent learning control of vibrational motion in room temperature molecular gases"; Chemical Physics Letters 344; Apr. 24, 2001; pp. 333-338.
T.C. Weinacht et al.; "Toward Strong Field Mode-Selective Chemistry"; J. Phys. Chem. A, vol. 103, No. 49; Sep. 23, 1999; pp. 10166-10168.
T.C. Weinacht et al.; "Using feedback for coherent control of quantum systems"; Journal of Optics B: Quantum and Semiclassical Optics; Apr. 4, 2002; pp. R35-R52.
Thomas Hornung et al.; "Teaching optimal control theory to distill robust pulses even under experimental constraints"; Physical Review A, vol. 65; Jan. 4, 2002; pp. 021403-1-021403-4.
Tomizawa H. et al., Development of Automatically Optimizing System of Both Spatial and Temporal Beam Shaping for UV-Laser Pulse, Proceedings of the SPIE—The International Society for Optical Engineering SPIE—Int. Soc. Opt. Eng USA, vol. 5481, No. 1, Mar. 15, 2004; pp. 47-55.
Urbasch, Gunter, et al., "Distinction of ortho- and para-Xylene by Femtosecond-Laser Mass Spectrometry," Communications, ChemPhysChem, vol. 8; Oct. 1, 2007; Wiley-VCH Verlag GmbH &Co. KGaA, Weinheim, pp. 2185-2188.
V. Prokhorenko et al.; "Coherent control of the population transfer in complex sovated molecules at weak excitation. An experimental study"; The J. of Chem. Phys., 122; May 6, 2005; 184502-1-184502-11.
V.M. Akulin et al.; "Laser Control of Atomic Motion inside Diatomic Molecules"; J. Phys. Chem. A, vol. 102, No. 23; May 19, 1998; pp. 4310-4320.
V.S. Malinovsky et al.; "General theory of population transfer by adiabatic rapid passage with intense, chirped laser pulses"; The European Physical Journal D 14; May 15, 2001; pp. 147-155.
VandenBout, D.A. et al.; "Discrete intensity jumps and intramolecular electronic energy transfer in the spectroscopy of single conjugated polymer molecules"; Science 277; Aug. 22, 1997; pp. 1074-1077.
W. Wohlleben et al.; "Coherent Control for Spectroscopy and Manipulation of Biological Dynamics"; Chem. Phys. Chem., 6; Apr. 1, 2005; pp. 850-857.
Waner, M. J. et al.; "Imaging The Molecular Dimensions And Oligomerization Of Proteins At Liquid/Solid Interfaces;" J. Phys. Chem. B, vol. 102, No. 9, Feb. 4, 1998; pp. 1649-1657.
Weiner A.M.; "Femtosecond pulse processing;" Optical and Quantum Electronics 32; 2000 (month and day unknown); pp. 473-487.
Wnuk, Pawel, et al., "Coherent control and dark pulses in second harmonic generation," Optics Communications 272, ScienceDirect; Apr. 15, 2007; pp. 496-502.
Wolfgang Kiefer et al.; "Femtosecond time-resolved spectroscopy of elementary molecular dynamics"; Naturwissenschaften; Apr. 27, 2002; pp. 250-258.
Wollenhaupt, M. et al.; "Femtosecond Laser Photoelectron Spectroscopy On Atoms And Small Molecules: Prototype Studies In Quantum Control;" Annu. Rev. Phys. Chem., 56; Nov. 11, 2004; pp. 25-56.
Xu, C. et al.;"Two photon optical beam induced current imaging through the backside of integrated circuits"; Appl. Phys. Lett. 71 (18); Nov. 3, 1997; pp. 2578-2580.
Y. Oishi, A. Suda, F. Kannari, K. Midorikawa, Intense Femtosecond Pulse Shaping Using a Fused-Silica Spatial Light Modulator, Optics Communications, ScienceDirect, vol. 270, No. 2; Feb. 15, 2007; pp. 305-309.
Yang, W. et al.; "High-ratio Electro-optical Data Compression for Massive Accessing Networks Using AOM-based Ultrafast Pulse Shaping"; Journal of Optical Communications; vol. 22, No. 1; Jan. 15, 2001; pp. 694-697.
Z.W. Shen et al.; "Selective preparation of ground state wave-packets: a theoretical analysis of femtosecond pump-dump-probe experiments on the potassium dimmer"; The European Physical Journal D 14; May 15, 2001; pp. 167-172.
Zeidler, D. et al.; "Adaptive compression of tunable pulses from a non-colinear-type OPA to below 16 fs by feedback-controlled pulse shaping"; Appl. Phys. B 70 (Suppl); May 24, 2000; pp. S125-S131.

(56) References Cited

OTHER PUBLICATIONS

Zheng, Z. et al. "Spectral phase correlation of coded femtosecond pulses by second-harmonic generation in thick nonlinear crystals"; Opt. Lett., vol. 25, No. 13; Jul. 1, 2000; pp. 984-986.

Zheng, Z. et al.; "Coherent control of second harmonic generation using spectrally phase coded femtosecond waveforms"; Chem. Phys. 267; Jun. 1, 2001; pp. 161-171.

Zhu, Xin, et al., "In-situ femtosecond laser pulse characterization and compression during micromachining," Optical Society of America; vol. 15, No. 24; Nov. 26, 2007; 8 pages.

Zohar Amitay et al.; "Phase-tailoring molecular wave packets to time shift their dynamics"; Chemical Physics 267; Jun. 1, 2001; pp. 141-149.

Krampert, Gerhard; "Femtosecond Quantum Control and Adaptive Polarization Pulse Shaping", Dissertation zur Erlangung des naturwissenschaftlichen Doktorgrades der Bayerischen Julius-Maximilians-Universität Würzburg, 2004, 135 pages.

Backus S. et al.; "High power ultrafast lasers;" Review of Scientific Instruments, vol. 69, No. 3, Mar. 1998 (day unknown); pp. 1207-1223.

* cited by examiner

LASER MATERIAL PROCESSING SYSTEM

STATEMENT OF GOVERNMENT INTEREST

This invention was made with Government support under Contract No. DE-FG02-01ER15143 awarded by the U.S. Department of Energy. The Government has certain rights in this invention.

CROSS-REFERENCE TO RELATED APPLICATIONS

This application is a 371 U.S. National Stage of International Application No. PCT/US2007/008878, filed Apr. 9, 2007. This application claims the benefit of U.S. Provisional Application No. 60/790,695, filed Apr. 10, 2006. The disclosures of the above applications are incorporated herein by reference.

BACKGROUND AND SUMMARY OF THE INVENTION

The present invention generally relates to a material processing system and more particularly to micromachining with a laser.

It is known to employ femtosecond lasers for micromachining. The use of these ultrafast lasers has significantly improved the machining efficiency by quickly removing the workpiece material due to the instantaneous increase of the material temperature into a plasma regime. Furthermore, ionization of the material reduces splatter and debris during operation. An exemplary conventional device using a 50-200 femtosecond laser for micromachining is disclosed in U.S. Pat. No. 6,979,798 entitled "Laser System and Method for Material Processing with Ultra Fast Lasers" which issued to Gu et al. on Dec. 27, 2005, and is incorporated by reference herein. It is noteworthy, however, that a leading publication, P. Bado et al., *Micromachining Handbook*, Clark-MXR, Inc., version 2.3, chapter 14 (2001), discusses that there are "Shortcomings of Femtosecond Lasers" for conventional machining "because the rate of removal of material is dependent on average power, thruput is low. The technology that makes these ultrafast laser pulses does not produce high average power. Additionally, the technology is VERY expensive . . . . "

Furthermore, conventional nanosecond laser induced breakdown spectroscopy suffers some limitations due to inefficient coupling of the laser pulse energy into a sample. The laser creates a plasma, which couples with the bulk (electron-phonon coupling) and supplies the energy for melting, followed by evaporation and excitation of the gas phase atoms. The inefficient coupling requires high energies per pulse, typically in the 10-100 mJ/pulse range, and leaves a scar caused by melting.

In accordance with the present invention, a laser material processing system and method are provided. A further aspect of the present invention employs a laser for micromachining. In another aspect of the present invention, the system uses a hollow waveguide. In yet another aspect of the present invention, a laser beam pulse is given broad bandwidth for workpiece modification. A further aspect of the present invention allows a single laser beam to simultaneously operate in multiple machining workstations and/or to machine multiple holes in the same workpiece. Additionally, a system includes a laser, pulse shaper and compensation device, and control system, with another aspect of the present invention. In a further aspect of the present invention, a system employs Multiphoton Intrapulse Interference Phase Scan to improve laser pulse performance. A method of operating a laser for micromachining is also provided.

The present invention is advantageous over conventional constructions since the equipment or the processing throughput used in the system of the present invention is significantly less expensive than traditional equipment. Furthermore, multiple workstations can be simultaneously powered by a single laser, thereby reducing the laser expense per workpiece. The novel waveguide of the present invention system also beneficially increases ps or fs pulse bandwidth so a less expensive, longer pulse lasers can be employed while improving micromachining efficiency. For another exemplary advantage, an inexpensive picosecond laser of the present invention, directly pumped by a flash lamp, is employed in some variations instead of considerably more expensive conventional femtosecond lasers, pumped by green laser sources; nevertheless, the present invention system provides the functional advantages of femtosecond ablation of the workpiece, in part, due to enhancing the laser pulse bandwidth instead of reducing the pulse duration. Multiphoton Intrapulse Interference Phase Scan and binary pulse shaping are further beneficial in accurately and inexpensively controlling ps or fs laser pulses for micromachining. The present invention advantageously uses laser induced breakdown spectroscopy with shaped pulses and/or MIIPS optimization, and with or without chirped pulses, for feedback and closed loop control of micromachining; the LIBS signal can provide an atomic signature of each workpiece layer when stacked so as to provide sensed feedback when each layer is completely penetrated whereby the controller automatically varies the process accordingly. Additional advantages and features of the present invention will become apparent from the following description and appended claims, taken in conjunction with the accompanying drawings.

DETAILED DESCRIPTION OF THE PREFERRED EMBODIMENTS

Figure 1:
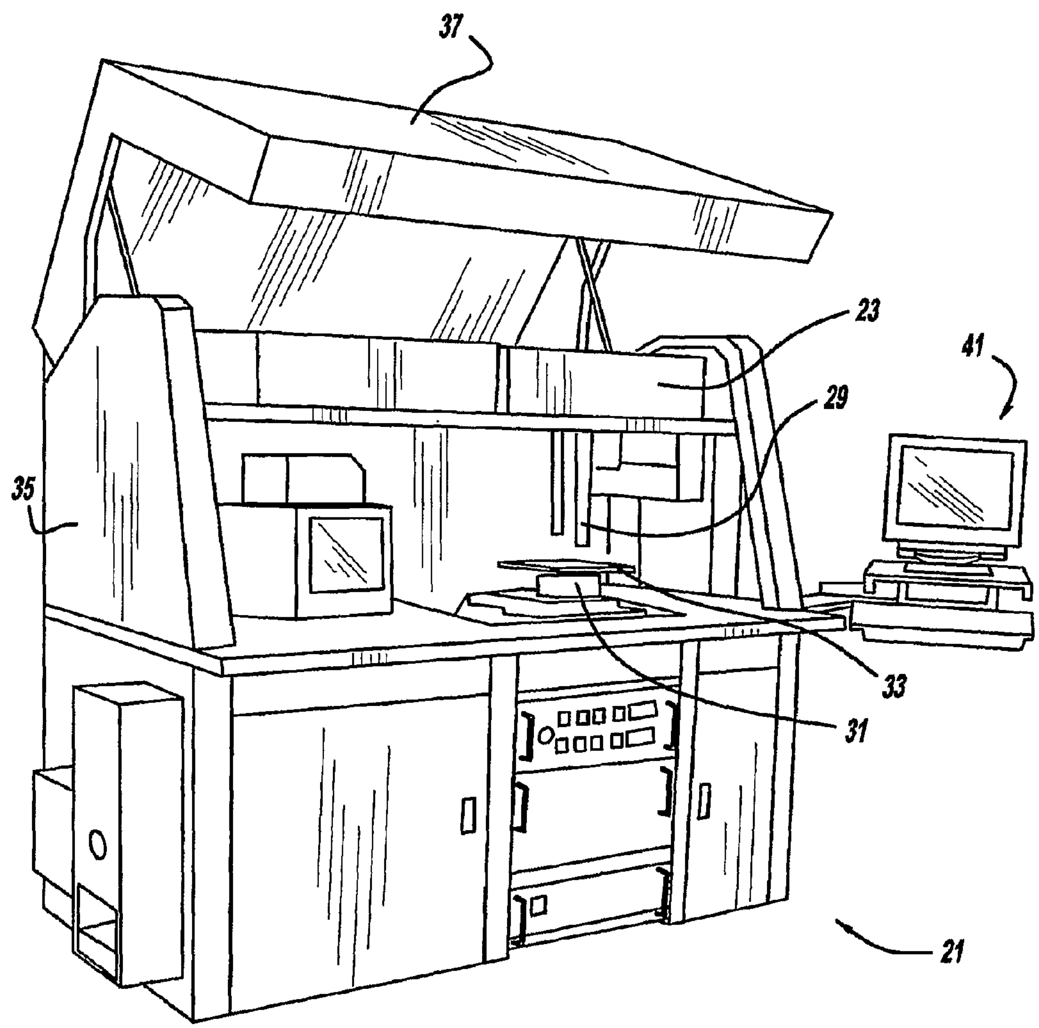
FIG. 1 is a perspective view showing a first preferred embodiment of a laser material processing system of the present invention.
Figure 2:
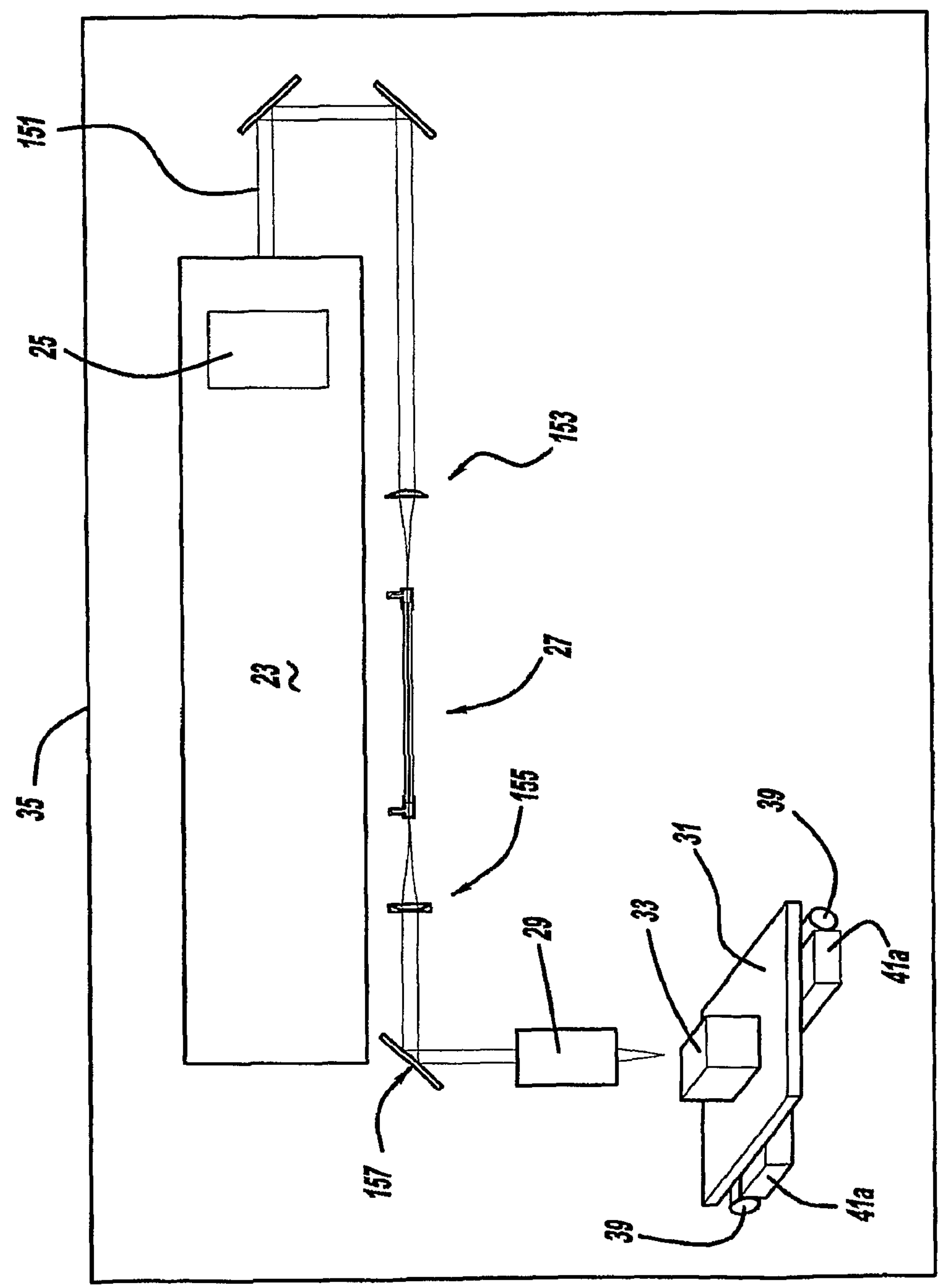
FIG. 2 is a diagrammatic view showing the first preferred embodiment laser material processing system of the present invention.

A first preferred embodiment of a laser material processing system 21 of the present invention is generally shown in FIGS. 1 and 2. System 21 includes a femtosecond laser 23, a pulse shaping and optimization system 25, a waveguide 27, an objective 29, a moveable table or workpiece-support 31, and a workpiece 33, inside a housing or cabinet 35 with an openable door 37. Table 31 is automatically moveable in at least X and Y directions, and optionally in an additional Z and/or rotational direction, by linear slides 41*a* and connected electric motors 39, controlled by a programmable, microprocessor-based computer controller 41. The present invention system is used for micromachining the workpiece, including drilling holes, cutting slots, polishing and the like.

Pulse Shaping and Optimization

Figure 3:
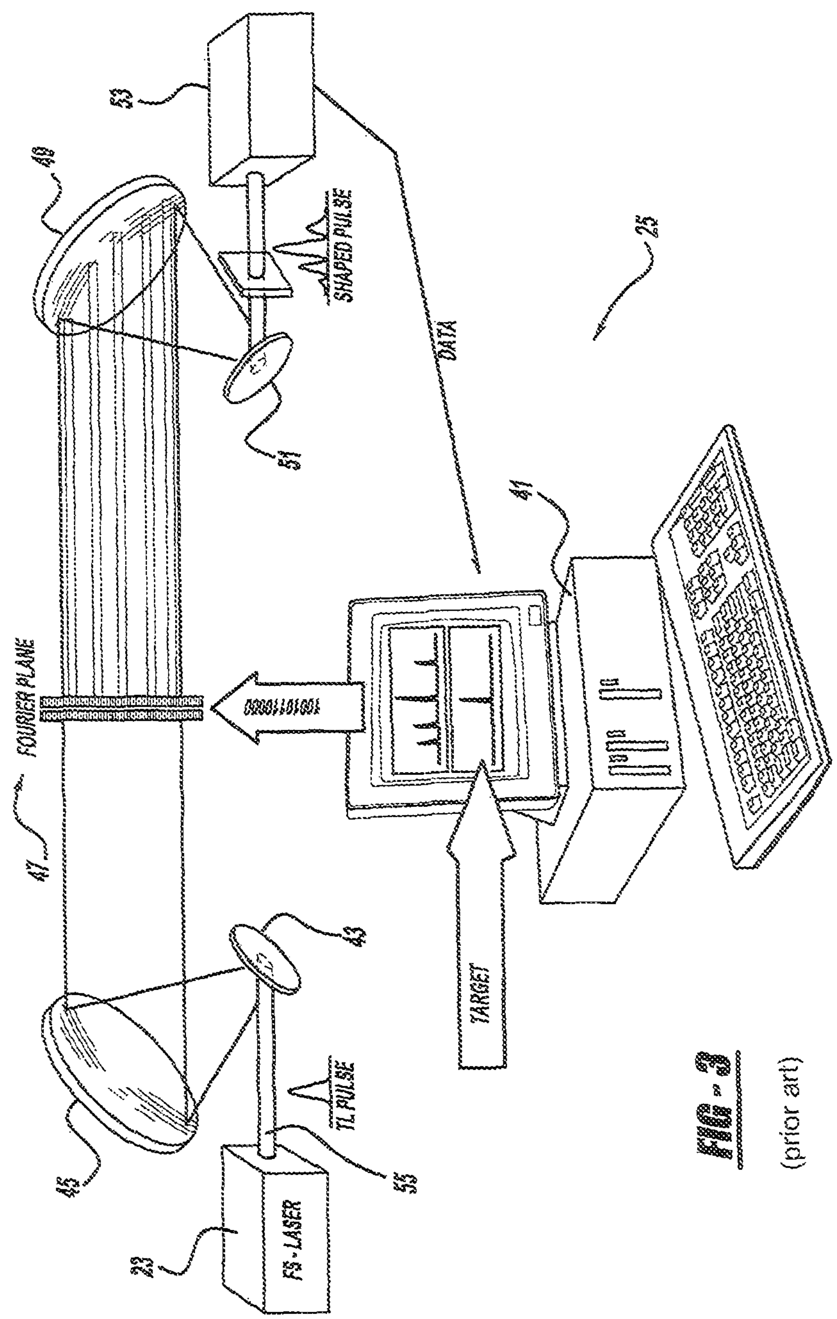
FIG. 3 is a diagrammatic view showing the first preferred embodiment of a pulse shaping portion employed with the laser material processing system of the present invention.
Figure 4:
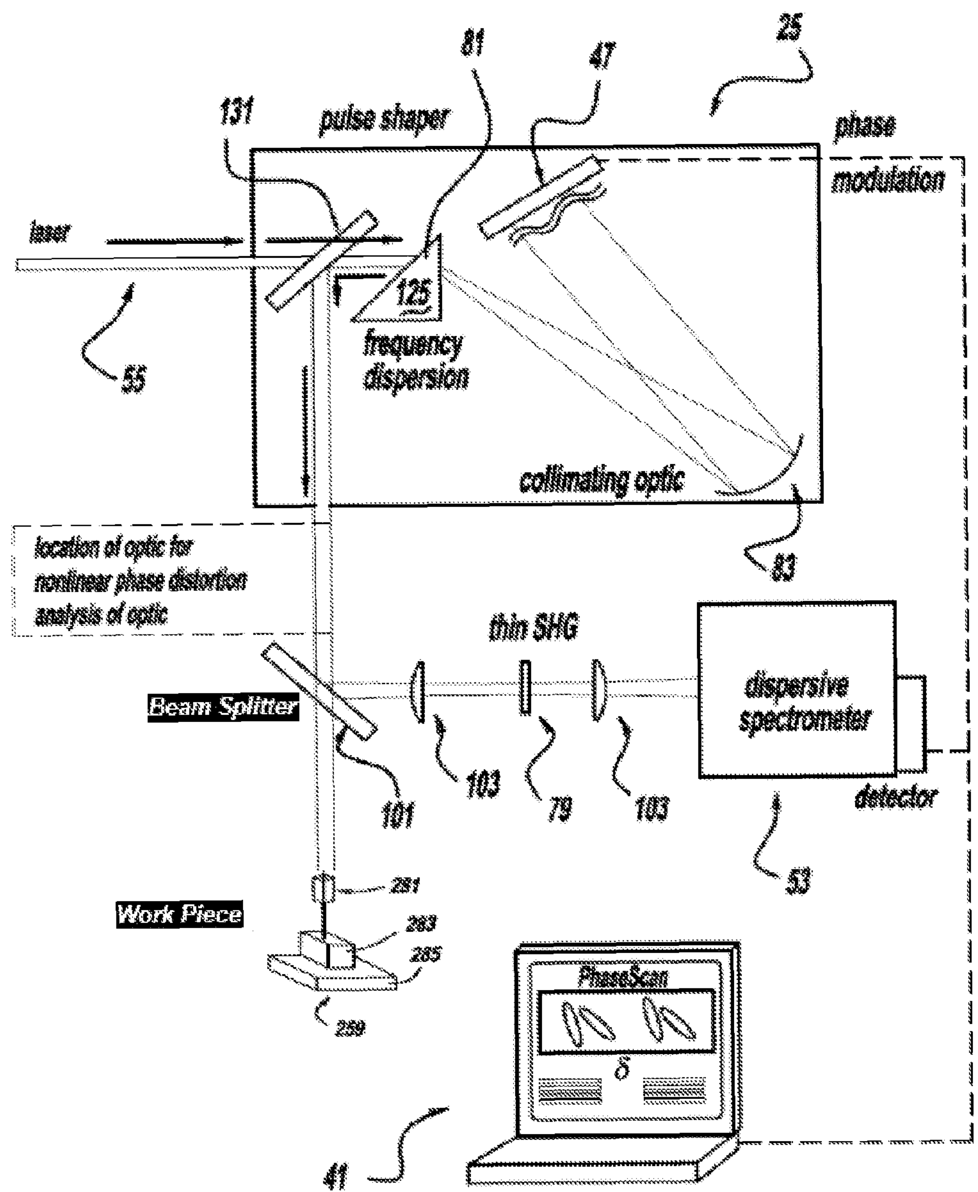
FIG. 4 is a diagrammatic view showing the first preferred embodiment laser material processing system.

Referring to FIGS. 3 and 4, pulse shaping and optimization system 25 includes an upstream grating 43, an upstream concave mirror 45, a spatial light modulator 47, a downstream concave mirror 49, a downstream grating 51, a detection device 53, and personal computer 41. More specifically, detection device 53 is a spectrometer. Bursts or pulses of a laser beam 55 are emitted from laser 23, through the optics 43, 45, 49 and 51, as well as through the spatial light modulator 47 for detection and sensing by spectrometer 53 for further evaluation, analysis, comparison and subsequent control by computer controller 41. The laser is preferably either: (a) a 150 femtosecond laser which can be obtained from Clark-MXR, model CPA 2000; (b) a 500 femtosecond, Ytterbium tungstate (Yb:KGW) laser which can be obtained from Spectra Physics as the Eclipse model; (c) a 110 femtosecond laser which can be obtained from Coherent as the Libra model; (d) the Coherent Legend USP-Elite system, which produces a 3.3 mJ/pulse 26 fs in duration; or (e) an IMRA microJewel FCPA D-400 system, using a Yb-Fiber amplifier. The heart of pulse shaper 29 is automatically moveable flat mirrors or a programmable spatial light modulator (hereinafter "SLM") that is placed at the Fourier plane. For the applications envisioned herein, the mask must be capable of shifting the phase of individual frequencies. For alternate pulse shapers, a different electronically programmable mask that is capable of controlling phase can be employed such as: a liquid crystal display (hereinafter "LCD"), an acousto-optic modulator (hereinafter "AOM"), a deformable mirror, and a permanently deformed mirror.

The phase and amplitude masks of the pulse shaper are controlled by the controller wherein the laser pulse shape takes a dynamic role. The microprocessor within controller 41 will then control laser 23, receive an essentially real time feedback input signal from spectrometer 53, and then perform calculations, comparisons and evaluations, and possibly automatic variation of subsequent pulse shapes. Alternately, these automated steps can be substituted with manual user calculations and decisions if desired based on computer outputs.

Preferably, the phase between photons of different frequencies takes only two values preferably 0 or preferably π to maximize or minimize a given pathway. Any two values whose difference is π work equivalently well. The method is defined as binary phase shaping (hereinafter "BPS"). BPS is used to solve the problem of selective multiphoton excitation with ultrashort laser pulses. The spectral phase of the pulse is tailored using a computer-controlled pulse shaper. The spectral phase of each pulse is corrected using a Multiphoton Intrapulse Interference Phase-Scan (hereinafter "MIIPS") method, which compensates phase distortions to obtain transform-limited (hereinafter "TL") pulses. The binary phase is introduced as an addition to the compensation phase. The shaped laser pulses, with energy ~0.5 nJ per pulse and 87 MHz repetition rate, are focused mildly, to a spot size of ~100 microns in diameter, on a 20 micron thin beta barium borate (βBBO) type I SHG crystal. The frequency-doubled light is collected with an optical fiber and dispersed on a compact spectrometer, preferably obtainable from Ocean Optics.

A preferred MIIPS process for micromachining includes: (1) surface second harmonic emission from the substrate being machined is collected by the spectrometer and its dependence on a number of calibrated phases is used by the programmable computer controller to measure the phase distortions on the pulse; (2) the distortions are then automatically removed by the pulse shaper pursuant to determinations and control of the controller; and thereafter, (3) the pulse shaper automatically introduces a new phase that optimizes the machining process pursuant to determinations and control of the controller. In this MIIPS process, the SHG is obtained from the surface of the workpiece substrate itself, such that a SHG crystal is preferably no longer needed (although use of a SHG crystal still falls within the scope of the present invention, albeit, in a less desired construction). Also note that in some cases a spectrometer may not be needed for MIIPS.

Multiphoton Intrapulse Interference Phase Scan is capable of both pulse characterization and compensation of subsequent pulses. Within minutes, the pulses are characterized and compensated to yield transform-limited (TL) or user-specified shaped pulses at the substrate being machined. Once the MIIPS system has characterized the pulse and retrieved the phase distortions inherent to the pulses, it can use that information to drive the SLM such that it compensates for the distortions. The first step in compensation is to take the phase determined from the first scan and program it into the SLM with a negative sign so that it subtracts the distortions. The system carries out a new phase scan to determine the remaining spectral phase modulation (usually about 10% of the original). Typically, three such iterations will yield transform-limited pulses. Because the laser is not focused in the pulse shaper, the method can be used with pulses that are relatively high in energy.

The version of MIIPS illustrated in FIG. 4 uses a thin SHG crystal 79, spectrometer 53, a dispersing prism or grating 81, a collimating lens 83, spatial light modulator 47 and the femtosecond laser 23. System 25 further has a redirecting mirror or beam splitter 101, and two quartz cylindrical lenses 103 (200 mm focal length, the upstream one for focusing and the downstream one for collimating). The spatial light modulator has two 128 LCD elements (which can be obtained from CRI Inc. as model number SLM-256). In a variation, self-ultrafast switching can be employed based on pulse phase modulation in the pulse shaper, with the thin SHG crystal causing multiphoton intrapulse interference, and using dispersive optics and a CCD camera detector. The simplicity and accuracy of this method make it practical for the evaluation of laser pulses close to transform limited and for the evaluation of phase distortion from optical elements.

Another variation of MIIPS used in the present invention system enhances the ultra-fast laser output by placement of a MIIPS box or unit upstream of an amplifier's output. For example, a separate MIIPS unit is placed directly between an ultra-short, femtosecond oscillator and an ultra-short amplifier. The present invention accurately measures output phase distortions using the MIIPS method which then employs the programmable, computer software to correct the distortions at the pulse shaper in the MIIPS box or by directly moving optics such as an amplifier's compressor and/or stretcher gratings. Furthermore, the output is optimized and detected at the downstream, output side of the amplifier or, alternately, at a more distant downstream location such as at the specimen or workpiece using second harmonic emission and detection with wireless communication and the computer controller. The upstream placement of the MIIPS unit is ideally suited for use with the Legend-USP brand laser, which can be obtained from Coherent, Inc. An electronically integrated system interface includes a MIIPS unit with motorized micrometer actuators that translate gratings and/or mirrors to compensate for changes in the output wavelength of the laser. The actuators are automatically driven by energization signals from the computer controller, in a real-time, closed loop manner based on comparisons of the detected signals from the spectrometer and desired value calculations. When the workpiece is observed through a microscope objective, MIIPS can compensate for the GVD introduced by specific microscope objectives at the specific wavelength of emission of the tunable laser source. It is also envisioned that the MIIPS unit can be located downstream or after the waveguide, and the MIIPS detection occurs after the microscope objective. Further details of MIIPS and binary pulse shaping can be found in U.S. patent application Ser. No. 11/177,940, filed on Jul. 8, 2005, invented by M. Dantus et al. and entitled "Control System and Apparatus for use with Ultra-Fast Laser," which is incorporated by reference herein.

Laser Micromachining

Figure 5:
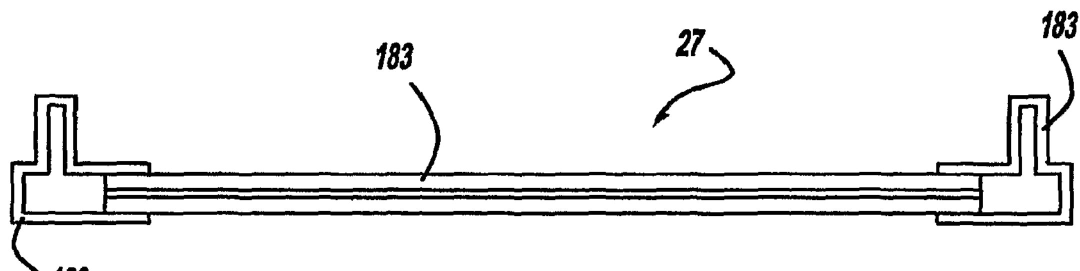
FIG. 5 is an enlarged diagrammatic view showing a portion of the first preferred embodiment laser material processing system of FIG. 4.
Figure 6:
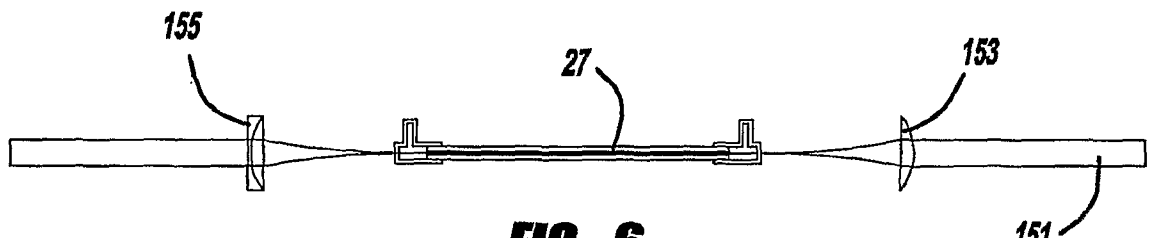
FIG. 6 is an enlarged diagrammatic view showing a portion of the first preferred embodiment laser material processing system of FIG. 6.

FIGS. 2, 5 and 6 illustrate the preferred material processing system 21 in greater detail. After femtosecond laser source 23 has emitted a series of pulse shaped and optimized laser beam pulses 151, a focusing lens 153 acts to focus each pulse, waveguide 27 serves to increase the bandwidth of each pulse and a subsequent collimating lens 155 acts to collimate each pulse output from waveguide 27. A reflective, microscope objective optical member 29 thereafter focuses and directs each pulse at workpiece 33. Focusing lens 153 can alternately be a curved mirror and while collimating lens 155 is preferably an achromatic lens, it can alternately be a curved mirror as well. Flat mirrors 157 are employed to direct and deliver each pulse from laser 23 to objective 29. It is preferred that the workpiece be movable and the laser objective be stationary, however, it is alternately envisioned that objective 29 and various optic members in the pulse path can be mounted to a movable arm with a periscope-type arrangement or other movable transmission and driving actuators in order to affect objective movement relative to a stationary workpiece during processing. Furthermore, one suitable objective 29 can be obtained from the Spectra-Physics division of Newport Corporation, model 50105 or 50102, which is an achromatic, long working distance objective having a wide spectral band.

Waveguide 27 is generally of the type disclosed in U.S. Pat. No. 5,956,173 entitled "Capillary Compressor" which issued to Svelto et al. on Sep. 21, 1999, and is incorporated by reference herein, and N. Nisoli et al., "Generation of high energy 10 fs pulses by a new pulse compression technique," *Appl. Phys. Lett.* 68 (20), at 2793 (May 13, 1996). Waveguide 27 includes a hollow heavy wall, glass capillary tube 181 which is elongated in a circular-cylindrical shape and filled with an Argon gas to about 100 Torr. In contrast to expensive conventional hollow waveguides, however, the present invention waveguide employs glass caps which are fused directly onto each end of tube 181 after a vacuum is drawn and tube 181 is gas filled. The vacuum is drawn and gas subsequently filled through a T-leg in one cap which is then plugged. The internal passageway within tube 181 of waveguide 27 is preferably smooth and straight from one end to the other. The caps and tube are preferably quartz or glass, and an anti-reflective coating is applied to the caps before fusing. An ultrasonic machine or the like is used to fuse the open section of each cap 183 onto the corresponding end of tube 181 without optically distorting the pulse path through either. Therefore, the direct cap fusing to the tube creates a secure seal with minimal processing and components. Hollow waveguide 27 operably broadens the bandwidth of the laser beam pulse, preferably at least 20 nm and more preferably greater than 30 nm. The use of this large bandwidth is ideally suited for use with 100-500 fs pulses (entering waveguide 27) applied to metal micromachining, and with 10-50 fs TL pulses for nonmetal materials such as glass, polymeric and dielectric workpieces.

Figure 8:
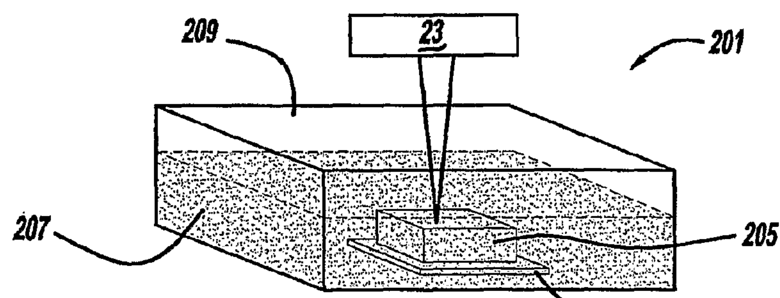
FIG. 8 is a diagrammatic view showing a second preferred embodiment laser material processing system.

A second preferred embodiment laser material processing system 201 is shown in FIG. 8. System 208 is essentially like that described with regard to the first preferred embodiment except that a workpiece supporting table 203 and a workpiece 205 are submerged within a liquid solution 207 in a holding tank 209. Solution 207 is water or machining oil which is circulated past workpiece 205 to remove debris by a pump, filter and piping system (not shown). Oil is ideally suited for index matching between the objective and workpiece. Solution 207 beneficially provides a self-focusing performance that is expected to achieve smaller micromachining hole sizes, in the order of 500 nm or less, due to the index of refraction of the solution. Pulse shaping and MIIPS are additionally used to compensate for pulse dispersion in solution 207.

Figure 9:
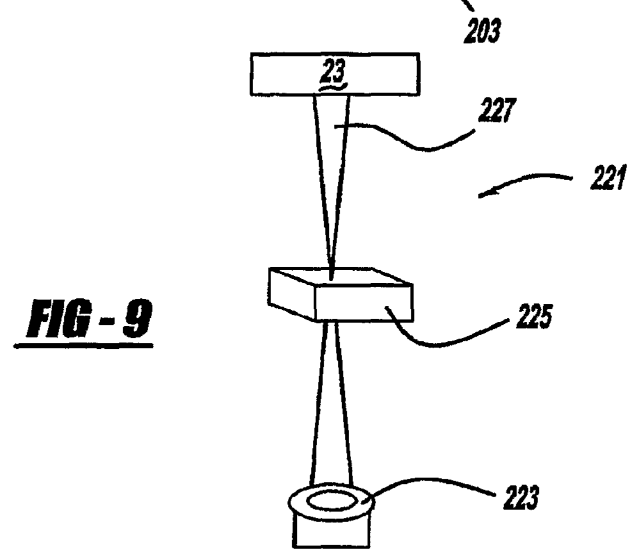
FIG. 9 is a diagrammatic view showing a third preferred embodiment laser material processing system.

FIG. 9 shows a third preferred embodiment laser material processing system 221. This exemplary embodiment system 221 can be employed with either of the prior embodiments. A silicon photo (pin) diode 223 is directly or indirectly (with mirror optics) positioned on an opposite side of a workpiece 225 as compared to pulse 227 emitted from laser 23 and directed through an objective. Diode 223 operably senses and detects pulse 227 when the pulse has completely cut its way through workpiece 225. Diode 223 is connected to computer controller 41 (see FIG. 3) which automatically determines the next subsequent desired workpiece-to-pulse placement and automatically moves either the objective or supporting table accordingly, or stops subsequent pulse transmission. This allows for inexpensive and highly accurate, closed loop and real-time feedback control of the laser material processing system.

Figure 10:
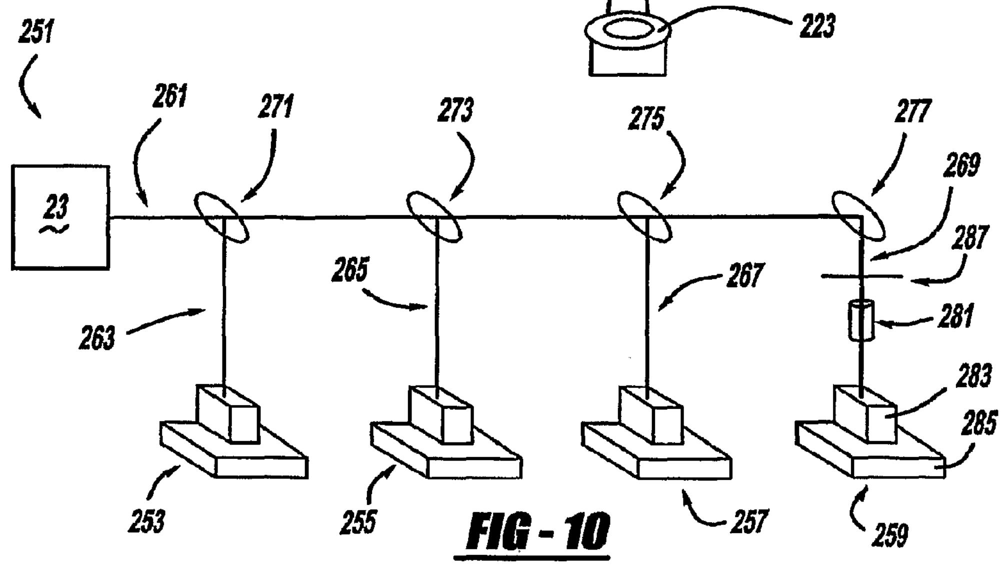
FIG. 10 is a diagrammatic view showing the third preferred embodiment laser material processing system.
Figure 11:
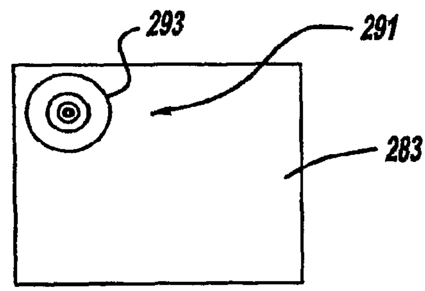
FIG. 11 is a true view showing a workpiece machined by the third preferred embodiment laser material processing system.

Reference should now be made to FIGS. 10 and 11. A third preferred embodiment laser material processing system 251 employs two or more micromachining workstations 253, 255, 257 and 259 all coupled to a single micromachining laser 23 which emits a set of shaped and compensated laser beam pulses 261. Each pulse is split into multiple subpulses 263, 265, 267 and 269 by one or more splitting optic members 271, 273, 275 and 277 associated with each workstation. The pulse shaping, compensation, waveguide, sensing and controller components of any of the prior embodiments can be also used with the present exemplary embodiment. A focusing objective 281 and/or integrated lens array are employed to direct and focus the pulse upon each workpiece 283 for each workstation. A movable table 285 supports workpiece 283 in each workstation. Additionally, an optional shutter 287 is provided for each workstation to block and prevent a subpulse from being emitted from objective 281, for example if only two of the workpieces are to be machined in the four shown workstations. It is envisioned that up to ten different workstations can be simultaneously used from the single micromachining laser 23.

FIG. 11 shows workpiece 283 which has an orientation reference datum or feature 291. Feature 291 is a series of concentric rings or circles 293, with five shown in the present exemplary embodiment. Rings 293 are preferably created on workpiece 283 before the micromachining, by use of photo-etching or evaporating resist processing. A CCD camera 244 (see FIG. 1) or other computer controlled, or alternately manually controlled, scanning device coupled to optic 281 (see FIG. 10) is used to find the X and Y center of feature 291 to generate a confocal feedback signal for each workpiece. Based on this signal, the workpiece supporting tables or objective can be automatically or manually moved to their correct initialized starting position for subsequent micromachining.

Figure 12:
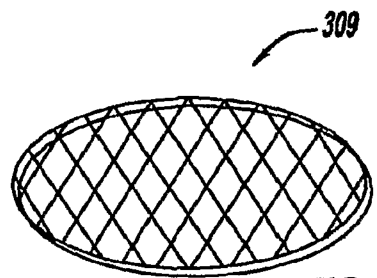
FIG. 12 is a diagrammatic view showing a fourth preferred embodiment laser material processing system.
Figure 13:
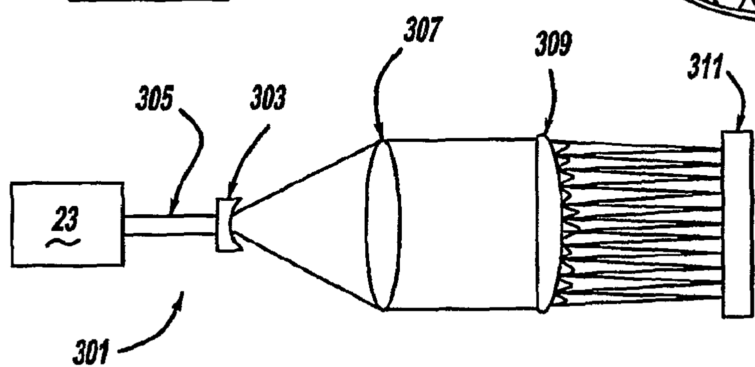
FIG. 13 is a diagrammatic true view of a lens array employed in the fourth preferred embodiment laser material processing system.

Referring to FIGS. 12 and 13, a fourth preferred embodiment laser material processing system 301 has a laser 23, pulse shaper and compensation device, waveguide, sensor and controller like any of the prior embodiments herein. However, a telescope optic, such as a concave mirror or negative lens 303 disperses each laser beam pulse 305 onto a positive collimating lens 307. The collimated pulse is directed to an integrated lens array 309, preferably a two-dimensional SLM phase mask such as the hexagonal array model from Meadowlark Optics Corp. or that sold by Isuzu Glass Corp. or X7500-6510M from Hamamatsu Corp. Fourier optimized masks in the two-dimensional shaper optimize the outcome, such that it can improve the resolution and make patterned holes such as a square or other polygonal shaped hole, by way of example and not limitation. Lens array optic 309 allows each laser beam pulse to create multiple holes or other complex patterns into a single corresponding workpiece 311. This advantageously allows the equipment of the present invention system to be considerably less expensive (on an equipment per emitted bean/machining hole basis) than would otherwise be required while also significantly increasing workpiece processing throughput. The two-dimensional SLM can be used to cause one or more focal spots on the substrate. These focal points need not be static. They can be moved by sending different signals to the SLM and thereby direct the machining process dynamically in one or more locations. It is noteworthy that the two-dimensional shaper of this embodiment is for making patterns and to direct the laser beam pulse focus, but not for use in MIIPS which is preferably performed with a separate one-dimensional shaper.

Figure 14:
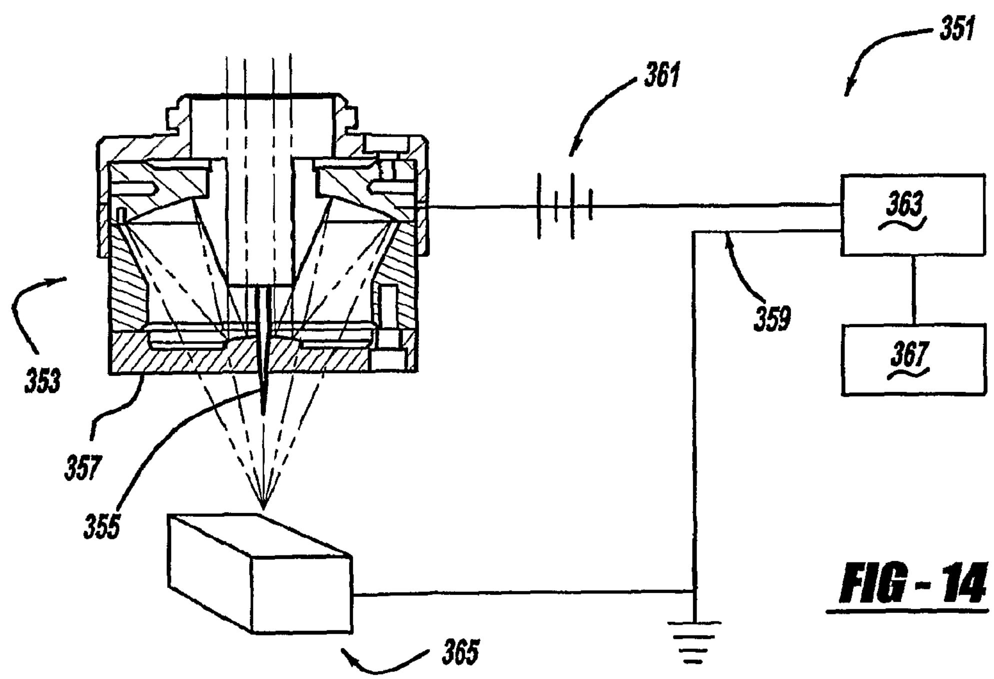
FIG. 14 is a diagrammatic electrical diagram showing a fifth preferred embodiment laser material processing system.

Another preferred embodiment laser material processing system 351 is shown in FIG. 14. A laser, pulse shaping and compensating device, waveguide, sensor and controller are essentially the same as any of the prior embodiments. In this exemplary embodiment, an objective 353 includes an elongated, centralized and tapered pin 355 extending from a beam emitting end 357. Pin 355 is electrically connected to an electrical circuit 359 including a power supply 361. A high voltage meter/amp meter 363 is connected in circuit 359 and circuit 359 is also electrically connected in a removable manner, either directly or indirectly, to a conductive workpiece 365. A programmable controller 367 is connected to and operably controls circuit 359. Pin 355 is substantially aligned with a focal point of the laser beam pulse. Thus, when electrical current is flowing through circuit 359 to pin 355, an electrical arc will span to workpiece 365 adjacent the laser beam pulse. The electrical current associated with the arc will vary due to ionization caused by workpiece ablation. For example, the electrical current is expected to be reduced when the laser beam pulse completely cuts through the workpiece. This voltage variation will be sensed by the meter 363 and the associated meter signal will be transmitted to controller 367. The controller will then automatically determine the next processing step such as moving either the workpiece or objective, varying a pulse shape or stopping pulse transmission. Moreover, the laser pulse will also serve to direct and focus the arc discharge toward the desired machining hole thereby improving accuracy and assisting in the machining process.

Additional alternate variations to the preceding embodiments are also envisioned. For example, the pulse shaper can be automatically switched between different phases, amplitudes or polarizations having different indexes of refractions. An exemplary use is to create a grated, undulated or stepped internal pattern on a hollow waveguide which could change the scattering pattern of light therethrough and could cause higher harmonic generation in an inexpensive manner. In another variation, multiple objectives, each having different characteristics, can be rotated either manually or automatically on a turret or carousel. For example, a first objective can be used to focus the micromachining pulse while a second objective thereafter aligned with the normal beam path can be used to view (by way of display monitor 383, in FIG. 1) and detect the accuracy for desired machining path with a CCD camera or manually. A further alternate variation purges the workpiece area in the machining station with a flowing, compressed Nitrogen or other gas fluid in order to prevent debris build up on the workpiece or objective. Moreover, an alternate version employs a superluminescent laser diode directly providing the desired, expanded bandwidth without a femtosecond laser, for micromachining.

Another alternate embodiment employs a 200-500 fs ytterbium tungstenate laser (i.e., a picosecond laser) which is directly pumped by flashlamps instead of by a conventional fs green laser source. The bandwidth of this picosecond laser is increased by a hollow waveguide or otherwise pulse shaped and compensated with a MIIPS unit, in order to inexpensively provide micromachining or surgical uses.

Laser Induced Breakdown Spectroscopy

The effect of femtosecond laser induced breakdown spectroscopy (hereinafter "LIBS") is hereinafter considered. LIBS is influenced by pulse duration, bandwidth, and phase shaping, especially with regard to micromachining of metallic samples. Shorter pulses give a lower threshold. Moreover, different phase functions are expected to produce sample-dependent differences with phase dependence greater near the threshold. For example, it is envisioned that when 30 fs pulses are stretched to 10 ps by linear chirp, little or no effect should be measured on the LIBS signal, seemingly contradicting the advantages reported for femtosecond pulses. Hence, it is believed that the bandwidth of the laser pulses is inversely proportional to the LIBS threshold.

The ablation process in femtosecond LIBS is very different from conventional nanosecond LIBS. The electric field causes inner ionization of the atoms (1-5 fs), followed by outer ionization within the pulse (~35 fs). This highly unstable multi-ionized system triggers a Coulomb explosion within ~200 fs. Ablation is limited by the optical penetration depth at low fluences. Reduced thermal damage, lower threshold fluences, and less or no material deposition is attributed to the direct transition of material to the vapor or plasma. Only at very high fluences (150 mJ/pulse) is melting observed, as evidenced by crater formation and microsecond emission. The higher efficiency of fs-LIBS results in higher reliability, making it an efficient method to deliver photons to a sample to produce a reproducible LIBS signal.

A regeneratively amplified Ti:Sapphire laser and a MIIPS box pulse shaper are used to correct phase distortions, resulting in transform limited (TL) pulses centered at 800 nm (35 fs, ~750 mJ/pulse at 1 kHz). The laser beam is focused with a 100 mm lens and the focal spot diameter is 26 μm as measured from single pulse holes on metal. Laser intensity is varied from 0 to 150 μJ per pulse and the signal is collected at a ~45° angle with a fiber coupled high-resolution miniature spectrometer (HR4000-Ocean Optics) and averaged one second. Laser power dependence is measured using a monochromator a photomultiplier and is averaged with a boxcar integrator. A time gate is used to avoid the prompt (first 5 ns) broadband plasma emission. The signal collected corresponds to the atomic emission with characteristic 30-60 ns decay time. Exemplary samples used for this study are 6061 aluminum, copper, and brass disks spun at ~4800 rpm. Laser power dependence measurements are carried out by selecting spectral lines from the LIBS spectra (Cu I at 521.820 nm, Al I at 396.152 nm and Zn I at 481.053 nm in brass). For atomic lines, a fast rise is followed by a slow decay characteristic to atomic emission (30-60 ns). Lack of melting can be confirmed by microscopic analysis of clean edged micromachined holes. The threshold values expected to be obtained with TL pulses are in the 3-5 μJ/pulse levels and are very low compared to typical LIBS experiments carried out with 3-5 orders of magnitude higher energy per pulse. The threshold energy density is expected to be 0.6 for aluminum, 0.5 for copper and 0.8 for brass, all in J/cm$^2$. Thus, micromachining sub-0.5 mm features can be carried out with single nano-Joule per pulse lasers.

Furthermore, linear chirp enhances the yield of multiphoton-initiated chemical reactions, and fs-LIBS emission. Measurements from −10,000 to 10,000 fs$^2$ can be carried out precisely using the MIIPS box pulse shaper at 50 and 150 μJ/pulse. It is expected that chirp will produce a 30% change in the overall LIBS signal for aluminum and a slightly smaller effect for copper. At much greater chirp values, the signal should increase by as much as 40% compared to TL pulses. The signal should still be higher than for TL pulses with a chirp of 130,000 fs$^2$ obtained by moving the compressor grating, implying that 35-fs pulses with energy just above threshold produce the same amount of LIBS signal as a pulses that are 10.3 picoseconds long.

The dependence of femtosecond LIBS on sinusoidal phases inspired by their effect on multiphoton intrapulse interference (MII) and control of multiphoton processes on molecules, proteins, and nonlinear optical crystal is next considered. The measurements can be carried out by introducing phase functions in the frequency (ω) domain defined by $\phi(\omega)=3\pi/2\cos(\gamma\omega-\delta)$, where γ is the bandwidth of the pulse (~1/35 fs) and δ determines the position of the mask with respect to the spectrum of the pulse. These measurements are obtained with pulse energies 3-5 times above the LIBS threshold. When the intensity is increased to 30 times the LIBS threshold, the effect of the sinusoidal modulation decreases from 20% to less than 10%.

The effect of binary phase functions (10 bit resolution) on Al and Cu is also explored. Binary phase functions are effective for achieving selective multiphoton excitation in condensed phase and enhancing selective fragmentation in molecular beam experiments. The different patterns in binary phase maps should indicate a fundamental difference in the coupling of the laser energy into the substrate. The pattern to be obtained for copper is expected to indicate TL pulses produce higher LIBS intensity while modulation of the pulse into sub-pulses is best for aluminum.

TL pulses have very low thresholds for LIBS emission with femtosecond pulses. Positive chirp results in a greater efficiency compared to negative chirp using much more intense fs pulses. Stretching the pulse by a factor of ~300 yields signals will be slightly higher than those observed for TL pulses, despite the fact that the laser pulse energy is near threshold. This is in contrast with the expected signal from a two- or three-photon excitation process where the effect of stretching the pulse by such a factor would lead to a signal decrease of 5 or 7 orders of magnitude, respectively. Therefore, the LIBS process is limited by the timescale of electron-phonon coupling and of atoms leaving the bulk. As the pulses are stretched, there is a transition from the fs-LIBS model, in which the laser energy is confined, to the ns-LIBS model, in which the energy couples to the bulk causing melting.

Figure 7:
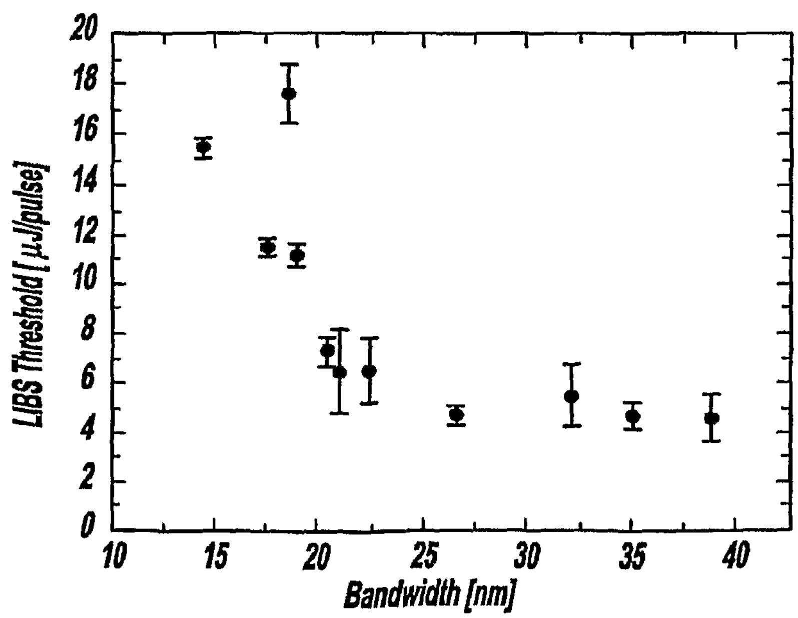
FIG. 7 is a graph showing expected data of the first preferred embodiment laser material processing system.

The relative insensitivity of LIBS to pulse duration would seem to contradict the better efficiencies and better micromachining characteristics for picosecond and femtosecond laser pulses. Thus, the expected effect of bandwidth by introducing a set of slits in the compressor where the pulse is frequency-dispersed, with the fs-LIBS threshold dependence at multiple bandwidths of the pulse (using full-width at half maximum), is shown in FIG. 7; this indicates that the greater the bandwidth, the lower the threshold. In other words, efficient LIBS on metallic surfaces is highly dependent on bandwidth, however, for micromachining purposes, pulse durations below 1 ps are preferred to avoid melting and control depth. Although changes in the bandwidth cause changes in the pulse duration, that pulse duration alone does not affect the LIBS threshold.

It is also noteworthy that when δ=π, the phase function can be approximated by a positive chirp, which yields a higher LIBS signal. When δ=0, the phase function can be approximated by a negative chirp, which yields a lower LIBS signal. At δ=π/2, the phase function has, within the FWHM of the pulse, a linear dependence resulting in near-TL excitation. The dependence of LIBS on sinusoidal phase modulation, however, is not as significant as that of multiphoton processes. Furthermore, binary phase functions should provide clear differences between copper and aluminum, by way of example. In copper, TL pulses yield the highest LIBS signal but aluminum requires greater pulse modulation. This is most likely due to the aluminum-oxide layer. Therefore, LIBS efficiency improves with bandwidth well beyond what is available using a traditional picosecond laser. Moreover, phase control of ultrashort (broad bandwidth) pulses will be valuable in laser machining and will improve reproducibility and selectivity in analytical LIBS applications, especially when minimal disturbance of the substrate is required.

While various embodiments have been disclosed herein, it should be appreciated that other modifications may be made that are covered by the system and methods of the present invention. For example, alternate lasers, workpieces (including silicon wafers and biological specimens), optics, software and controllers can be employed as long as they function as described. Furthermore, a CCD camera or other optical imaging device can be used ahead of or behind the pulse to sense the location of the prospective machining path or to check the machining quality, which then in turn, is usable in a closed loop real-time manner to vary a machining characteristic such as pulse shape, pulse duration or workpiece movement. The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A laser material processing system comprising:

a laser operable to emit a femtosecond or picosecond laser beam pulse;

a shaper operable to shape the pulse;

an optic member located in the path of the pulse to broaden the bandwidth of the pulse;

a programmable controller connected to the shaper;

a detector connected to the controller; and a workpiece micromachined by the pulse, the workpiece including at least one of: silicon or a dielectric material;

the controller receiving pulse characteristic signals detected by the detector to optimize laser pulse characteristics for the micromachining of the workpiece;

wherein the laser pulse characteristics are optimized based at least in part on the signals which are laser induced breakdown spectroscopy signals; and wherein the detector detects emissions from the workpiece as it is being micromachined.

2. The system of claim 1, wherein the shaper uses multiphoton intrapulse interference phase scan for pulse characterization and compensation in a path of the pulse.

3. The system of claim 1, wherein the optic member is a waveguide which broadens input picosecond laser pulses to a bandwidth capable of supporting a pulse duration less than about 500 femtoseconds.

4. The system of claim 1, further comprising a workpiece support automatically moving the workpiece relative to the laser beam pulse, the programmable controller operably controlling the workpiece support, the laser and the shaper, and the shaper controlling output laser pulses according to at least a position of the workpiece.

5. The system of claim 1, further comprising at least one optic device splitting the laser beam pulse into multiple subpulses which simultaneously micromachine the same workpiece.

6. The system of claim 1, further comprising at least one optic device splitting the laser beam pulse into multiple subpulses which simultaneously micromachine multiples of the workpiece in multiple machining stations.

7. The system of claim 1, further comprising a tank containing a liquid, the workpiece being entirely submerged in the liquid during micromachining, and the liquid assisting in focusing the laser pulse.

8. The system of claim 1, wherein the workpiece is the dielectric material.

9. The system of claim 1, wherein the pulse has a duration of 500 femtoseconds to 10 picoseconds.

10. The system of claim 1, wherein changes in the bandwidth cause changes in the pulse, and the workpiece includes a silicon wafer.

11. The system of claim 1, further comprising a lens focusing the shaped pulse, and laser induced breakdown spectroscopy monitoring ablation of the workpiece.

12. The system of claim 1, wherein the detector is a spectrometer which detects light emitted by the workpiece as it is being micromachined.

13. The system of claim 1, wherein the detector detects atomic emissions from light emitted by the workpiece.

14. A laser material processing system comprising:

a laser operable to emit a laser beam pulse having a femtosecond or picosecond duration;

a shaper operable to shape the pulse;

a waveguide located in the path of the pulse to broaden the bandwidth of the pulse;

a programmable controller connected to the shaper;

a laser pulse detector connected to the controller;

the controller operably receiving a signal from the detector indicative of distortion of the laser pulse and causing the shaper to vary a characteristic of subsequent pulses passing through the shaper to correct the distortion; and a surface of a workpiece operably creating second harmonic emission of the laser pulse which is detected by the detector to monitor the laser performance.

15. The system of claim 14, wherein the waveguide includes an elongated tube made of at least one of: (a) glass, and (b) quartz; and the duration of the pulse is less than about 500 femtoseconds.

16. The system of claim 14, further comprising a workpiece support automatically moving the workpiece relative to the laser beam pulse, and the controller operably controlling the workpiece support.

17. The system of claim 14, further comprising at least one optic device splitting the laser beam pulse into multiple subpulses which simultaneously micromachine the same workpiece.

18. The system of claim 14, further comprising at least one optic device splitting the laser beam pulse into multiple subpulses which simultaneously micromachine workpieces in multiple machining stations.

19. The system of claim 14, further comprising a tank containing a liquid, a workpiece being entirely submerged in the liquid during use, and the liquid assisting in focusing the laser pulse.

20. The system of claim 14, further comprising micromachining a workpiece with the shaped and bandwidth-broadened laser pulse with the pulse duration being 10 picoseconds or less.

21. The system of claim 20, wherein the workpiece includes at least one of: silicon or a dielectric material.

22. A laser material processing system comprising:

a laser operable to emit a laser beam pulse having a picosecond or faster duration;

a shaper operable to shape the pulse;

a waveguide located in the path of the pulse to broaden the bandwidth of the pulse; and a workpiece micromachined by the pulse;

a programmable controller connected to the shaper;

a detector connected to the controller;

wherein a surface of the workpiece creates second harmonic emission of the laser pulse which is detected by the detector to characterize the laser pulses, such that a SHG crystal is not employed.

23. The system of claim 22, further comprising a workpiece support automatically moving the workpiece relative to the laser beam pulse, the programmable controller operably controlling the workpiece support, the laser and the shaper, and the shaper controlling output laser pulses according to at least a position of the workpiece.

24. The system of claim 22, wherein the workpiece includes at least one of: silicon or a dielectric material.

25. The system of claim 22, wherein changes in the bandwidth cause changes in the pulse duration, and the workpiece includes a silicon wafer.

26. A method of material processing, the method comprising:

(a) emitting at least one laser pulse having a duration of 10 picoseconds or less;

(b) automatically correcting spectral phase distortions in the at least one pulse using computer calculations based on essentially a real-time sensed input;

(c) broadening a bandwidth of the at least one pulse to about 10-200 nm;

(d) micromachining a workpiece with the at least one pulse;

(e) automatically changing a characteristic of a subsequent laser pulse, with the assistance of the bandwidth broadening, during the micromachining of the same workpiece; and (f) creating second harmonic emission of the laser pulse by a surface of the workpiece.

27. The method of claim 26, further comprising automatically shaping laser pulses based at least in part on sensed characteristics of prior laser pulses.

28. The method of claim 26, further comprising assisting in focusing the laser pulse with a liquid in which the workpiece is being micromachined.

29. The method of claim 26, further comprising entirely submerging the workpiece in a liquid during the micromachining.

30. The method of claim 26, wherein the broadening of the bandwidth is performed with a waveguide.

31. The method of claim 26, further comprising submerging the workpiece in oil and micromachining at least one hole in the workpiece of a diameter no greater than 500 nm.

32. The method of claim 26, further comprising using a datum marking on the workpiece to visually align a laser objective with a desired location on the workpiece prior to the micromachining.

33. The method of claim 26, further comprising using laser induced breakdown spectroscopy to provide an atomic signature of each layer of the workpiece so as to provide sensed feedback when each layer is completely penetrated, and a computer automatically varying the micromachining accordingly.

34. The method of claim 26, further comprising automatically shaping laser pulses based at least in part on sensed characteristics of prior laser pulses during the micromachining.

35. The method of claim 26, wherein the characteristic is duration of the subsequent pulse.

36. The method of claim 26, further comprising automatically changing the characteristic based at least in part on a signal from a laser induced breakdown spectroscopy emission from the workpiece being micromachined.

37. The method of claim 26, further comprising micromachining a feature less than 0.5 mm in the workpiece which includes a silicon layer.

38. The method of claim 26, further comprising:

(a) transmitting the at least one pulse through a fiber;

(b) the micromachining including at least one of: (i) drilling, (ii) cutting, or (iii) polishing the workpiece which is at least one of: (i) a silicon or (ii) dielectric material;

(c) detecting a characteristic of at least one of the pulses with a detector connected to a programmable controller; and (d) the automatically changing is controlled by the programmable controller based at least in part on a signal from the detector.

39. A laser material processing system comprising:

a picosecond laser operable to emit at least one laser beam pulse having a duration of 10 picoseconds or less;

a shaper operable to shape the pulse;

an optic member broadening the bandwidth of the at least one pulse;

a programmable controller connected to the shaper;

a laser pulse detector connected to the controller;

the controller operably receiving a signal from the detector indicative of distortion of the at least one laser pulse and causing the shaper to vary a characteristic of a subsequent pulse passing through the shaper to correct distortion therein;

a workpiece ablated by the at least one pulse, the workpiece including at least one of: a silicon, dielectric or a metallic material, and the broadening of the pulse bandwidth allowing for controlled duration change of the at least one pulse during the ablation; and a surface of the workpiece creating second harmonic emission of the laser pulse which is detected by the detector, such that a SHG crystal is not employed.

40. The system of claim 39, further comprising a lens focusing the at least one shaped pulse, and changing the duration of the at least one pulse from less than 100 femtoseconds to up to 10 picoseconds during the ablation of the workpiece.

41. The system of claim 39, further comprising a workpiece support automatically moving the workpiece relative to the at least one laser beam pulse and the laser including a fiber amplifier.

42. The system of claim 39, further comprising at least one optic device splitting the laser beam pulse into multiple subpulses which simultaneously micromachine the same workpiece.

43. The system of claim 39, further comprising at least one optic device splitting the laser beam pulse into multiple subpulses which simultaneously micromachine workpieces in multiple machining stations.

44. The system of claim 39, further comprising a tank containing a liquid, a workpiece being entirely submerged in the liquid during use, and the liquid assisting in focusing the laser pulse.

45. The system of claim 39, wherein the optic member is a waveguide.

46. The system of claim 39, further comprising:

an objective emitting the pulse; and a conductor located adjacent the pulse emitting the electrical arc to the workpiece.

47. The system of claim 39, further comprising a sensor and an objective, the sensor being substantially located on an opposite side of the workpiece from the objective, and the controller determining when the pulse has reached the opposite sensor.

48. The system of claim 39, further comprising electrical current associated with an electrical arc varying due to ionization caused by workpiece ablation from the pulse.

49. The system of claim 39, wherein the workpiece is the silicon material.

50. The system of claim 39, wherein the workpiece is the dielectric material.

51. The system of claim 39, wherein the workpiece is the metallic material, and the laser including a fiber amplifier.

52. A laser material processing system comprising:

a laser operable to emit a laser beam pulse;

a shaper operable to shape the pulse;

a waveguide broadening the bandwidth of the pulse;

a programmable controller connected to the shaper;

a laser pulse detector connected to the controller;

the controller operably receiving a signal from the detector indicative of distortion of the laser pulse and causing the shaper to vary a characteristic of a subsequent pulse passing through the shaper to correct distortion therein; and a workpiece ablated by the pulse, the pulse having a duration less than 500 femtoseconds at the workpiece; and a surface of the workpiece operably creating second harmonic emission of the laser pulse which is detected by the detector to monitor the laser performance.

53. The system of claim 52, further comprising a workpiece support automatically moving the workpiece relative to the laser beam pulse, the programmable controller operably controlling the workpiece support, the laser and the shaper, and the shaper controlling output laser pulses according to at least a position of the workpiece.

54. The system of claim 52, wherein the workpiece includes at least one of: silicon or a dielectric material.

55. The system of claim 52, wherein changes in the bandwidth cause changes in the pulse duration, and the workpiece includes a silicon wafer.

* * * * *

UNITED STATES PATENT AND TRADEMARK OFFICE

CERTIFICATE OF CORRECTION

PATENT NO. : 9,018,562 B2
APPLICATION NO. : 12/226152
DATED : April 28, 2015
INVENTOR(S) : Marco Dantus It is certified that error appears in the above-identified patent and that said Letters Patent is hereby corrected as shown below:

Title Page, (56) References Cited, OTHER PUBLICATIONS

| | |
|---|---|
| Page 5, column 1, line 16 | "Effec" should be --Effect-- |
| Page 5, column 2, line 37 | "Li 2" should be --Li2-- |
| Page 5, column 2, line 53 | "I2" should be --$I_2$-- |
| Page 6, column 2, line 57 | "Meaurements" should be --Measurements-- |
| Page 7, column 2, line 47 | "pulse" should be --pulse"-- |
| Page 7, column 2, line 48 | "zero-disperson" should be --zero-dispersion-- |
| Page 8, column 1, line 36 | "C2H2" should be --$C_2H_2$-- |
| Page 8, column 1, line 57 | "CH2BrI" should be --$CH_2BrI$-- |
| Page 8, column 1, line 59 | "CH2BrI" should be --$CH_2BrI$-- |
| Page 9, column 1, line 20 | "QUantum" should be --Quantum-- |
| Page 9, column 1, line 29 | "Femtoscond" should be --Femtosecond-- |
| Page 9, column 1, line 39 | "flurorescence" should be --fluorescence-- |
| Page 10, column 1, line 64 | "Crystal-BaAlBO3F2(BABF)" should be --Crystal-$BaAlBO_3F_2$(BABF)-- |
| Page 10, column 2, line 71 | "C2H4;" should be --$C_2H_4$;-- |
| Page 12, column 1, line 55 | "Demonstraction" should be --Demonstration-- |
| Page 13, column 1, line 41 | "H2, N2, and O2" should be --$H_2$, $N_2$, and $O_2$-- |
| Page 14, column 2, line 46 | "CpMn(CO)3" should be --$CpMN(CO)_3$-- |
| Page 16, column 1, line 16 | "Fe(CO)5" should be --$Fe(CO)_5$-- |
| Page 16, column 1, line 19 | "CpFe(CO)2X" should be --$CpFe(CO)_2X$-- |
| Page 16, column 1, line 44 | after "Phys.", delete "Chem." (1st occurrence) |
| Page 16, column 1, line 65 | "[Ru(dpb)3](PF6)2" should be --$[Ru(dpb)_3](PF_6)_2$-- |
| Page 16, column 2, line 5 | "CH2BrCl" should be --$CH_2BrCl$-- |
| Page 17, column 1, line 44 | after "Phys.", delete "Chem." (1st occurrence) |

In the specification

Column 7

Line 29 "bean/machining" should be --beam/machining--

Signed and Sealed this
Twenty-second Day of December, 2015

Michelle K. Lee
*Director of the United States Patent and Trademark Office*